United States Patent
Aronson

(10) Patent No.: US 9,660,996 B2
(45) Date of Patent: *May 23, 2017

(54) POINT-OF-CYBER-ACCESS CYBER SYSTEM

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/236,337

(22) Filed: Aug. 12, 2016

(65) Prior Publication Data

US 2016/0352740 A1    Dec. 1, 2016

Related U.S. Application Data

(63) Continuation-in-part of application No. 14/447,283, filed on Jul. 30, 2014, now Pat. No. 9,479,507, which is a continuation of application No. 13/702,537, filed as application No. PCT/US2011/056931 on Oct. 19, 2011, now Pat. No. 8,832,794, which is a continuation-in-part of application No. 12/908,162, filed on Oct. 20, 2010, now abandoned.

(51) Int. Cl.
| | |
|---|---|
| H04L 9/32 | (2006.01) |
| H04L 29/06 | (2006.01) |
| G06F 21/60 | (2013.01) |
| H04W 12/06 | (2009.01) |
| G06F 21/62 | (2013.01) |
| G06F 1/16 | (2006.01) |

(52) U.S. Cl.
CPC ............ *H04L 63/10* (2013.01); *G06F 21/60* (2013.01); *G06F 21/6218* (2013.01); *G06F 21/6263* (2013.01); *H04L 63/0876* (2013.01); *H04L 63/102* (2013.01); *H04L 63/20* (2013.01); *H04W 12/06* (2013.01); *G06F 1/162* (2013.01); *G06F 1/1641* (2013.01); *G06F 2221/2101* (2013.01); *G06F 2221/2149* (2013.01)

(58) Field of Classification Search
CPC ............ H04L 63/1416; H04L 63/1425; H04L 63/1433; H04L 63/145; H04L 63/1466; H04L 63/1475; H04L 63/1483; H04L 63/1491; H04L 63/20
USPC ..................... 726/22–30; 709/224–225, 229; 809/224–225, 229
See application file for complete search history.

(56) References Cited

U.S. PATENT DOCUMENTS 7,131,000 B2 * 10/2006 Bradee ................ G06F 21/6218
                                                 707/999.009
7,263,717 B1 * 8/2007 Boydstun ................ H04L 63/08
                                                 707/999.009

(Continued)

*Primary Examiner* — Hosuk Song
(74) *Attorney, Agent, or Firm* — John A. Fortkort; Fortkort & Houston PC

(57) ABSTRACT

The system and system components of the present disclosure may be configured to provide individuals with both a safe and a secure cyber environment. Within this safe and secure cyber environment, each individual and each cyber device may be properly identified for all cyber interactions with others, and for all cyber interactions with the cyber devices of others. The system may also be configured to provide individuals with privacy for the individual's private cyber activities and cyber assets. Furthermore, the system may be configured to provide for environment-wide, interoperable use of any cyber device, cyber programming, and cyber content.

26 Claims, 18 Drawing Sheets

(56) References Cited

U.S. PATENT DOCUMENTS

| | | | | |
|---|---|---|---|---|
| 7,823,194 B2* | 10/2010 | Shay | ............... | H04L 63/02 |
| | | | | 726/13 |
| 8,209,738 B2* | 6/2012 | Nicol | ............... | H04L 41/142 |
| | | | | 709/224 |
| 8,245,280 B2* | 8/2012 | Song | ............... | H04L 63/101 |
| | | | | 713/182 |
| 8,499,348 B1* | 7/2013 | Rubin | ............... | G06F 21/554 |
| | | | | 713/154 |
| 8,832,794 B2* | 9/2014 | Aronson | ............... | H04L 41/50 |
| | | | | 709/203 |

* cited by examiner

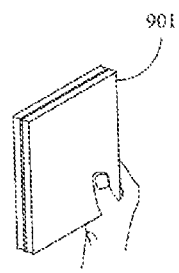
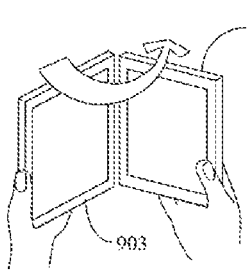
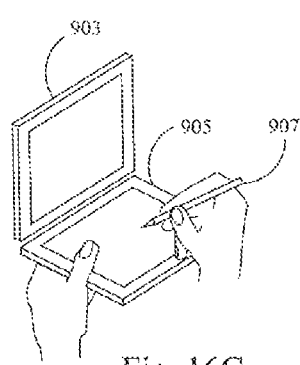
Fig. 16A
Fig. 16B
Fig. 16C
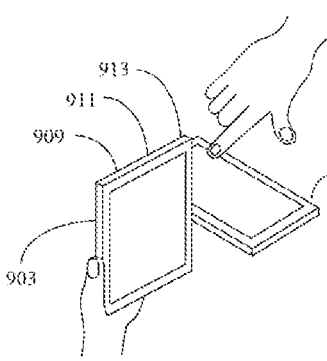
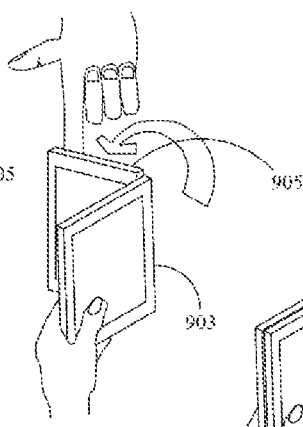
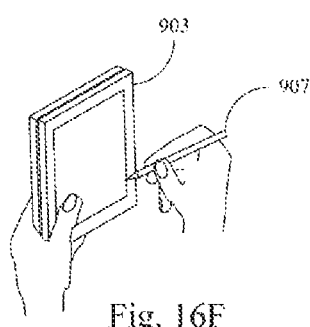
Fig. 16D
Fig. 16E
Fig. 16F

POINT-OF-CYBER-ACCESS CYBER SYSTEM

CROSS REFERENCE TO RELATED APPLICATIONS

This application is a continuation-in-part application claiming priority to U.S. patent application Ser. No. 14/447,283, filed Jul. 30, 2014 entitled "POINT-OF-CYBER-ACCESS CYBER SYSTEM," now allowed, having the same inventor, and which is incorporated herein by reference in its entirety; which application is a continuation application claiming priority to U.S. Ser. No. 13/702,537, now U.S. Pat. No. 8,832,794 (Aronson), filed Mar. 4, 2013, entitled "POINT-OF-CYBER-ACCESS CYBER SYSTEM," having the same inventor, and which is incorporated herein by reference in its entirety, filed as application PCT/US2011/056931 in Oct. 19, 2011, and which is incorporated herein by reference in its entirety; which application is a continuation-in-part application claiming priority to U.S. Ser. No. 12/908,162, filed Oct. 20, 2010, entitled "SINGLE-POINT-OF-ACCESS CYBER SYSTEM, having the same inventor, now abandoned, and which is incorporated herein by reference in its entirety.

FIELD OF THE DISCLOSURE

The present disclosure pertains generally to a configurable system and configurable system components and methods that, together, provide for cyber interactions among individuals and cyber devices. More particularly, the present disclosure pertains to a configurable system, configurable system components, and configurable methods that, together, may be further configured to provide a cyber environment that may provide at least one individual with at least one from features selected from the group consisting of: (a) safe, secure, private cyber interactions with the individual's properly identified cyber devices, (b) safe, secure, private cyber interactions with properly identified others, and (c) safe, secure, private cyber interactions with the properly identified cyber devices of others. In addition, the present disclosure also pertains to systems which may be configured to provide at least one individual with the ability to selectively grant, and/or deny, at least one other, and/or at least one cyber device of at least one other, access to at least one part of the individual's cyber activities, cyber interactions, cyber assets, and cyber resources. The present disclosure pertains to a cyber environment provided by configurable systems disclosed herein which may be configured to provide for interoperable use of: (a) at least one cyber device, (b) cyber content, and (c) cyber programming, throughout the cyber environment.

BACKGROUND OF THE DISCLOSURE

Individuals that access prior art cyber environments have little or no assurance or expectations that prior art cyber environments will provide the individuals with security, privacy, or the ability to accurately grant, and/or deny, others, and/or the cyber devices of others, access to at least one part of at least one from the group consisting of: (a) the individuals' cyber activities, (b) the individuals' cyber interactions, (c) the individuals' cyber assets, and (d) the individuals' cyber resources. In addition, current cyber environments cannot provide individuals with confirmation of the identity of others or confirmation of the identity of cyber devices with whom, through use of the prior art cyber environments, the individuals may interact. Further, prior art cyber environments do not provide for cyber environment-wide interoperable use of any cyber device, cyber programming, or cyber content.

There thus remains a need in the art for a combination of system programming and system devices that provide a safe and secure cyber environment that provides each individual with safety, security, and privacy for the individual's cyber activities, and that also provides accurate and reliable control over others' access to the individual's: (a) cyber activities, (b) cyber interactions, (c) cyber assets, and (d) cyber resources. In addition, need remains in the art for a combination of system programming and system devices that may properly identify each cyber device and each individual that uses the system. Further, a need remains in the art for a combination of system programming and system devices that provide cyber environment-wide interoperable use of any cyber device, cyber programming, and cyber content.

SUMMARY OF THE DISCLOSURE

The present embodiment includes a configurable combination of processes, procedures, programming, system architecture, device architecture, and devices that together may be configured to provide individuals with a safe and a secure cyber environment. Within this safe and secure cyber environment each individual and each cyber device may be properly identified for cyber interactions with others and for cyber interactions with cyber devices. The present embodiment may also be configured to provide individuals with at least one level of privacy that is requested or required by each individual for the individual's cyber activities, cyber assets, and cyber resources. The safe and secure cyber environment of the present configurable embodiment may be further configured to provide for environment-wide interoperable use of any cyber device, cyber programming, or cyber content that may either be configured to be used with the point-of-cyber-access cyber system, or may be converted for use with the point-of-cyber-access cyber system, by processes and procedures that are components of the point-of-cyber-access cyber system.

In one aspect, a point-of-cyber-access cyber system is provided that comprises:
- devices and programming for processing cyber activities;
- devices and programming structured to provide at least one point of cyber access to at least one individual;
- at least one input output device for providing at least one individual with at least one selected from the group consisting of: (a) local, and (b) remote, cyber interaction between the at least one individual and the devices and programming that are providing the at least one individual with at least one point of cyber access;
- devices and programming for providing proper identification of at least one individual and at least one cyber device, wherein the identity of the at least one individual and the at least one cyber device may be at least one selected from the group consisting of: (a) established, (b) verified, and (c) confirmed;
- devices and programming providing at least one cyber communications network; and
- devices and programming providing for carrying out cyber activities among properly identified members selected from the group consisting of: (a) individuals, (b) others, (c) device-based cyber assets, and (d) device-based cyber resources;
- wherein the point-of-cyber-access cyber system has an architecture that defines both the components of the system and the interrelationship of the components, the architecture is comprised of: (a) architectural rules and requirements, (b) devices and programming for establishing and maintaining a cyber environment that provides for complying with and enforcing the architectural rules and requirements, (c) at least one operating system providing operational programming for system devices and components (d) system devices, and (e) system components;

wherein the system architecture includes: (a) at least one point of cyber access computer, (b) at least one cyber communications network, (c) at least one input output device that is constructed, arranged, and interconnected for providing for cyber interactions between at least one individual and at least one selected from the group consisting of: (i) at least one point of cyber access computer, (ii) devices and programming for providing proper identification, and (iii) at least one cyber device that is constructed, arranged, and interconnected for providing for cyber interactions among the at least one cyber device and at least one point of cyber access computer;

wherein the at least one individual may utilize at least one point of cyber access computer, the devices and programming for providing proper identification, at least one input output device, and at least one cyber device, all of which may be interconnected using at least one cyber communications network, all using at least one operating system.

In some embodiments of the foregoing point-of-cyber-access cyber system, at least one point of cyber access computer includes the individual's point of cyber access computer, the individual's point of cyber access computer provides the individual with a point of cyber access, the point of cyber access may at least one member selected from the group consisting of: (a) establish, and (b) confirm, the identity of the sender of at least one cyber interaction prior to providing the sender's at least one cyber interaction with further access to the individual's point of cyber access computer, the individual's point of cyber access computer may further perform at least one step selected from the group consisting of:

(a) provide the at least one individual with privacy and security for at least one selected from the group consisting of: (i) the individual's private cyber activities, (ii) the individual's private cyber assets, and (iii) the individual's private cyber resources wherein the at least one individual's point of cyber access computer is configurable to provide exclusive access, through the individual's point of cyber access computer, to the at least one individual's private cyber activities, private cyber assets, and private cyber resources, and wherein the at least one individual's private cyber activities, private cyber assets and private cyber resources may be further configured to be exclusively accessed by cyber interactions from the at least one individual and the at least one individual's selected device-based cyber assets and device-based cyber resources, and (b) providing the at least one individual with the ability to share at least one of: (i) the individual's selected cyber assets, and (ii) the individual's selected cyber resources, the selected cyber assets and cyber resources provide at least one selected other, and at least one selected cyber device of the at least one selected other with at least one of the at least one individual's selected cyber assets and selected cyber resources;

wherein the at least one individual's selected cyber assets and cyber resources for sharing with selected others and selected cyber devices of selected others may be available to be accessed by cyber interactions from selected others and selected cyber devices of selected others;

wherein the at least one individual's point of cyber access computer is configured such that the at least one individual's publicly available cyber assets and the at least one individual's publicly available cyber resources may be exclusively accessed through the at least one individual's at least one point of cyber access computer; and wherein the at least one individual's publicly available cyber assets and cyber resources may be exclusively accessed by cyber interactions from at least one selected from the group consisting of: (a) at least one properly identified selected other and (b) at least one properly identified selected cyber device of at least one selected other.

In some embodiments of the foregoing point-of-cyber-access cyber system, the at least one individual's point of cyber access computer provides a point of properly identified cyber access for at least one member selected from the group consisting of: (a) cyber communications, (b) cyber activities, (c) cyber assets, and (d) cyber resources.

In some instances, the point-of-cyber-access cyber system has at least one of the properties selected from the group consisting of:

(a) each individual using the point-of-cyber-access cyber system has one and only one unique permanent point-of-cyber-access cyber system identity designation, and (b) each cyber device that is a component of the point-of-cyber-access cyber system has one and only one unique permanent point-of-cyber-access cyber system identity designation.

In some instances, the point-of-cyber-access cyber system has at least one of the properties selected from the group of:

(a) each individual is properly identified prior to at least one step of the cyber interactions taken by the individual throughout the point-of-cyber-access cyber system; and (b) the at least one cyber device is properly identified prior to at least one step taken by the cyber interactions of the at least one cyber device throughout the point-of-cyber-access cyber system.

In some embodiments of the foregoing point-of-cyber-access cyber system, the individual's point of cyber access computer is further comprised of devices and programming providing the individual with the ability to perform at least one selected from the group consisting of: (a) store, (b) access, (c) modify, (d) use, (e) manage, and (f) share, at least one of: (i) the individual's file-based cyber assets, and (ii) the individual's file-based cyber resources.

In some embodiments of the foregoing point-of-cyber-access cyber system, the individual's point of cyber access computer is further comprised of providing at least one selected from the group of:

(a) devices and programming that establish the identity of the individual prior to allowing at least one cyber interaction from the individual to gain further access to the individual's point of cyber access computer;

(b) devices and programming that confirm the identity of each other prior to allowing at least one cyber interaction from each other to gain further access to the individual's point of cyber access computer; and, (c) devices and programming that at least one selected from the group consisting of: (i) establish, and (ii) confirm, the identity of at least one selected cyber device prior to allowing cyber interactions from the at least one cyber device to gain further access to the individual's at least one point of cyber access computer.

In some instances, the individual's point of cyber access computer is further comprised of devices and programming providing for at least one cyber interaction between the individual's point of cyber access computer and at least one selected from the group consisting of: (a) at least one selected properly identified other, and (b) at least one selected properly identified cyber device.

In some embodiments of the foregoing point-of-cyber-access cyber system, after having established the identity of the individual, the individual's point of cyber access computer may then provide verification of the individual's identity prior to at least one additional step that cyber interactions of the individual take throughout the point-of-cyber-access cyber system.

In some embodiments of the foregoing point-of-cyber-access cyber system, the at least one cyber communications network of the point-of-cyber-access cyber system includes: (a) cyber communications network devices, (b) means for functionally interconnecting the cyber communications network devices, and (c) programming.

In some embodiments of the foregoing point-of-cyber-access cyber system, prior to further cyber interaction between the cyber communications network and the at least one individual's at least one point of cyber access computer, the cyber communications network device that first engages in cyber interactions with the at least one individual's at least one point of cyber access computer, as the network device first engages, will at least one selected from the group consisting of: (a) confirm the individual's identity, and (b) establish the identity of the individual's point of cyber access computer.

In some embodiments of the foregoing point-of-cyber-access cyber system, after the cyber communications network device that first engages in cyber interactions with the individual's point of cyber access computer has established the identity of the individual's point of cyber access computer, the device that first engages in cyber interactions may then provide verification of the identity of the individual's point of cyber access computer, as required, or as needed, prior to at least one additional step that the cyber interactions of the individual's point of cyber access computer take throughout the single-point-of-access cyber system.

In some instances, the point-of-cyber-access cyber system is further comprised of devices and programming providing the individual with the ability to at least one selected from the group consisting of: (a) request, and (b) require, that at least one selected other provide the individual with at least one selected level of privacy, the at least one selected level of privacy being selected by the individual.

In some instances, the point-of-cyber-access cyber system is further comprised of the pre-processing of cyber content prior to the cyber content being sent to at least one selected from the group of: (a) at least one input output device, and (b) at least one point of cyber access computer, the pre-processed cyber content being in a form requiring no further processing of the content for use by the at least one input output device, and the at least one point of cyber access computer.

In some instances, the point-of-cyber-access cyber is further comprised of devices and programming that provide system-standard interface and interaction processes and pro- cedures, wherein at least one cyber asset, and at least one cyber resource may be configured to be used as a part of the point-of-cyber-access cyber system by means of the at least one cyber asset's and the at least one cyber resource's, use of the system-standard interface and interaction processes and procedures.

In some instances, the point-of-cyber-access cyber system is further comprised of system-standard processes and procedures that are utilized for minimizing the number of differing processes and procedures used by others by providing system-standard processes and procedures for use by others.

In some embodiments of the foregoing point-of-cyber-access cyber system, the point of cyber access computer is comprised of devices and programming that provide at least one selected from the list of: (a) separate and different processing and support for the group of: (i) the individual's private cyber activities, (ii) the individual's private cyber assets, and (iii) the individual's private cyber resources, and (b) separate and different processing and support for the group of: (i) the individual's public cyber activities, (ii) the individual's publicly available cyber assets, and (iii) the individual's publicly available cyber resources.

In some embodiments of the foregoing point-of-cyber-access cyber system, the individual's point of cyber access computer is comprised of devices and programming providing at least one source of processing and support that is utilized for the purpose of providing at least one selected from the group consisting of: (a) cybersecurity, (b) interoperability, (c) determinations regarding proper identity, and (d) access control, for at least one part of: (i) the individual's private cyber activities (ii) the individual's private cyber assets, and (iii) the individual's private cyber resources, and (e) access control for at least one part of: (i) the individual's public cyber activities (ii) the individual's publicly available cyber assets, and (iii) the individual's publicly available cyber resources.

In some instances, the point-of-cyber-access cyber system's architectural rules and requirements require at least one selected from the group of: (a) each individual must be properly identified prior to each step cyber interactions of each individual take throughout the point-of-cyber-access cyber system, and (b) each cyber device must be properly identified prior to each step cyber interactions of each cyber device take throughout the point-of-cyber-access cyber system.

In some embodiments of the foregoing point-of-cyber-access cyber system, at least one process and at least one procedure may be at least one selected from the group consisting of: (a) added to the point-of-cyber-access cyber system, (b) removed from the point-of-cyber-access cyber system, (c) arranged in at least one functional configuration as a part of the point-of-cyber-access cyber system, and (d) altered in at least one functional way.

In some embodiments of the foregoing point-of-cyber-access cyber system, at least one cyber asset, and at least one cyber resource may be at least one selected from the group consisting of: (a) added to the point-of-cyber-access cyber system (b) removed from the point-of-cyber-access cyber system (c) arranged in at least one functional configuration as a part of the point-of-cyber-access cyber system, and (d) altered in at least one functional way.

In some instances, the point-of-cyber-access cyber system is further comprised of point-of-cyber-access cyber system device architecture wherein at least one selected from the group consisting of: (a) at least one component, (b) at least one process, and (c) at least one procedure, may be at least one selected from the group consisting of: (i) added to at least one cyber device, (ii) removed from at least one cyber device (iii) arranged in at least one functional configuration as part of at least one cyber device, and (iv) altered in at least one functional way.

In some instances, the point-of-cyber-access cyber system is further comprised of at least one selected from the group consisting of:

(a) providing at least one secure interconnected cyber system for use by at least one individual for at least one purpose selected from the group consisting of: (i) the individual's cyber communications, (ii) the individual's cyber interactions, and (iii) the individual's cyber activities;

(b) at least one selected from the group consisting of: (i) at least one process, and (ii) at least one procedure that will at least one selected from the group of (1) provide for complying with, and (2) enforce compliance with, at least one of the point-of-cyber-access cyber system architectural rule or requirement;

(c) an architectural requirement that at least one selected from the group consisting of: (i) each cyber device that is a component of the single-point-of-access cyber system must be properly identified, and (ii) each individual that is using the single-point-of-access cyber system must be properly identified;

(d) providing at least one selected from the group consisting of: (i) at least one locally accessible point of cyber access computer, and (ii) at least one remotely accessible point of cyber access computer, for the at least one individual's use for at least one selected from the group consisting of (1) cyber communications, (2) cyber interactions, and (3) cyber activities, and (e) programming and devices providing the at least one individual with remote access to at least one of the individual's cyber assets and at least one of the individual's cyber resources.

In some embodiments of the foregoing point-of-cyber-access cyber system, the architectural rules and requirements require at least one selected from the group consisting of: (a) each step of a cyber interaction taken by an individual on the system includes: (i) properly identifying the individual and then, (ii) performing the step of the cyber interaction, and (b) each step of a cyber interaction taken by a cyber device on the system includes: (i) properly identifying the cyber device and then, (ii) performing the step of the cyber interaction.

In some instances, the point-of-cyber-access cyber system is further comprised of at least one member selected from the group consisting of: (a) at least one cyber asset manager, (b) at least one cyber telephone system, (c) at least one cyber vault, (d) at least one private computer, (e) at least one public computer, (f) at least one cyber license system, (g) at least one universal interactive operating system, and (h) at least one group of processes and virtual devices that may be used for at least one purpose selected from the group consisting of: (i) security, (ii) interoperability conversion, and (iii) altering cyber images.

In some embodiments of the foregoing point-of-cyber-access cyber system, the devices and programming that are structured to provide the at least one individual with at least one point of cyber access will provide the at least one individual with safe, secure access to at least one member selected from the group consisting of: (a) cyber communications, (b) computing capabilities, (c) cyber activities, (d) cyber interactions, (e) cyber assets, and (f) cyber resources.

BRIEF DESCRIPTION OF THE DRAWINGS

A better knowledge of the system, the components of the system, and the methods of the present disclosure may be gained by referring to the drawing figures that illustrate particular non-limiting embodiments of the architecture, components, and functions of the disclosed, configurable, point-of-cyber-access cyber system.

FIGS. 16A-16F are illustrations of one of a particular, non-limiting embodiment of a two-screen input output device that may be configured for use in multiple forms in accordance with the teachings herein.

DETAILED DESCRIPTION OF THE DISCLOSURE

Figure 1:
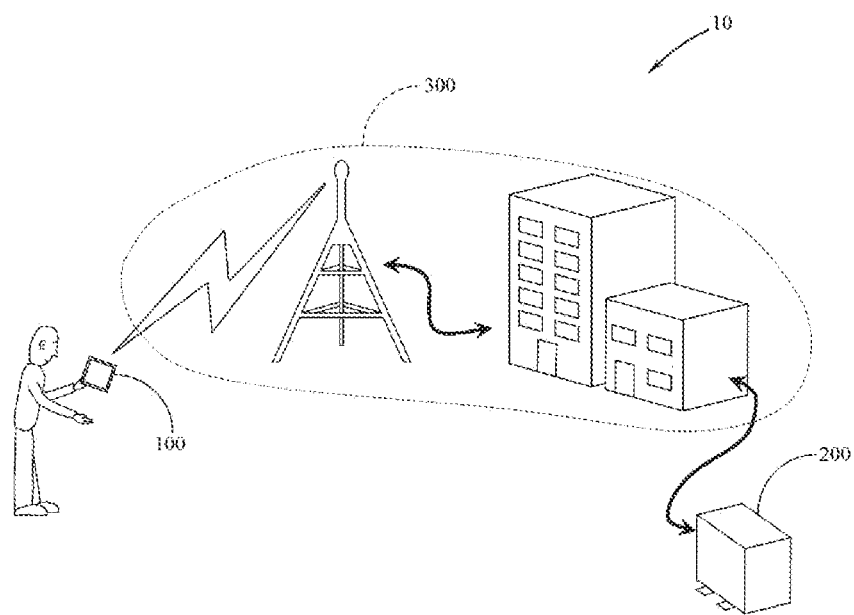
FIG. 1 is an overview diagram that illustrates a particular, non-limiting embodiment of a point-of-cyber-access cyber system in accordance with the teachings herein.

The following Detailed Description of the Disclosure is organized as follows:

| Section No. | Title | Paragraph |
|---|---|---|
| 1 | Key Definitions | [0052] |
| 2 | General Definitions | [0071] |
| 3 | Advantages | [0101] |
| 4 | Short Overview | [0123] |
| 5 | Expanded Overview | [0139] |
| 6 | Point-Of-Cyber-Access Cyber System Architecture | [0192] |
| 7 | Universal Interactive Operating System | [0207] |
| 8 | Cyber Communications Network | [0352] |
| 9 | Input Output Device | [0370] |
| 10 | Cyber Communications Network Between An Input/Output Device And A Point Of Cyber Access Computer | [0427] |
| 11 | Point Of Cyber Access Computer | [0433] |
| 12 | Cyber Telephone System | [0457] |
| 13 | Cyber Communications Network Between A Sender's Point Of Cyber Access Computer And A Recipient's Point Of Cyber Access Computer | [0467] |
| 14 | An Individual's Cyber Asset Manager And The Individual's Device-Based Cyber Assets | [0476] |
| 15 | Cyber Communications Network Between An Individual's Cyber Asset Manager And The Individual's Remote Device-Based Cyber Assets | [0491] |
| 16 | Examples Of Use Of The Point-Of-Cyber-Access Cyber System | [0500] |

(1) Key Definitions

The following meanings and definitions for key words and key phrases shall be used when key words and phrases from this list occur throughout this patent application.

Cyber: at least one activity, device, system, process, procedure, or file that uses non-biological processing of programming for at least one purpose.

Cyber activities: an individual's, and/or a cyber device's, use of at least one component or resource of the point-of-cyber-access cyber system.

Private cyber activities: an individual's use of at least one from the group consisting of: (a) at least one component, (b) at least one cyber asset, and (c) at least one cyber resource, of the point-of-cyber-access cyber system, wherein all others and the cyber devices of all others may be excluded from access to at least one from the group consisting of: (i) the individual's private cyber activities, (ii) the individual's private cyber assets, and (iii) the individual's private cyber resources.

Public cyber activities: an individual's use of at least one of the individual's cyber assets, and/or cyber resources, wherein the individual selects to temporarily or permanently share at least one part of the individual's cyber assets, and/or cyber resources, with at least one selected other, and/or at least one selected cyber device of at least one selected other.

Cyber assets: an individual's cyber devices, and/or cyber files.

Device-based cyber assets: an individual's cyber devices.

File-based cyber assets: an individual's cyber files, and/or programming.

Cyber content: cyber files, and/or programming, that may be utilized by an individual through the individual's use of at least one component of the point-of-cyber-access cyber system.

Cyber device: a physical device or a virtual device or at least one combination thereof that directly or indirectly uses non-biological processing of programming to achieve at least one purpose or function.

Cyber resource: at least one part, of the cyber assets of at least one other that have been made available by the at least one other for access and use by at least one selected individual, and/or at least one selected cyber device of at least one selected individual. The cyber assets that an other makes available to at least one individual may be considered to be the cyber resources of the at least one individual.

Individual: any one person, or any entity, that has its own point-of-cyber-access cyber system identity designation.

Entity: any business, government, school, organization, or other group of at least one person that has its own point-of-cyber-access cyber system identity designation.

Identity designation: The point-of-cyber-access cyber system name of an individual, and/or the point-of-cyber-access cyber system name of a device that is a component of the point-of-cyber-access cyber system. The point-of-cyber-access cyber system architectural rules require that each individual that uses the point-of-cyber-access cyber system, and that each cyber device that is a component of the point-of-cyber-access cyber system, have one, and only one, permanent point-of-cyber-access cyber system identity designation. An individual's point-of-cyber-access cyber system identity designation, and/or a cyber device's point-of-cyber-access cyber system identity designation, may also be considered to be their point-of-cyber-access cyber system name.

Established identity: the step in the point-of-cyber-access cyber system identification process wherein, using at least one reliable identity test, the identity of an individual, and/or the identity of a cyber device is first established.

Verified identity: the cyber device that establishes the identity of an individual, and/or a different cyber device, may then provide reliable verification of the identity of the individual, and/or the different cyber device, during at least one part of the individual's, and/or the cyber device's further cyber interactions.

Confirmed identity: an individual, and/or of a first cyber device, whose identity has been verified may then have its verified identity status confirmed by a second cyber device through the utilization of at least one reliable identity confirmation test, process, or procedure.

Properly identified: an individual and/or a cyber device whose identity has a status selected from the group consisting of: (a) established, (b) verified, and (c) confirmed, as required by at least one from the group consisting of: (i) point-of-cyber-access cyber system processes, (ii) point-of-cyber-access cyber system procedures, (iii) point-of-cyber-access cyber system protocols, (iv) point-of-cyber-access cyber system architectural rules, and (iv) point-of-cyber-access cyber system architectural requirements.

Programming: computer programs or applications or at least one usable part thereof that serve at least one purpose.

(2) General Definitions

The following meanings and definitions for words and phrases shall be used when words and phrases from this list occur throughout this patent application.

And/or: at least one selected from the list of: (a) "and", and (b) "or".

Operational access: accessing a cyber device for the purpose of operating the cyber device.

Administrative access: accessing a cyber device for the purpose of interacting with at least one of the administrative functions of the cyber device.

Cyber access: access, in at least one form, to at least one from the group consisting of: (a) at least one cyber device, (b) at least one cyber asset, (c) at least one cyber resource, and (d) at least one cyber activity.

Point-of-cyber-access address: the point-of-cyber-access cyber system's locational designation for the location of a cyber device.

Cyber identity: at least one cyber file that contains at least one cyber characteristic of one individual, and/or one cyber device, that may be used during at least one identity test to safely, securely, and accurately establish and/or confirm the identity of the one individual, and/or the identity of the one cyber device.

Computer: a physical or virtual device, or at least one combination thereof, that uses at least one from the group consisting of: (a) at least one processor, (b) memory, (c) storage, (d) at least one user interface, and (e) at least one interconnection structure, to at least one from the group consisting of: (i) process, (ii) access, (iii) store, (iv) modify, (v) run, (vi) use, (vii) share, (viii) delete, and (ix) copy, cyber programming, files, code, and/or data.

Point of cyber access: a combination of devices and programming that are configured to provide an individual with a point of cyber access. The individual's point of cyber access provides the individual with proper-identity-based access controls for: (a) the individual, (b) others, and (c) cyber devices, and proper routing thereafter. The individual's point of cyber access may at least one from the group consisting of: (i) establish the identity of the individual prior to granting the individual further access to at least one part of the individual's cyber assets, and/or cyber resources, (ii) establish, and/or confirm, the identity of at least one other as the sender of at least one cyber interaction prior to providing the other's at least one cyber interaction with further access to the individual's cyber assets and/or cyber resources, and (iii) establish, and/or confirm, the identity of at least one cyber device as the sender of at least one cyber interaction prior to providing the cyber device's at least one cyber interaction with further access to the individual's cyber assets and/or cyber resources.

Point of cyber access computer: an individual's locally, and/or remotely, accessible computer that provides the individual with proper-identity-based cyber access control services and at least one member selected from the group consisting of: (a) cyber assets that provide processing, and/or support, for at least one from the group consisting of: (i) the individual's private cyber activities, (ii) the individual's private cyber assets, and (iii) the individual's private cyber resources, and (b) cyber assets that provide processing, and/or support, for at least one from the group consisting of: (i) the individual's public cyber activities, (ii) the individual's publicly available cyber assets, and (iii) the individual's publicly available cyber resources.

Private computer: an individual's locally, and/or remotely, accessible point-of-cyber-access cyber system computer that may be an integral part of, and/or work in conjunction with, an individual's point of cyber access computer. An individual's private computer may be configured to where it may only be accessed through utilization of the proper-identity-based cyber access control services of the individual's point of cyber access computer. An individual's private computer may be configured to where it may only be accessed by the individual, and/or at least one of the individual's selected device-based cyber assets.

Public computer: an individual's locally, and/or remotely, accessible point-of-cyber-access cyber system computer that may be an integral part of, and/or work in conjunction with, an individual's point of cyber access computer. A public computer may be configured to where it may be accessed by the cyber interactions of specified others, and/or the cyber interactions of specified device-based cyber assets, and/or device-based cyber resources of specified others. An individual's public computer may be configured to where it may only be accessed through utilization of the proper-identity-based cyber access control services of the individual's point of cyber access computer.

Cyber communications: use of at least one from the group consisting of: (a) point-of-cyber-access cyber system telephone services, (b) point-of-cyber-access cyber system video telephone services, (c) point-of-cyber-access cyber system mail services, (d) point-of-cyber-access cyber system message services, and (e) point-of-cyber-access cyber system cyber interaction transfer services.

Cyber communications network: at least one point-of-cyber-access cyber system communications network (communications nodes and paths). The at least one point-of-cyber-access cyber system cyber communications network may be configured to provide for the safe and secure interconnected transfer of cyber interactions between cyber devices.

Cyber files: at least one file that require non-biological processing of content, and/or programming, and/or at least one file that may be utilized by at least one cyber device.

Cyber interaction: at least one exchange of cyber activity among at least one selected from the group consisting of: (a) at least one cyber device, (b) at least one component of at least one cyber device, and (c) at least one component of the point-of-cyber-access cyber system.

Cyber System: at least one physical system or virtual system or combination thereof that uses non-biological processing of programming to achieve at least one purpose or function.

Cyber telephone device: at least one input output device that is configured to send and receive cyber telephone communication interactions, and/or cyber video telephone communication interactions.

Cyber vault: a cyber vault enables an individual to exclude all others and the cyber devices of all others from gaining access to the contents of the individual's cyber vault. Cyber files and cyber devices including computers may be contained within the constructs of a cyber vault. The cyber contents of an individual's cyber vault may include at least one part of the individual's: (a) cyber assets, (b) cyber resources, (c) cyber activities, and (d) personal, and/or private, information. An individual's private computer may be configured to form the construct of an individual's cyber vault. An individual may utilize at least one cyber vault.

Cyber site: the point-of-cyber-access cyber system equivalent of a prior art internet web site.

Device: a mechanical device or a cyber device or at least one combination thereof. A cyber device may be a virtual device or a physical device, or at least one combination thereof.

Frames and scrolls format: a format for creating and using interactive image-based cyber content that uses the x y pixel grid location of a cursor from a specific frame formatted image or the x y pixel grid location of a cursor from a specific scroll formatted image to identify the location of an individual's interaction with the specific image.

Frame: cyber image content that has a pixel grid size that is equal to or less than both the height and the width of the pixel grid size of the cyber image display device the image will be displayed upon.

Scroll: cyber image content that has a pixel grid height, and/or a pixel grid width, that is larger in size than the corresponding pixel grid height, and/or pixel grid width, of the cyber image display device the image will be displayed upon.

Input output device: a cyber input device or a cyber output device or at least one combination thereof.

Thin device: a cyber device that is purposefully configured to provide for limited functionality. For example: a thin input output device may only provide the minimum functions and resources that are needed for: (a) the operation of the thin input output device, and (b) providing for limited specific use of the thin input output device. A thin input output device may rely on a sender of a cyber interaction to provide the device with cyber interactions that are pre-processed and ready for use without any further processing of interaction content by the thin input output device.

Pre-processed cyber interaction: a cyber interaction whose content has been processed to where it is in a state where it may be used without the further processing of content.

System: more than one process, procedure, or device that are configured together to perform or provide at least one function.

Manage: the act of at least one from the group consisting of: (a) storing, (b) accessing, (c) using, (d) modifying, (e) making available to others, (f) copying, (g) deleting, (h) moving, (i) naming, and (j) renaming, at least one cyber file.

Others: at least one individual that is not utilizing the resources of the point-of-cyber-access cyber system in the role of "the individual", "an individual", "at least one individual", or "said individual".

User: an individual that uses the point-of-cyber-access cyber system.

(3) Advantages

Prior art cyber systems have many significant problems. The most significant of these problems is that the prior art systems cannot provide adequate and reasonable levels of safety, security, and privacy.

To that point, it is important to recognize that prior art cyber systems are not capable of accurately and reliably identifying one single person while that person is using cyber assets or resources. This, in turn, leads to the prior art system's inability to accurately and reliably hold at least one individual accountable for that individual's own cyber activities.

Further, if an individual's cyber assets are unable to accurately and reliably identify the individual as always being one, and only one, specific and unique individual, then the individual's cyber assets are also unable to accurately and reliably keep impostors from gaining access to the individual's personal and private cyber information, cyber assets, and cyber resources.

The configurable point-of-cyber-access cyber system of the present disclosure, through configurable use of its processes, procedures, architecture, programming, and devices, may be configured to incorporate the system-wide use of accurate and reliable identity testing as a tool to provide each and every individual with not only extremely high levels of cyber safety, security, and privacy while using cyber assets or cyber resources of at least one kind, but also with absolute cyber safety, security, and privacy for each individual's own personal and private cyber activities, cyber assets, and cyber resources.

The configurable point-of-cyber-access cyber system of the present disclosure, through configurable use of its processes, procedures, architecture, programming, and devices, may be configured to incorporate the system-wide use of accurate and reliable identity testing as a tool to provide each and every individual with not only extremely high levels of cyber safety, security, and privacy while using cyber assets or cyber resources of at least one kind, but also with absolute cyber safety, security, and privacy for each individual's own personal and private cyber activities, cyber assets, and cyber resources. Suitable systems and methodologies for implementing such identity testing are disclosed in commonly owned U.S. Ser. No. 15/071,075 (Aronson), entitled "SCALABLE UNIVERSAL FULL SPECTRUM CYBER DETERMINING MACHINE", which was filed on Mar. 15, 2016, and which is incorporated herein by reference in its entirety.

The use of accurate and reliable identity testing alone will not provide the highest attainable levels of cyber safety, security, and privacy.

The prior art system's unbelievably complex environment also contributes greatly to its inability to provide each individual with adequate and reasonable levels of cyber safety, security, and privacy.

The point-of-cyber-access cyber system of the present disclosure may be configured to use a strategy of using a best performing blend of: (a) as simple as possible (b) as concise as possible, and (c) as efficient as possible. This strategy may be applied to all aspects of the cyber system.

Use of a best performing blend of simple, concise, and efficient as possible as a strategy enables the point-of-cyber-access cyber system of the present disclosure to be configured to achieve the highest levels of cyber safety, security, and privacy that may be obtained. Through use of the point-of-cyber-access cyber system, the unbelievably complex environments that have always plagued prior art cyber systems may be eliminated.

One example of the point-of-cyber-access cyber system's use of as simple, as concise, and as efficient as possible, is its architecture. This architecture may be configured to integrate one or more from the group consisting of: (a) at least one cyber activity, (b) utilization of at least one cyber asset, and (c) utilization of at least one cyber resource into the operation of one single computer. This one computer may provide for at least one device selected from the group consisting of: (i) phones (ii) televisions (iii) computing devices, (iv) remote device integration devices, (v) personal health devices, and (vi) at least one other type of cyber device, to operate as a part of one system that may be configured to use a universal interactive operating system that is as simple, as concise, and as efficient as possible.

Perhaps the greatest benefit at least one individual may gain from their use of their cyber assets and available cyber resources is the benefit that may be derived by first collecting, and then using, the individual's own personal and private information. This cyber function may, among many other things, provide the individual with technology-based augmentation of the individual's own natural cognitive and perceptive capabilities. An individual's use of cyber assets and cyber resources for the purpose of augmenting the individual's own natural cognitive and perceptive capabilities is similar in concept to an individual's use of an automobile to augment the individual's own natural ability to move from one location to another.

Further, each individual may also derive benefit from the use of their own body of collected information when the individual's cyber assets use the information to predict, and be prepared to provide for, whatever cyber assets or cyber resources the individual may want or need, both now and in the future.

The point-of-cyber-access cyber system of the present disclosure may be configured to provide for each individual to have absolute safety, security, and privacy for all personal and private computing activities, cyber assets, and cyber resources.

To achieve the highest levels of cyber safety, security, and privacy for an individual, it is essential and of utmost importance that no others ever gain access to an individual's: (a) personal and private cyber activities, and (b) cyber assets.

The following six concepts, that may be embodied in at least one configuration of the point-of-cyber-access cyber system, together solve the majority of the problems of prior art cyber systems. In addition, the following 6 concepts that may be embodied in at least one configuration of the disclosed point-of-cyber-access cyber system may also be configured to solve many of the existing problems with prior art cyber environments.

1. Each cyber device, and each individual that uses the disclosed point-of-cyber-access cyber system, should be required to be properly identified.

2. Each individual that uses the disclosed point-of-cyber-access cyber system should have his or her identity established by the individual's at least one remotely accessible point of cyber access computer.

3. Each individual that uses the disclosed point-of-cyber-access cyber system should gain access to the point-of-cyber-access cyber system exclusively through the individual's at least one point of cyber access computer.

4. The at least one point of cyber access computer of each individual should utilize: (a) at least one separate and different computer for the processing and support for the group of the individual's private cyber activities, the individual's private cyber assets, and the individual's private cyber resources, and (b) at least one separate and different computer for the processing and support for at least one selected from the group of: (a) the individual's public cyber activities, (b) the individual's publicly available cyber assets, and (c) the individual's publicly available cyber resources.

5. Each individual should have exclusive access to the part of the individual's own at least one point of cyber access computers that provides processing and support for the individual's private cyber activities, private cyber assets, and private cyber resources.

6. The disclosed point-of-cyber-access cyber system should provide for any cyber content, cyber programming, and cyber devices to operate seamlessly when being used as a part of the disclosed point-of-cyber-access cyber system.

(4) Short Overview

A simplified graphic representation of the disclosed point-of-cyber-access cyber system appears in FIG. 1, wherein an individual is shown using an input output device. By use of the input output device, a cyber interaction from the individual gains access to, and is transferred through, the cyber communications network, and to one of the individual's at least one point of cyber access computers. There, the individual's identity may be properly established prior to the individual's cyber interaction gaining further access to the individual's point of cyber access computer. After having gained access to one of their own at least one point of cyber access computer, the individual, through the individual's cyber interactions with an input output device, may engage in at least one of: (a) private cyber activities, and (b) public cyber activities. Private cyber activities may be configured to be for the individual's use only. Public cyber activities involve at least one other. By use of a properly configured version of the disclosed system, the individual may have complete access control over cyber interactions from others. Further, utilizing a properly configured version of the disclosed system, the individual may have complete control over the selected cyber resources that the individual makes available to share with selected others. When utilizing a properly configured version of the disclosed point-of-cyber-access cyber system, interoperability resources may enable the integration of use of, and/or interactions with, at least one cyber device.

A preferred embodiment of the disclosed point-of-cyber-access cyber system may be configured to require that each individual be properly identified prior to at least one step that the individual's cyber interactions carry out throughout the point-of-cyber-access cyber system. The disclosed point-of-cyber-access cyber system may further be configured to require that each cyber device be properly identified prior to at least one step that the cyber device's cyber interactions carry out throughout the point-of-cyber-access cyber system. Use of these identification requirements for the individual and for cyber devices may provide a safe, secure cyber environment for all that use at least one properly configured versions of the point-of-cyber-access cyber system. Utilization of these identification requirements for all individuals and for all cyber devices may be necessary to enable the disclosed point-of-cyber-access cyber system to provide every individual with the ability to have a full range of cyber personal rights as well as a full range of cyber property rights.

A preferred embodiment of the disclosed point-of-cyber-access cyber system provides at least one portal where an individual may gain access to at least one item selected from the group consisting of: (a) cyber interactions, (b) cyber communications, (c) the individual's cyber assets, and (d) the individual's cyber resources. By providing an individual with at least one portal for safe and secure access to at least one from the group consisting of: (a) at least one cyber interaction (b) at least one cyber communication (c) at least one cyber activity (d) at least one of the individual's cyber assets, and (e) at least one of the individual's cyber resources may enable the individual to enjoy significant advantages over prior art cyber systems and prior art communications systems.

In a preferred embodiment, the point-of-cyber-access cyber system disclosed herein may be configured to provide a standard set of cyber processes and cyber procedures for interconnected cyber interactions with cyber devices. This feature of the point-of-cyber-access cyber system may provide at least one device, or at least one cyber device, with the ability to be easily configured to be used as an component of the point-of-cyber-access cyber system.

The architectures, devices, processes, and procedures of the point-of-cyber-access cyber system may be configured to provide a private, safe, secure cyber environment for use by an individual. The provision of a private, safe, secure cyber environment for an individual's cyber activities is essential in order for cyber personal rights, cyber property rights, and cyber privacy rights to be provided for an individual.

As compared to prior art cyber systems, where most computer programs use their own unique processes, procedures, and programming, in a preferred embodiment, the point-of-cyber-access cyber system of the present disclosure may be configured to provide the computer programs of others with the use of standard point-of-cyber-access cyber system processes, procedures, and programming. The others' exclusive use of standard point-of-cyber-access cyber system processes, procedures, and programming may provide enormous advantages over prior art systems in the areas of cyber system security, cyber system safety, cyber system interoperability, cyber system interconnectivity, and overall cyber system simplicity.

Through an individual's exclusive use of the individual's private computer that is configured within the individual's point of cyber access computer, the disclosed point-of-cyber-access cyber system may provide the individual with the ability to safely, securely, and privately store, access, modify, use, share, and manage the individual's cyber-based information, the individual's file-based cyber assets, and the individual's file-based cyber resources. This use of the individual's properly configured private computer may create a cyber environment where cyber-based information, file-based cyber assets, and file-based cyber resources of an individual may attain long-term value that is similar to the long term value of their physical counterparts.

The disclosed point-of-cyber-access cyber system may be configured to provide an individual with the ability to selectively, safely, securely, and privately share at least one part of, the individual's cyber-based information, cyber assets, and cyber resources, with at least one selected other. Utilization of the features of at least one possible configuration of the point-of-cyber-access cyber system may provide an individual with the ability to have full control over access by others to at least one part of, the individual's cyber-based information, the individual's cyber assets, and the individual's cyber resources.

The point-of-cyber-access cyber system may be configured to require that cyber interactions be sent to a recipient as pre-processed content. This may drastically reduce the recipient's need for inbound content processing resources that are needed, and/or cyber communications network resources that are needed, for the transfer of interconnected cyber activities and cyber interactions.

The disclosed point-of-cyber-access cyber system's use of pre-processed image-based cyber interactions may eliminate the recipient's risk of receiving malicious content in a cyber file that would need to be processed into ready to use content by the recipient.

The disclosed point-of-cyber-access cyber system may include at least one thin input output device for use by at least one individuals. A thin input output device provides an individual with the ability to gain safe and secure remote access to at least one of the individual's at least one point of cyber access computer. The individual's at least one point of cyber access computer may be configured to where, after having been properly identified, the individual may gain access to the individual's cyber assets and cyber resources such as the individual's cyber telephone system, the individual's cyber interactions with others, and the individual's cyber interactions with the individual's cyber assets and cyber resources. The thin input output device may provide the individual with interconnected cyber interactions with the individual's remote point of cyber access computer.

The thin input output device may be configured to provide maximum utility and mobility for the individual's use of the point-of-cyber-access cyber system. This is because the thin input output device may be configured to provide the individual with the ability to locally or remotely gain safe, secure, and private access to at least one device selected from the group consisting of: (a) the individual's point of cyber access computer, (b) the individual's private computer, (c) the individual's public computer, (d) the individual's device-based cyber assets, and (e) device-based cyber resources that are available to the individual. Furthermore, the thin input output device may be configured to require the minimum possible amount of physical componentry at the location of the individual.

The disclosed point-of-cyber-access cyber system may be configured to provide for a complete and full-featured cyber system that is nonetheless less complex than prior art systems. This alters the need found in prior art systems for more computer processing capabilities for use with future cyber system enhancements and improvements. Use of the disclosed point-of-cyber-access cyber system may eliminate the need for development of bigger, better, faster, and more capable cyber processors. Encryption is the backbone of prior art cyber security. However, bigger, better, faster, more capable cyber processors may eventually have capabilities to regularly decipher encrypted cyber files, thereby overcoming encryption-based prior art cyber security and cyber privacy measures.

The ability of the disclosed point-of-cyber-access cyber system to convert cyber content and cyber interactions to and from a universal interactive operating system standard format provides any cyber device, cyber content, cyber interaction, or cyber activity that does not use the universal interactive operating system, with the interoperable ability to interact with an individual at an input output device or to interact with, and/or be utilized by, at least one cyber device that uses the universal interactive operating system. The at least one conversion process that may be included as a component of the disclosed point-of-cyber-access cyber system may be configured to assure that cyber devices, cyber content, cyber interactions, and cyber activities, that utilize the universal operating system standard format or that may be converted to utilize the universal interactive operating system standard format, will not become obsolete.

As an example, the cyber processes and cyber procedures of the universal interactive operating system, through use of captured video images, may translate a very old and generally obsolete form of communication (such as, for example, Native American Indian smoke signals) into text messages, voice messages, system commands, or cyber files.

As a further example, digital photos that were stored in cyber files using a prior art format from the late 1980's may be converted for interoperable use by the universal interactive operating system component of the point-of-cyber-access cyber system. Therefore, the digital photos in a late 1980's cyber format may be used by an individual as long as the universal interactive operating system component of the point-of-cyber-access cyber system is available for use by the individual.

(5) Expanded Overview

In a preferred embodiment, the point-of-cyber-access cyber system disclosed herein is a combination of processes, procedures, programs, system architecture, device architecture, and cyber devices that together may be configured to provide a safe and secure cyber environment for at least one individual. In this environment, an individual may have interoperable access to at least one desired and available cyber function. In addition, the disclosed point-of-cyber-access cyber system may be configured to provide the individual with complete cyber privacy for the individual's personal and private cyber activities. Also, the disclosed point-of-cyber-access cyber system may be configured to provide the individual with varying levels of cyber privacy as specified by the individual for the individual's public cyber activities.

As shown in FIG. 1, one possible configuration of the point-of-cyber-access cyber system 10 includes three primary components. These primary components are: (a) at least one input output device 100, (b) at least one point of cyber access computer 200, and (c) at least one cyber communications network 300.

Figure 2:
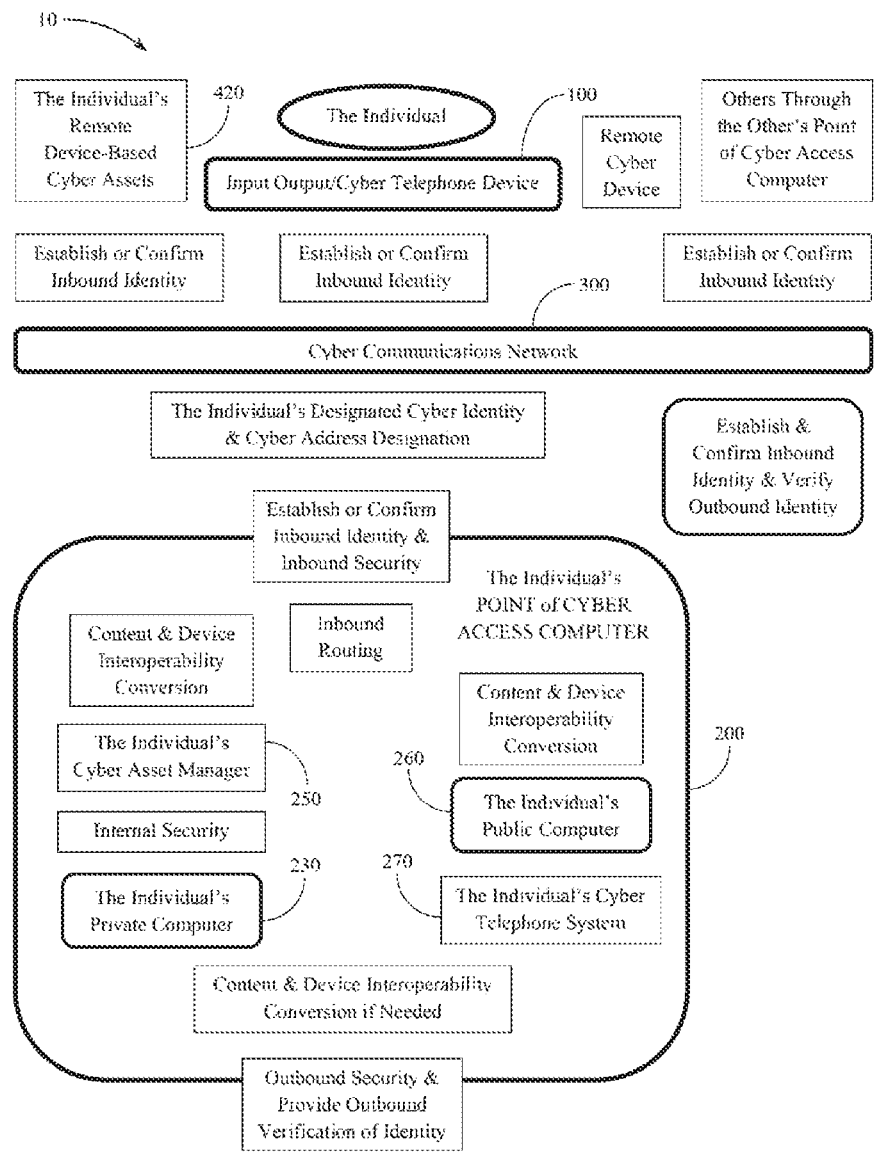
FIG. 2 is a schematic block diagram that illustrates a particular, non-limiting embodiment of an architecture and architectural components of a point-of-cyber-access cyber system in accordance with the teachings herein.

The architecture of the point-of-cyber-access cyber system 10 shown in FIG. 2 is configured to provide a simple, concise, safe, and secure array of efficient paths for cyber interactions among at least one device, and/or party, selected from the group consisting of: (a) at least one individual, (b) at least one cyber asset, (c) at least one cyber resource, and (d) at least one other.

Some significant cyber device architectural features and system architectural features that make up the point-of-cyber-access cyber system 10 may include:
 (a) integration of an individual's private and public interconnected cyber activities into one safe and secure system;
 (b) integration of an individual's private and public cyber activities and cyber interactions into the operations of one configuration of a point of cyber access computer 200; and
 (c) at least one point of cyber access computer 200.

Figure 13:
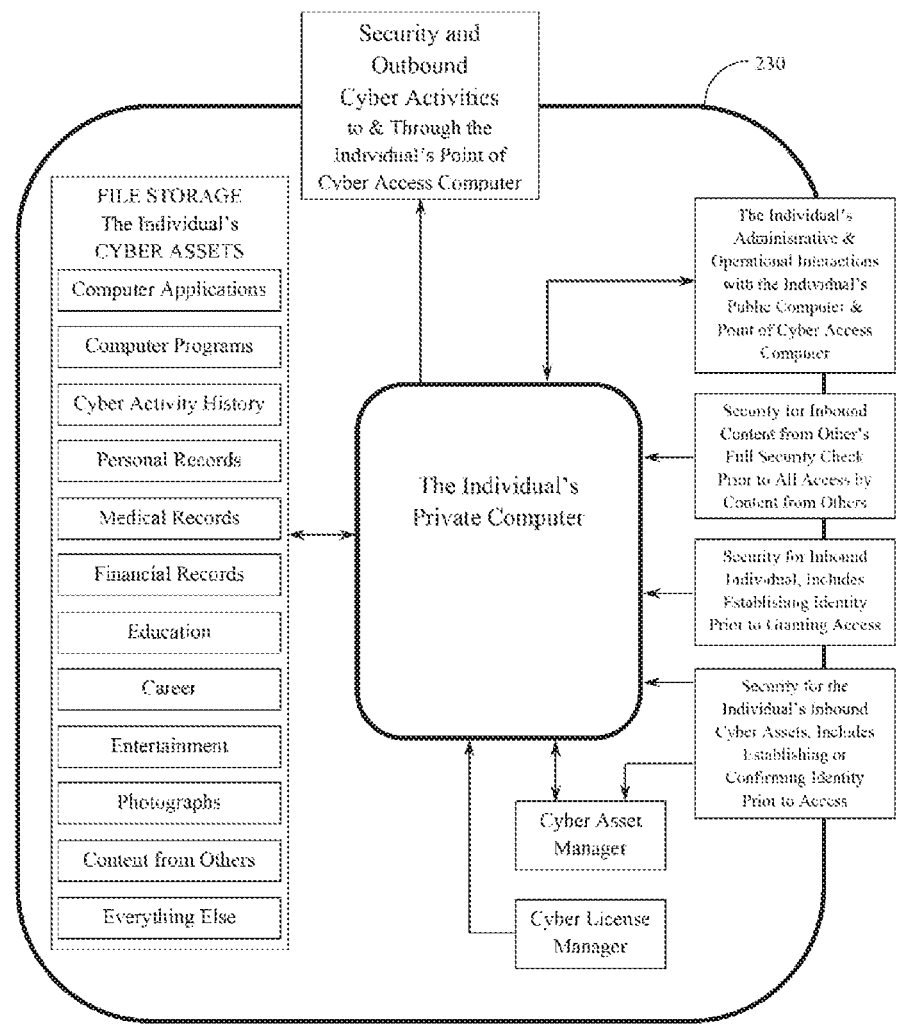
FIG. 13 is a schematic diagram that illustrates a particular, non-limiting embodiment of an individual's private computer in accordance with the teachings herein, as well as components, interconnections, and associated cyber activities that may occur within the individual's private computer.
Figure 14:
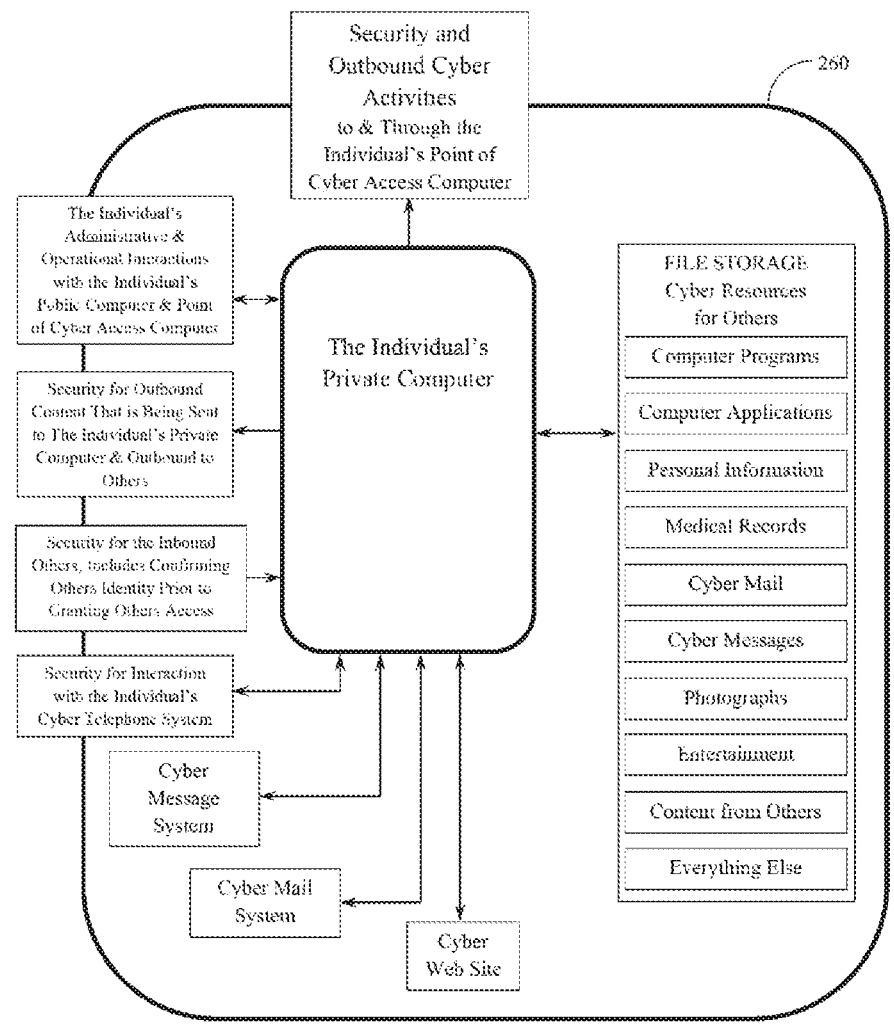
FIG. 14 is a schematic diagram that illustrates a particular, non-limiting embodiment of an individual's public computer in accordance with the teachings herein as well as components, interconnections, and associated cyber activities that may occur within the individual's public computer.
Figure 15:
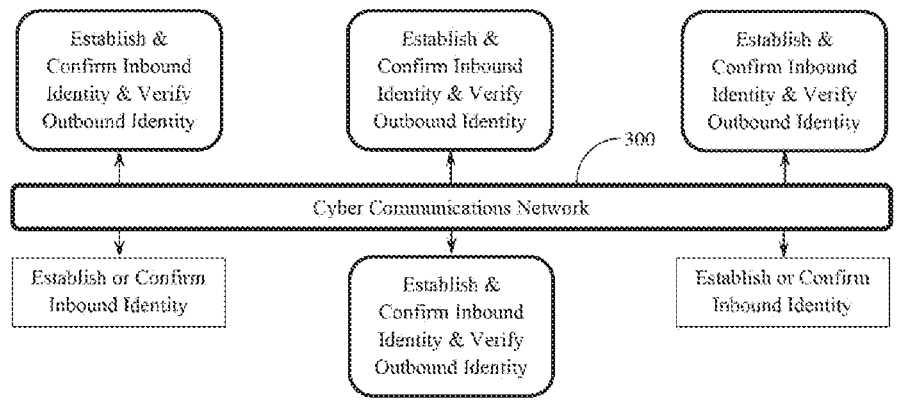
FIG. 15 is a schematic diagram that illustrates a particular, non-limiting embodiment of a cyber communications network of a point-of-cyber-access cyber system in accordance with the teachings herein.

A still better understanding of the systems disclosed herein may be gained by appreciating that the individual's at least one point of cyber access computer may be configured to include a separate private computer 230 shown in more detail in FIG. 13 and a separate public computer 260 (shown in more detail in FIG. 14). The separate private computer 230 may be configured to provide separate processing and support for a combination of the individual's private cyber activities, the individual's private cyber assets, and the individual's private cyber resources. The separate public computer 260 may be configured to provide separate and different processing and support for the combination of the individual's public cyber activities, the individual's publicly available cyber assets, and the individual's publicly available cyber resources.

The individual's separate private computer 230 may also be configured to serve as a cyber vault. By functioning as a cyber vault, the individual's private computer 230 may provide the individual with safety, security, and privacy for all of: (a) the individual's personal and private cyber activities (b) the individual's private cyber assets, and (c) the individual's private cyber resources that are within the constructs of a properly configured cyber vault. The individual's separate public computer 260 may be configured to provide for cyber interactions between the individual and at least one other.

As shown in FIGS. 1 and 2, the point-of-cyber-access cyber system 10 may be configured to include at least one secure thin input output device 100. This thin input output device 100 may provide for remote cyber interactions between an individual and the individual's point of cyber access computer 200.

The point-of-cyber-access cyber system 10 may provide for storage of a lifelong collection of the individual's file-based cyber assets.

The primary processes, procedures, and programs that may be utilized to make up at least one configuration of a preferred embodiment of the point-of-cyber-access cyber system 10 are:
 (a) system-wide processes and procedures that identify each cyber device and each individual that is interacting with the disclosed point-of-cyber-access cyber system;
 (b) a system-wide requirement that each individual using the disclosed point-of-cyber-access cyber system be properly identified prior to each step the cyber interactions of the individual carry out throughout the point-of-cyber-access cyber system;
 (c) a system-wide requirement that each cyber device using the disclosed point-of-cyber-access cyber system be properly identified prior to each step each cyber interaction of each cyber device carries out throughout the point-of-cyber-access cyber system;
 (d) a universal interactive operating system;
 (e) a process for creating and using interactive cyber content;
 (f) a process for providing cyber content interoperability by translating cyber content to and from a point-of-cyber-access cyber system standard cyber content format;
 (g) a procedure that provides for a sender to send only pre-processed image-based cyber content to a recipient;
 (h) a process for providing interoperability that translates cyber interactions to and from a point-of-cyber-access cyber system standard format;
 (i) separate processing and support by a separate private computer for the private cyber activities of the individual, and separate processing and support by a separate public computer for public cyber activities of the individual;
 (j) processes and procedures that exclude cyber interactions from all others and cyber interactions from the cyber devices of all others from gaining access to the individual's private computer;
 (k) processes and procedures that provide an individual with exclusive and complete administrative control, operational control, and access control of the individual's point of cyber access computer, the individual's public computer, the individual's private computer, the individual's cyber assets, and the individual's cyber resources; and (l) processes and procedures for providing an individual with the ability to selectively grant, and/or selectively deny, at least one specified other access to at least one part of the individual's point of cyber access computer, the individual's cyber telephone system, the individual's public computer, the individual's cyber assets, and the individual's cyber resources.

Figure 3:
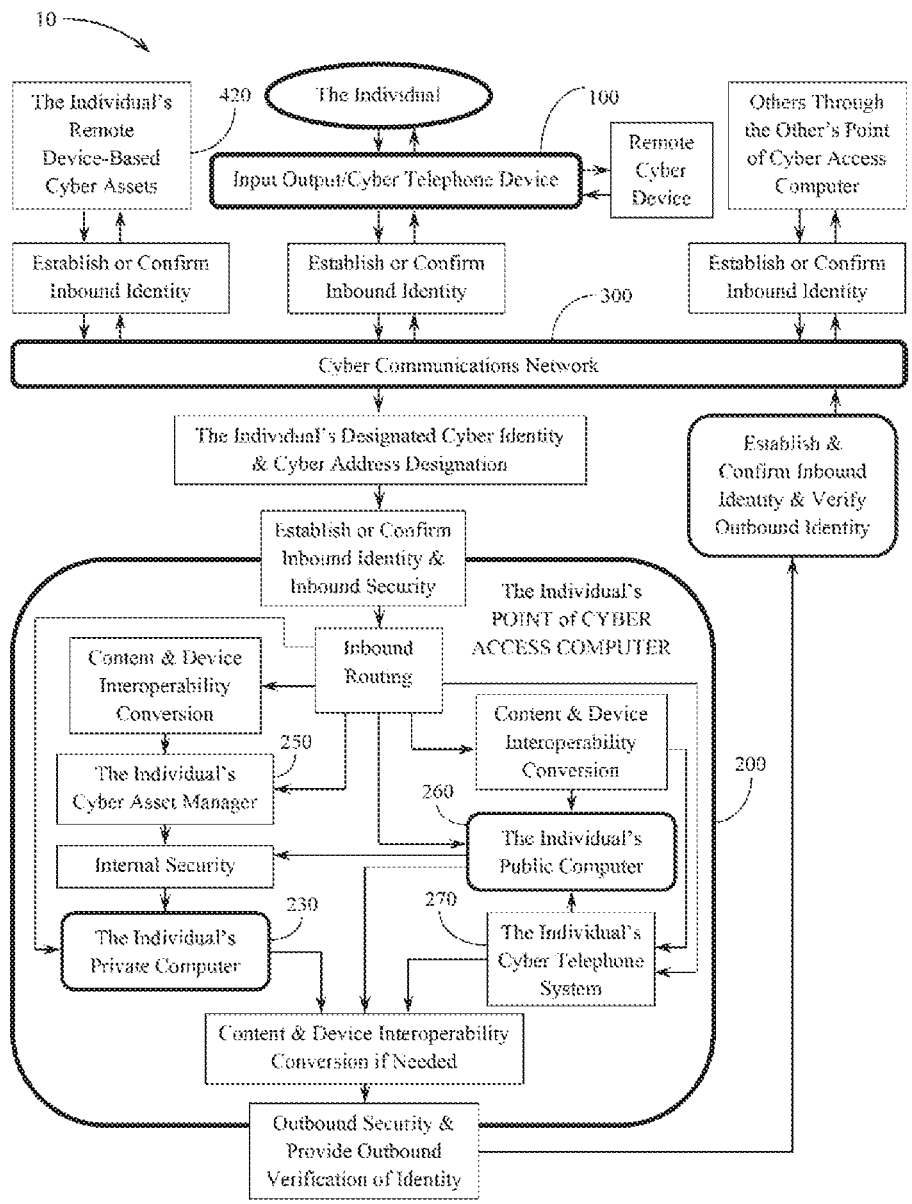
FIG. 3 is a schematic block diagram that illustrates some particular non-limiting embodiments of interconnections and cyber activities that may occur within the architecture of a point-of-cyber-access cyber system in accordance with the teachings herein.
Figure 4:
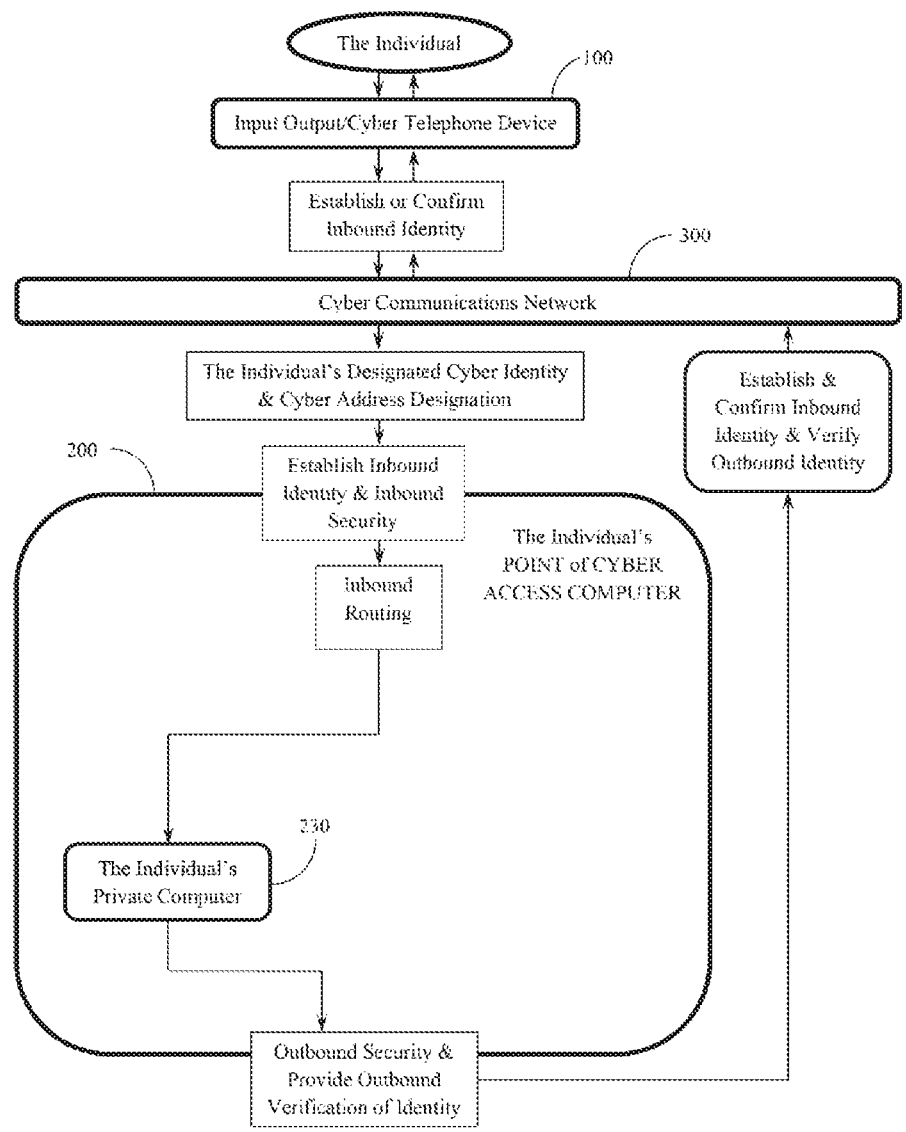
FIG. 4 is a schematic block diagram that illustrates a particular, non-limiting embodiment of a point-of-cyber-access cyber system in accordance with the teachings herein, and the cyber activities of an individual which may be associated with such a system.
Figure 5:
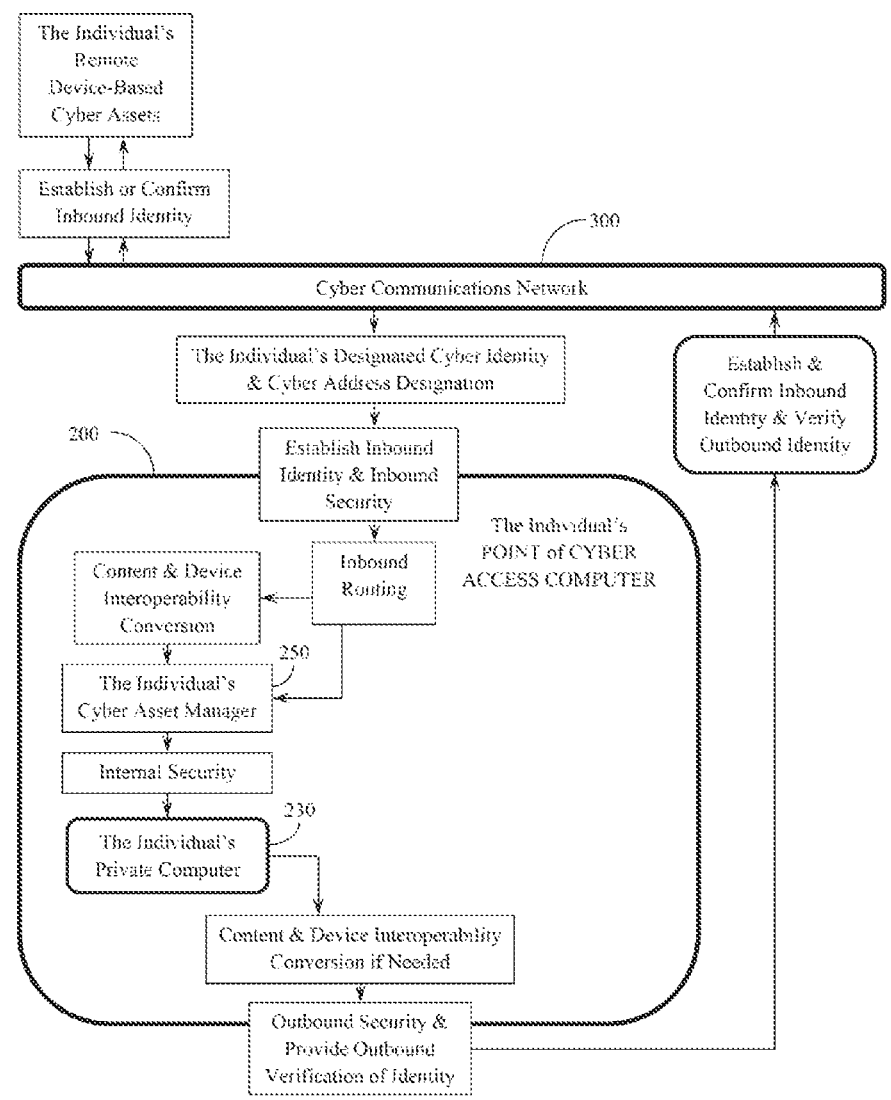
FIG. 5 is a schematic block diagram that illustrates particular, non-limiting embodiments of cyber activities which may be associated with utilization of an individual's device-based cyber assets in accordance with the teachings herein.
Figure 6:
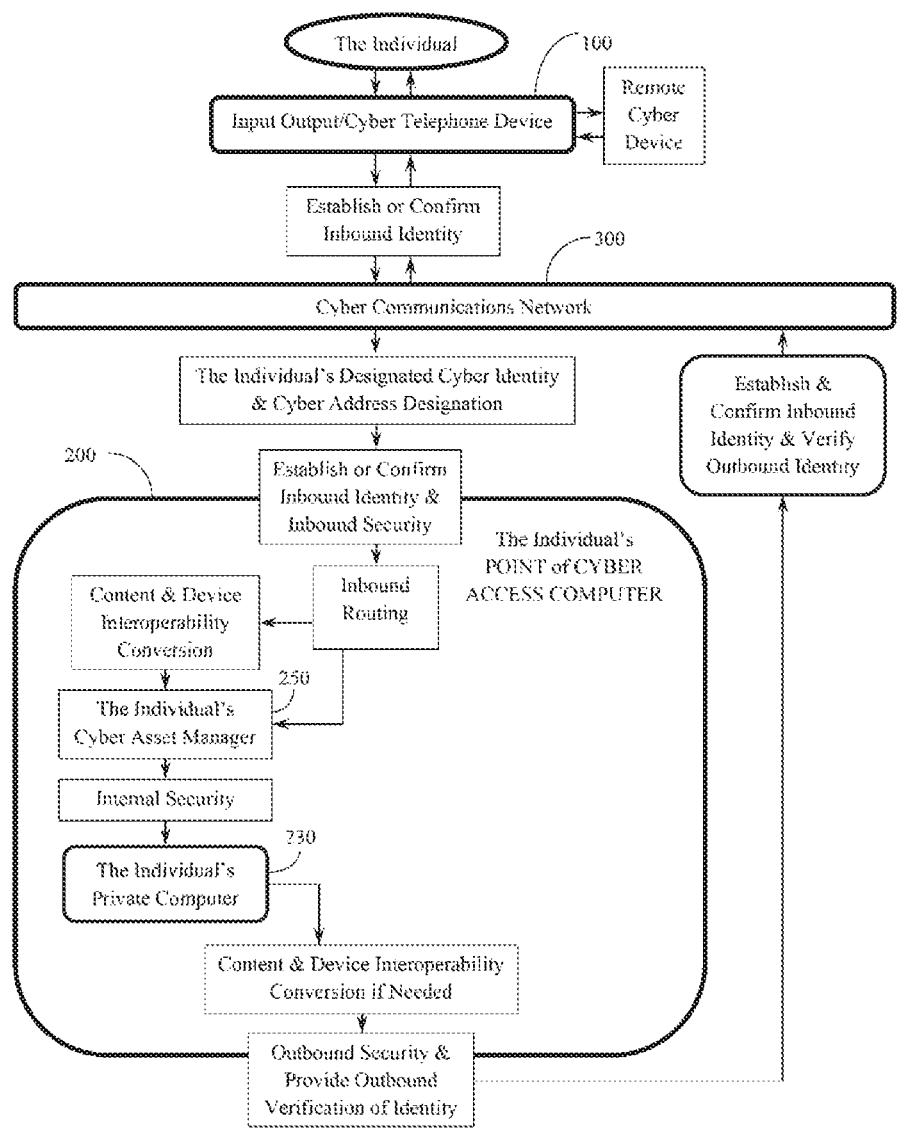
FIG. 6 is a schematic block diagram that illustrates particular, non-limiting embodiments of cyber activities which may be associated with an individual and cyber activities associated with utilization of a remote cyber device.
Figure 7:
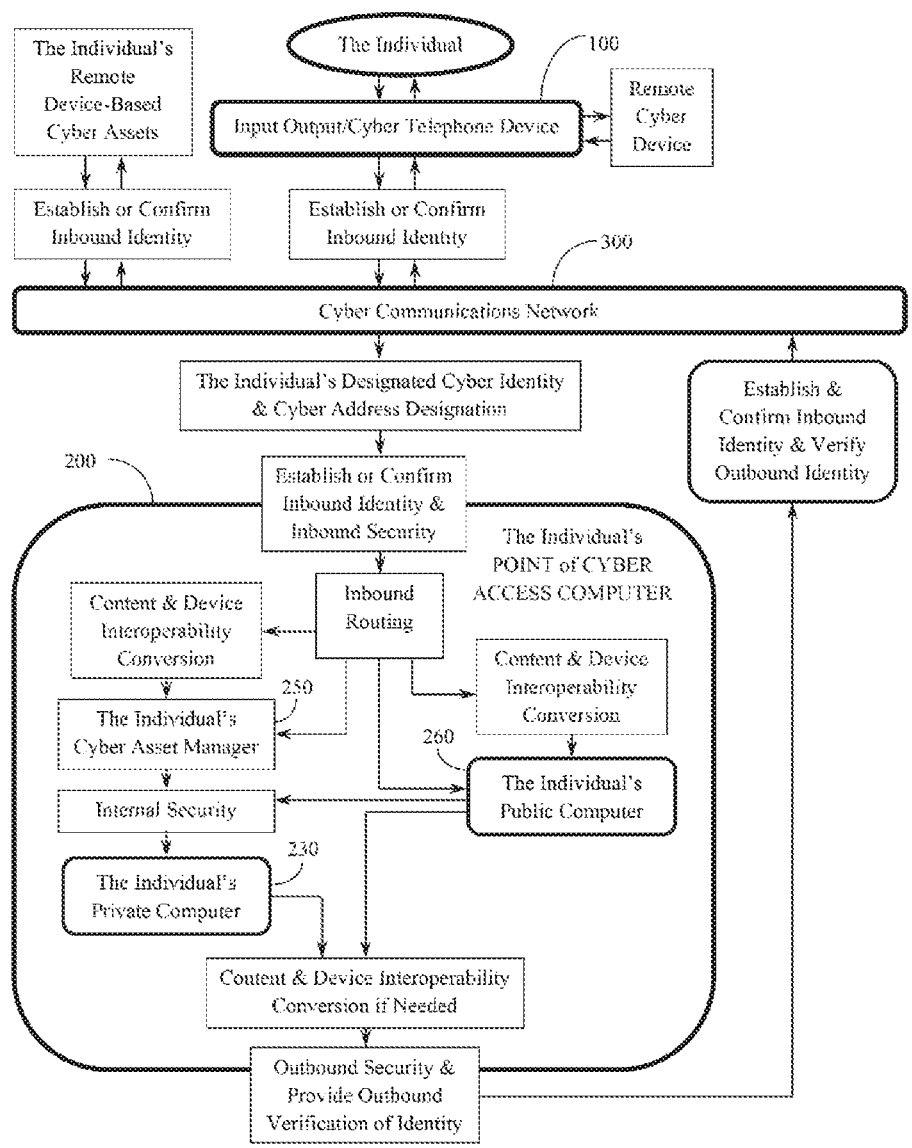
FIG. 7 is a schematic diagram that illustrates particular, non-limiting embodiments of cyber activities which may be associated with utilization of an individual's device-based cyber assets in the systems and methodologies disclosed herein, as well as cyber activities which may be associated with the individual, and cyber activities which may be associated with utilization of a remote cyber device in the systems and methodologies described herein.
Figure 8:
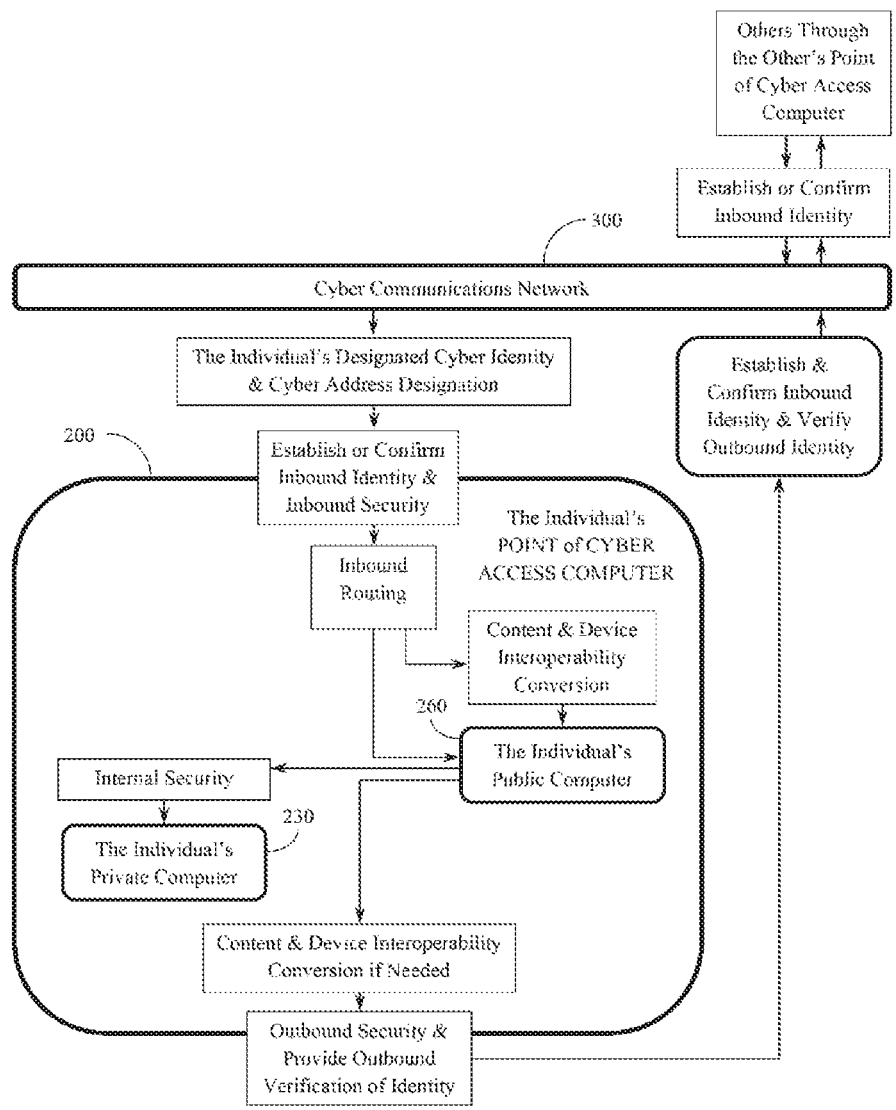
FIG. 8 is a schematic diagram that illustrates a particular, non-limiting embodiments of cyber activities which may occur between others and an individual's public cyber resources in the systems and methodologies described herein.
Figure 9:
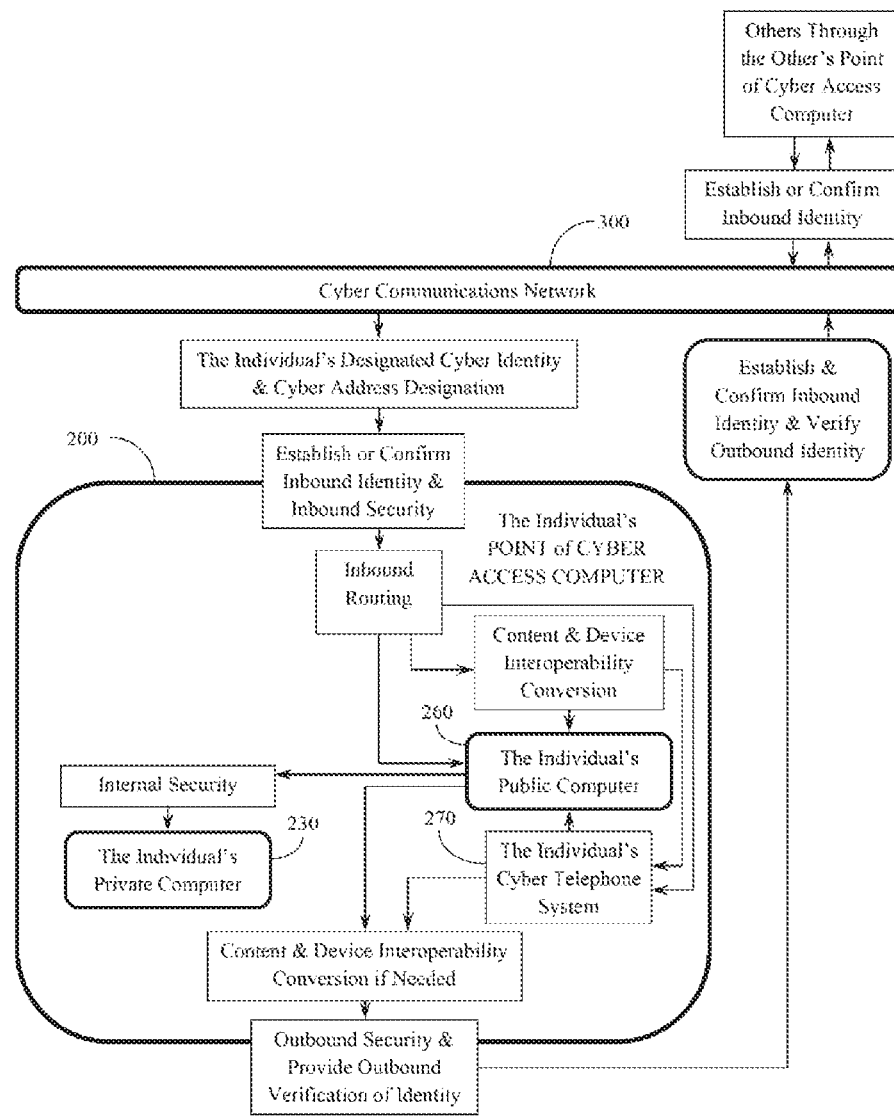
FIG. 9 is a schematic diagram that illustrates particular, non-limiting embodiments of cyber activities which may occur between others, an individual's public cyber resources, and the individual's cyber telephone system in the systems and methodologies disclosed herein.
Figure 10:
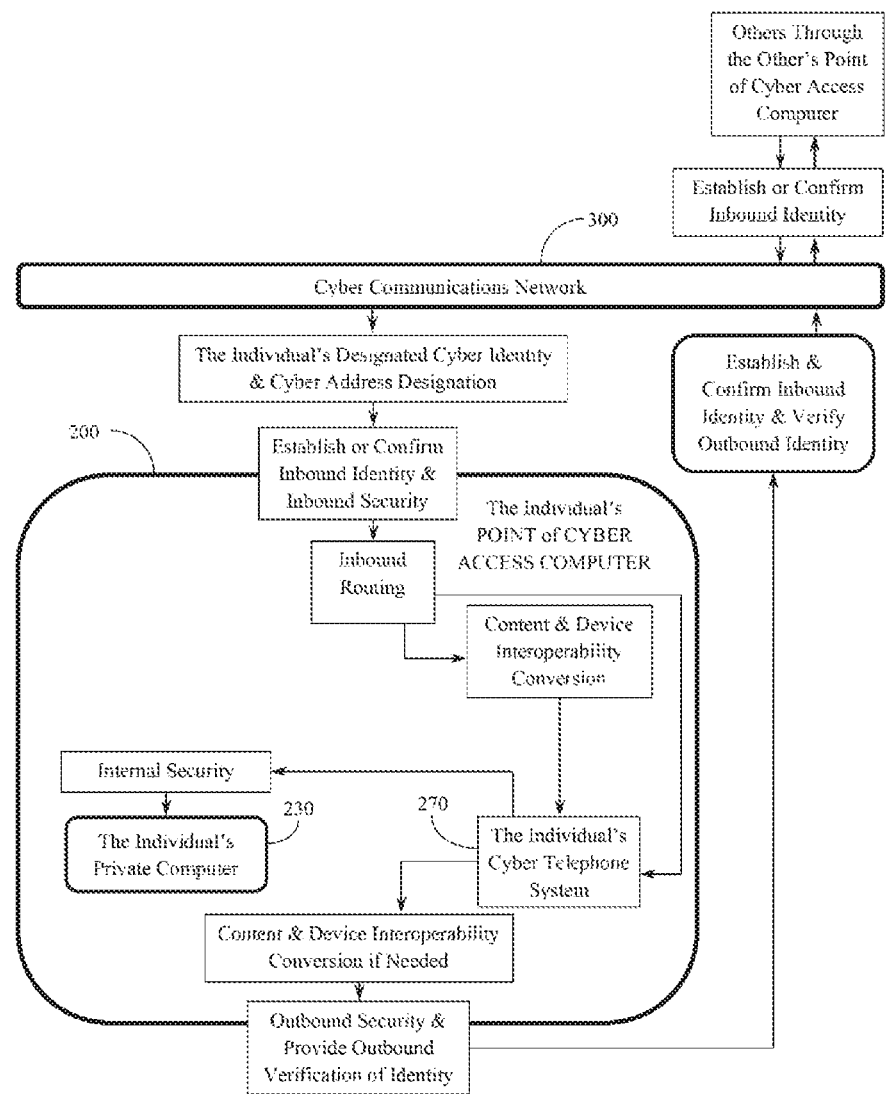
FIG. 10 is a schematic diagram that illustrates particular, non-limiting embodiments of cyber activities which may occur between others and an individual's cyber telephone system in the systems and methodologies disclosed herein.

The foundation for at least one safe, secure, and private configuration of the disclosed point-of-cyber-access cyber system 10, as shown in FIG. 3, is the requirement that each individual and each cyber device be properly identified prior to each of step the cyber interactions the individual, and/or each step of the cyber interactions the cyber device, carries out throughout the point-of-cyber-access cyber system.

This foundational requirement for proper identification of the individual, others, and every cyber device may be used to provide a safe and secure cyber environment that provides a level of cyber safety, cyber security, and cyber privacy that may far exceed what may be found in prior art systems. This foundational requirement also establishes a framework that supports cyber personal rights, cyber privacy rights, and cyber property rights for every individual.

The point-of-cyber-access cyber system provides an individual with only one unique lifelong point-of-cyber-access cyber system identity designation. This unique lifelong point-of-cyber-access cyber system identity designation, when combined with the point-of-cyber-access cyber system address designation of the individual's point of cyber access computer 200, provides all that others need to know to contact the individual for at least one cyber interaction or at least one cyber activity.

As shown in FIG. 1, the point-of-cyber-access cyber system 10 also includes an input output device 100. The input output device 100 may be configured to provide the individual with the ability to use the input output device 100 for secure remote cyber interactions with the individual's point of cyber access computer 200. An example of a group of embodiments of an input output device 100 appears in FIGS. 16A-16F.

As shown in FIG. 16B, for example, the input output device 901 may include two screens 903 and 905 hinged together like a book. As shown in FIG. 16C, a stylus 907 may be used by the individual for input interaction with one or both image display screens 901, on the input output device. Further adaptability of the input output device appears in FIG. 16D where screen 905 may be rotated with respect to screen 903. Once rotated, screens 903 and 905 may be folded back together as shown in FIG. 16E. When folded together as in FIG. 16F the individual may again use a stylus 907 to interact with one image display screen on the input output device 901. Each configuration of the input output device 901 provides a different functionality to the individual.

Those skilled in the art will appreciate that the input output device 901 shown in FIGS. 16A-16F is but one of many different types of devices that may serve as an input output device 100 that may be used with the point-of-cyber-access cyber system 10 disclosed herein.

As shown in FIG. 3, an individual, through use of the input output device 100, communicates information to the individual's point of cyber access computer 200. This communication first allows the individual's point of cyber access computer 200 to establish the individual's identity. After the individual's identity has been established by the individual's point of cyber access computer 200, the individual's point of cyber access computer may further be configured to provide the individual with access to at least one cyber asset and at least one cyber resource that is available to the individual through the individual's point of cyber access computer 200.

Once the individual's identity has been established by the individual's point of cyber access computer 200, the individual's point of cyber access computer 200 may be configured to provide the individual with an array of functionalities including but not limited to at least one functionality selected from the group consisting of: (a) computing capabilities, (b) computer programs, (c) computer applications, (d) cyber telephone services, (e) cyber video telephone services, (f) cyber messaging services, (g) cyber mail services, (h) cyber television, (i) cyber video entertainment, (j) cyber radio, (k) cyber music, (l) verification of the individual's identity as needed for the individual's public cyber activities, (m) cyber interactions with the individual's cyber assets, (n) cyber interactions with others, and (o) cyber interactions with the cyber resources of others. Further, the individual may be provided with the option to have exclusive control of at least one of the individual's cyber asset's: (i) operational functions, (ii) system access functions, (iii) systems management functions, and (iv) systems configuration functions.

The point of cyber access computer 200 may be configured to include two additional and separate types of computers for two separate areas of operation, namely:
(a) the individual's private computer 230, and
(b) the individual's public computer.

One particular, non-limiting embodiment of a possible configuration of the individual's private computer 230 is shown schematically in FIG. 13. The particular embodiment depicted therein may be configured to only be accessed by the cyber interactions of the individual and the cyber interactions of the individual's selected device-based cyber assets and selected device-based cyber resources.

One particular embodiment of a possible configuration of the individual's public computer 260 is shown schematically in FIG. 14. The particular embodiment depicted therein may be configured to provide at least one specified properly identified other, and/or at least one specified properly identified cyber device, with access to at least one specified cyber resource that has been made available to the at least one specified other, and/or the at least one specified cyber device by the individual.

The private computer component 230 of the individual's point of cyber access computer 200 may be configured to establish a new dimension for an individual's cyber activities. This new dimension is a high level of privacy, safety, and security that is not provided by prior art systems.

An individual's private computer may be configured to where only the cyber interactions of the individual and the cyber interactions of the individual's selected device-based cyber assets, and/or the individual's selected device-based cyber resources, may gain access to the individual's private computer 230. Only after the individual's point of cyber access computer 200 has established the individual's identity, and/or the identity of the individual's specified device-based cyber assets, and/or the identity of the individual's specified device based cyber resources, will each be granted access to the individual's private computer 230. This means that the individual's private computer 230 may be configured to where the cyber interactions of no others may gain access. This feature of the point-of-cyber-access cyber system 10 may provide the individual with absolute privacy, safety, and security for the individual's cyber activities that occur within the individual's private computer 230.

An individual's at least one point of cyber access computer 200 may contain the entire working collection of the individual's file-based cyber assets and file-based cyber resources.

Through use of one of an individual's at least one own properly configured private computer 230, the individual may have access to at least one of the following: (a) computing capabilities, (b) computer programs, (c) computer applications, (d) cyber telephone services, (e) cyber video telephone services, (f) cyber messaging services, (g) cyber mail services, (h) cyber television, (i) cyber video entertainment, (j) cyber radio, (k) cyber music, (l) cyber interactions with available cyber resources of others, and (m) at least one cyber interaction, and/or service of at least one type. Further, through the individual's use of the individual's own properly configured private computer 230, the individual may be provided with the option to have exclusive operational control of the: (i) system management functions, (ii) system configuration functions, and (iii) system access functions of the individual's point of cyber access computer, the individual's private computer, and the individual's public computer. The individual may also be provided with operational control of the access control functions of the individual's cyber assets.

An individual's cyber assets include all of the individual's cyber devices, programs, applications, processes, procedures, and files that use non-biological processing of programming in any way.

Cyber assets are the property of an individual. An individual may share at least one part of the individual's cyber assets with at least one specified other. When the individual makes a copy of the individual's file-based cyber assets available for specified others, it may be made available through the individual's public computer 260. Copies of the individual's cyber assets that are made available to specified others are considered to be the cyber resources of the specified others.

An individual's file-based cyber assets may include, but are not limited to, at least one asset selected from the group consisting of: (a) personal records, (b) financial records, (c) health records, (d) cyber historical records, (e) photographs, (f) cyber books, (g) cyber magazines, (h) music, (i) videos, (j) computer programs, (k) computer applications, and (l) cyber files of any type.

An individual's device-based cyber assets, at a minimum, consist of the individual's point of cyber access computer 200. The individual's device-based cyber assets may also include, but are not limited to, at least one of the following devices: (a) at least one input output device, (b) at least one private computer, (c) at least one public computer, (d) at least one audio output/video display device, (e) at least one cyber telephone device, (f) at least one health monitoring device, (g) at least one vehicle, (h) at least one cyber file backup, and/or restore, device, (i) at least one video camera, (j) at least one home, and/or office, cyber automation device that may control, and/or monitor, lights, locks, security systems, thermostats, refrigerators, lawn sprinkler systems, water heater operations, water, and/or electric, consumptions, garage door openers, dog doors, printers, private weather station, etc., (k) at least one global position locating device, and (l) at least one other device-based cyber asset that an individual may interact with.

As shown in FIG. 3, an individual's private computer 230 may be configured to allow security processes and procedures to be used for all inbound cyber activities, for all inbound cyber interactions, and for all inbound cyber content that is transferred to the individual's private computer 230 from the individual's point of cyber access computer 200, and/or from the individual's public computer 260.

Also as shown in FIG. 3, the individual's public computer 260 may be configured to be used as the individual's portal for: (a) cyber activities (b) cyber interactions, and (c) the transfer of cyber content to and from others.

An individual's point of cyber access computer 200 may be configured to provide verification of the individual's identity for the individual's outbound cyber activities, and/or for the individual's outbound cyber interactions.

The point-of-cyber-access cyber system may be configured to mandate that the device within the cyber communications network 300 (and disposed between the input output device 100 and the point of cyber access computer 200), that comes into first contact with a sender's cyber interactions, establishes the identity of the sender's point of cyber access computer, and also establishes the identity of the input output device that is being used by the sender prior to transferring the sender's cyber interactions. The device within the cyber communications network 300 that comes into first contact with the sender's cyber interaction from the sender's point of cyber access computer may subsequently be required to provide verification of the identity of the sender's point of cyber access computer 200 prior to at least one step the sender's cyber interaction takes throughout the point-of-cyber-access cyber system 10.

For a cyber interaction from an other to gain access to the individual's point of cyber access computer 200, the individual's point of cyber access computer 200 may be configured to require that it has received verification of the identity of the other. The individual's point of cyber access computer 200 may then be configured to require that it confirm the others verified identity. The individual's point of cyber access computer 200 may be further configured such that once the verified identity of the other has been confirmed, the cyber interaction from the other may then be granted further access to the individual's point of cyber access computer 200.

Others may gain access to the individual's point of cyber access computer 200 and to the individual's public computer 260 for the purposes of cyber activities and cyber interactions.

An individual may have the ability, through use of the access and management functions of the individual's at least one properly configured private computer 260, to specify to whom the individual grants or denies access to at least one asset selected from the group consisting of:

(a) the individual's at least one point of cyber access computer 200;
(b) the individual's at least one cyber telephone system 270;
(c) the individual's at least one public computer 260; and
(d) the individual's at least one private computer.

Further, the individual may grant or deny each specified other access to at least one part, of the cyber resources that the individual makes available to specified others through the specified others' cyber interactions with the individual's at least one properly configured public computer 260.

Others that are granted access to: (a) at least one part of an individual's cyber resources (b) the individual's at least one cyber telephone system 270, and (c) the individual's at least one public computer 260, may only request the following to respond to the other's cyber requests: (i) the individual, (ii) the individual's at least one point of cyber access computer, 200 (iii) the individual's at least one public computer 260, and (iv) the individual's at least one private computer 230.

Others may be excluded from gaining operational access, and/or administrative control, of the individual's cyber resources. Further, others may be excluded from gaining operational access, and/or administrative control, of at least one part of the individual's at least one public computer 260.

Cyber interactions from the individual's point of cyber access computer 200 to the input output device 100 that is being used by the individual as shown in FIG. 3 may be pre-processed as image, and/or audio, based content prior to being sent, as opposed to sending cyber interactions as files that need to be processed into image, and/or audio, based content by the input output device.

A recipient may respond to a point-of-cyber-access cyber system formatted interaction from a sender by communicating to the sender:

(a) the recipient's specific input;
(b) the specific point on the specific image, and/or soundtrack, where the recipient's cyber interaction was made; and,
(c) the identification of the sender's specific content that was perceived by the recipient at the point in time when the recipient's cyber interaction was made.

Embodiments of the systems disclosed herein may provide a frames and scrolls format for image-based cyber content. Using the frames and scrolls format, as shown in greater detail in the array of images in FIGS. 18A-18G for image-based point-of-cyber-access cyber system content, a recipient may respond to a cyber interaction from the sender by communicating the recipient's specific input, at the specific point on the specific image that the recipient perceived.

Figure 18A:
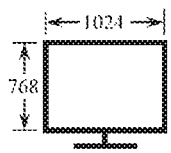
FIGS. 18A-18G are illustrations depicting particular, non-limiting embodiments of cyber images in accordance with the teachings herein, shown in both frame format and scroll format.
Figure 18B:
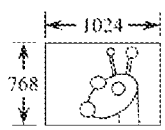
Figure 18C:
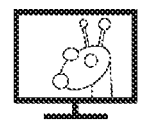
Figure 18D:
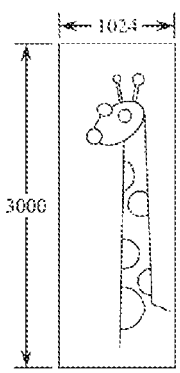
Figure 18E:
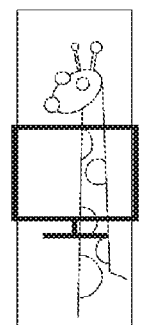
Figure 18F:
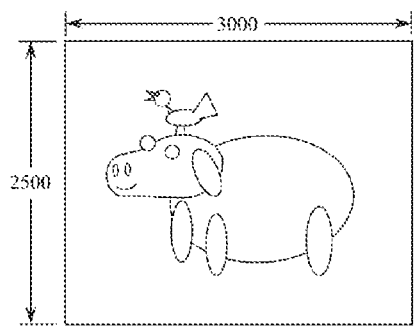
Figure 18G:
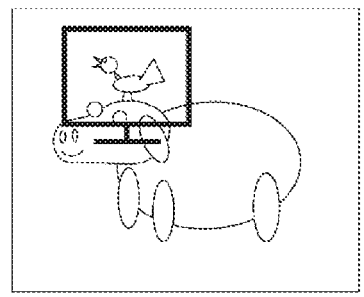

For example, FIG. 18A depicts a screen that is similar to screens 903 and 905 shown in FIGS. 16A-16 F. The size of the screen is 1024 pixels wide by 768 pixels high. An image having a dimension larger than 1024 pixels wide×768 pixels high, such as the 1024 pixels wide by 3000 pixels high image shown in FIG. 18D, will not appear in its entirety on a 1024 pixels wide×768 pixels high image display screen. Rather, only a portion of the image shown in FIG. 18D will appear at one time on a screen such as shown in FIG. 18E, or in FIG. 18G using the disclosed frames and scrolls format. As shown in FIGS. 18E and 18G, the disclosed scrolls format may be used when one or both of the two image dimensions are larger than what may be presented at one time on a single image display screen.

As shown in FIG. 3, an individual's point of cyber access computer 200 may also include a at least one cyber telephone system 270. The at least one cyber telephone system 270 may provide for all aspects of the individual's needs, and/or desires, for cyber telephone services. The individual's at least one cyber telephone system 270 may be configured to:

(a) provide at least one historical record of at least one cyber telephone system activity;
(b) grant, and/or deny: (i) cyber telephone communication interactions from others, and (ii) others access to at least one part of the individual's at least one cyber telephone system;
(c) route cyber telephone communications interactions and related cyber alerts, to an input output/cyber telephone device that is on, or near, the individual, and/or that is specified for use as a cyber telephone contact device by the individual;
(d) record messages from inbound cyber telephone communications interactions;
(e) deliver messages to specified others; and,
(f) provide at least one other cyber telephone service or function that is needed, and/or desired, by the individual.

A key security feature of a preferred embodiment of the disclosed point-of-cyber-access cyber system 10 is that it may be configured to have differences among operations, processes, code, transfer packets, and/or formats, for: (a) cyber interactions, (b) cyber telephone communications, (c) cyber mail, (d) cyber messages, (e) cyber television, (f) cyber video entertainment, (g) cyber music, (h) file transfers, (i) computer programs, (j) computer applications, (k) operational controls, and (l) at least one other required, and/or desired, function. The reason for the use of differences among operations, processes, code, transfer packets, and/or formats, is: (i) to provide for security between different processes (ii) to assure proper routing, and (iii) to assure that cyber interaction for one specific purpose cannot and will not be used for a different purpose.

At least one of the cyber communications networks 300 in the at least one point-of-cyber-access cyber system 10 may be configured to require that an individual be properly identified prior to at least one step, and/or prior to each step, that the individual's cyber interactions carry out throughout the cyber communications network 300.

The cyber communications network in the at least one point-of-cyber-access cyber system 10, may be configured to require that each cyber device be properly identified prior to at least one step, and/or prior to each step, the cyber device's cyber interactions take throughout cyber communications network 300.

The point-of-cyber-access cyber system 10 may require at least one cyber activity to be properly formatted. Further, the point-of-cyber-access cyber system 10 may require at least one cyber activity keep a historical record of each step the cyber activities carry out throughout the at least one cyber communications networks 300, and/or throughout the point-of-cyber-access cyber system 10.

The point-of-cyber-access cyber system 10 may have policies, procedures, and devices that may be used for cyber interaction among: (a) the individual, (b) the individual's at least one point of cyber access computer 200, (c) the individual's at least one private computer 230, and (d) the individual's at least one device-based cyber asset 420 (FIG. 2). These policies, procedures, and devices may be configured to provide for safe and secure cyber interactions between the individual's at least one device-based cyber asset 420 and the individual or the individual's at least one private computer 230 or the individual's at least one point of cyber access computer 200. In addition, these policies, procedures, and devices may be configured to exclude all others from gaining access to at least one part of the individual's cyber assets, and/or cyber resources.

Another key feature of the disclosed point-of-cyber-access cyber system 10 is that it may be configured to include the universal interactive operating system. The programming that makes up the universal interactive operating system provides processes and procedures. The processes and procedures may be configured to provide an interoperable interconnected cyber environment. Within that cyber environment, at least one cyber device may use the safety and security of properly configured point-of-cyber-access cyber system components for safe, secure and private interconnected cyber interactions.

The systems and methodologies disclosed herein are preferably agnostic to the operating system used by a sender of a cyber interaction, or the operating system used by the recipient of a cyber interaction, as long as the cyber interaction between the sender and the recipient uses the universal interactive operating system of the disclosed system for interoperable interconnected interactions.

The universal interactive operating system, that may be utilized as a part of the disclosed point-of-cyber-access cyber system, has interoperability processes that translate cyber interactions, cyber activities, and cyber content to and from standard universal interactive operating system formats.

The individual's at least one point of cyber access computer 200, the individual's at least one private computer 230, and the individual's at least one public computer 260, may each be configured to keep at least one historical record of cyber activities from within the cyber domain of the individual.

Figure 17:
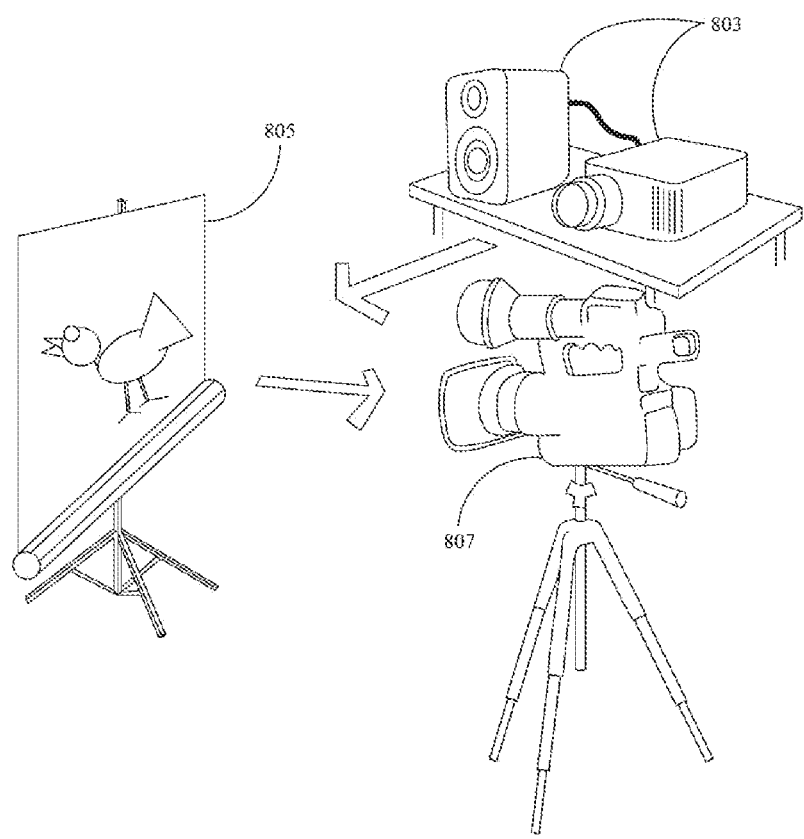
FIG. 17 is an illustration of a particular, non-limiting embodiment of a group of virtual devices and processes in accordance with the teachings herein that may be used for one or more purposes selected from the group consisting of: (a) security, (b) interoperability conversion, and (c) altering cyber images.

As shown in FIG. 17, the universal interactive operating system may include, for example, resource-efficient processes and procedures that use: (a) at least one virtual projector 803, (b) at least one virtual projection display screen 805, and (c) at least one virtual recorder or capture device 807 to: (i) convert cyber content for interoperability, (ii) convert cyber interactions for interoperability, (iii) alter images (iv) alter audio, and (v) converge two or more sources of image-based cyber content into at least one converged source of image-based cyber content.

(6) Point-of-Cyber-Access Cyber System Architecture

As shown in FIG. 2, the architecture of the disclosed point-of-cyber-access cyber system 10 preferably defines the interrelationship of the components of the disclosed point-of-cyber-access cyber system 10. The architecture of the point-of-cyber-access cyber system 10 preferably also defines the components of the disclosed point-of-cyber-access cyber system 10. Specifically, at a minimum, the components of the point-of-cyber-access cyber system 10 include: (a) architectural rules and requirements, (b) system structure, (c) at least one point of cyber access computer, 200 (*d*) at least one input output device 100, (e) at least one cyber device, (f) at least one cyber communications network 300, and (g) at least one operating system.

The components of the point-of-cyber-access cyber system 10 may further include: (a) at least one cyber asset manager, 250 (*b*) at least one cyber telephone system 270, (c) at least one cyber vault, (d) at least one private computer, (e) at least one public computer, (f) at least one cyber license system, and (h) at least one other component.

The architecture of the disclosed point-of-cyber-access cyber system 10 may be configured to provide for at least one interconnected cyber system in which: (a) at least one point of cyber access computer 200, (b) at least one input output device 100, and (c) at least one cyber device, may have cyber interactions using at least one cyber communications network 300, and all utilizing the at least one operating system.

The device architecture of the disclosed point-of-cyber-access cyber system 10 preferably provides for at least one from the group consisting of: (a) at least one point of cyber access computer 200, (b) at least one private computer 230, (c) at least one public computer 260, and (d) at least one cyber device, to each be at least one from the group consisting of: (i) a physical device, (ii) a virtual device, and (iii) at least one combination thereof.

The architecture of the disclosed point-of-cyber-access cyber system 10 preferably provides for at least one from the group consisting of: (a) the addition of, (b) the removal from, (c) the alteration of, and (d) the reconfiguration of the arrangement of, the cyber processes, and/or the cyber procedures, of the point-of-cyber-access cyber system 10.

The architecture of the disclosed point-of-cyber-access cyber system 10 preferably provides for at least one from the group consisting of: (a) the addition of, (b) the removal from, (c) the alteration of, and (d) the reconfiguration of the arrangement of, cyber components, and/or cyber devices, that are a part of the point-of-cyber-access cyber system 10.

The architecture of the disclosed point-of-cyber-access cyber system 10 preferably includes device architecture. The device architecture, in turn, provides for at least one item selected from the group consisting of: (a) separate and different processing and support be used for at least one from the group consisting of: (i) an individual's private cyber activities, (ii) an individual's private cyber assets, and (iii) an individual's private cyber resources, and (b) separate and different processing and support be used for at least one from the group consisting of: (i) an individual's public cyber activities, (ii) an individual's publicly available cyber assets, and (iii) an individual's publicly available cyber resources.

The device architecture of the disclosed point-of-cyber-access cyber system 10 preferably further provides for at least one point of cyber access computer 200 that may be configured to be a combination of three separate types of interconnected computers. These types of interconnected computers preferably include: (a) the point of cyber access computer 200, (b) the private computer 230, and the public computer 260. At least one computer of each of the foregoing computer types may be integrated into at least one single device, and/or at least one of the foregoing computer types, may be a physically separate computer that may also be physically located in at least one location.

The device architecture of the disclosed point-of-cyber-access cyber system 10 preferably provides for at least one action selected from the group consisting of: (a) the addition of, (b) the removal from, (c) the alteration of, and (d) the reconfiguration of the arrangement of: (i) the components, (ii) the cyber processes, and (iii) the cyber procedures, of at least one point-of-cyber-access cyber system cyber device.

The architecture of the disclosed point-of-cyber-access cyber system 10 provides for the use of at least one system-standard interface and interaction cyber process, and/or cyber procedure. The at least one system-standard interface and interaction cyber process, and/or cyber procedure, may be configured to provide an environment of cyber interoperability where at least one cyber device may be seamlessly used as a component of the point-of-cyber-access cyber system 10.

An individual's at least one point of cyber access computer 200 may be configured to establish, and/or confirm, the identity of at least one entity, and/or at least one person, selected from the group consisting of: (a) at least one individual, (b) at least one other, and (c) at least one cyber device, prior to providing point of cyber access computer access to at least one cyber interaction from the properly identified at least one individual, at least one other, and at least one cyber device.

The architecture of the disclosed point-of-cyber-access cyber system 10 may be configured to provide for and require the proper identification of each individual prior to at least one step, and/or prior to each step, that the cyber interactions of the individual take throughout the point-of-cyber-access cyber system 10. The architectural rules and regulations may also require properly identifying each cyber device prior to at least one step, and/or prior to each step, that the cyber interactions of the cyber device take throughout the point-of-cyber-access cyber system 10.

The architectural rules and requirements may require that an individual's at least one private computer 230 may only be accessed by cyber interactions from an input output device 100 that is being used by the individual, or accessed by cyber interactions from at least one of the individual's selected device-based cyber assets. Further, the architectural rules and requirements may require that the individual's at least one private computer 230 may only be accessed through the individual's point of cyber access computer 200.

The architectural rules and requirements may require that an individual's at least one public computer 260 may only be accessed by cyber interactions from at least one other that has been selected and granted access by the individual. Further, the individual's at least one public computer 260 may be configured such that it may only be accessed through use of the individual's at least one point of cyber access computer 200.

The architecture of the disclosed point-of-cyber-access cyber system 10 may provide at least one item selected from the group consisting of:
(a) an interconnected cyber system for use by at least one individual for the at least one individual's cyber interactions and cyber activities;
(b) a system-wide set of standard cyber processes and cyber procedures for requiring that each individual, and each cyber device that uses the cyber system be properly identified;
(c) at least one remotely accessible point of cyber access computer for use by at least one individual; and,
(d) an individual with the ability to remotely access cyber assets, and/or cyber resources.

(7) Universal Interactive Operating System

The universal interactive operating system may be the primary or the only operating system that is used by the components of the point-of-cyber-access cyber system.

The universal interactive operating system may provide programming that provides processes and procedures that may be utilized to provide a cyber environment wherein cyber activities of every type may be integrated into at least one interconnected cyber system. Such cyber systems may use a universal interactive operating system as its primary, or as its only, operating system.

The universal interactive operating system may provide programming that provides and enables processes and procedures that may be utilized to provide at least one individual with the ability to consolidate access to at least one part of the individual's cyber activities into at least one safe and secure remotely accessible device. The at least one safe and secure remotely accessible device may include the individual's at least one point of cyber access computer.

The universal interactive operating system may provide programming that provides and enables the processes and procedures that may be utilized to provide a cyber environment where cyber activities and cyber devices of every type may be accessed and used by at least one individual through the at least one individual's use of at least one input output device that works in conjunction with the individual's at least one point of cyber access computer.

The universal interactive operating system is preferably designed to minimize the number of same operational processes and procedures that are used by others. This minimization of the number of same operational processes and procedures may be accomplished by providing and requiring the use of standard operational processes and procedures.

The universal interactive operating system may provide programming for device operating systems for:
(a) at least one point of cyber access computer;
(b) at least one private computer;
(c) at least one public computer;
(d) at least one input output device;
(e) at least one cyber telephone device;
(f) at least one cyber communications network device; and,
(g) at least one other point-of-cyber-access cyber system device that requires the use of an operating system.

The universal interactive operating system may provide programming that provides and enables the processes and procedures that may be used to assure that each individual is properly identified prior to at least one step, and/or prior to each step, that the cyber interactions of that individual take throughout the point-of-cyber-access cyber system. The processes and procedures requiring proper identification may further assure that each cyber device is properly identified prior to at least one step, and/or prior to each step, that the cyber device's cyber interactions take throughout the point-of-cyber-access cyber system.

The universal interactive operating system may provide programming that provides, and/or enables, the processes and procedures that may be utilized to provide at least one cyber device with the ability to perform at least one action selected from the group consisting of: (a) establishing identity, (b) confirming identity, and (c) providing verification of the identity, of at least one individual, and/or of at least one cyber device.

The universal interactive operating system may provide programming that provides, and/or enables, the processes and procedures that may be utilized to provide a safe and secure cyber environment. Within this safe and secure cyber environment, at least one cyber device that is a component of the point-of-cyber-access cyber system may properly identify at least one individual, and/or at least one other cyber device, prior to having further cyber interactions with the properly identified at least one individual, and/or the at least one properly identified cyber device.

The universal interactive operating system may provide programming that provides, and/or enables, processes and procedures for establishing the identity of at least one individual. These processes and procedures may be utilized by at least one point of cyber access computer, and/or by at least one cyber device of at least one individual.

The universal interactive operating system may provide programming that provides, and/or enables, processes and procedures for establishing an individual's identity. These processes and procedures may be utilized to require, and/or provide for, an individual's at least one point of cyber access computer to establish the individual's identity prior to further cyber interactions between the input output device that is being used by the individual and the individual's at least one point of cyber access computer.

The universal interactive operating system may provide programming that provides, and/or enables, processes and procedures that may be utilized to require and provide for an individual's at least one point of cyber access computer to provide at least one other, and/or at least one cyber device of at least one other, with verification of the individual's identity. Such verifications may occur prior to at least one step, and/or prior to each step, that the individual's cyber interactions take throughout the point-of-cyber-access cyber system.

The universal interactive operating system may provide programming that provides, and/or enables, processes and procedures that may be utilized to require an individual's point of cyber access computer to establish the identity of the individual's at least one device-based cyber asset, and for the individual's at least one device-based cyber asset to establish the identity of the individual's at least one point of cyber access computer prior to further cyber interaction between the individual's at least one point of cyber access computer and the individual's at least one device-based cyber asset.

The universal interactive operating system may provide programming that provides, and/or enables, processes and procedures that may be utilized to provide an individual's at least one point of cyber access computer with the ability to confirm the verified identity of at least one other, and/or to confirm the verified identity of at least one cyber device of at least one other. Such identity confirmation may occur prior to further cyber interaction with the at least one other, and/or prior to further cyber interaction with the at least one cyber device of at least one other.

The universal interactive operating system may provide programming that provides, and/or enables, processes and procedures that may be utilized to require, and provide for, at least one cyber device within the at least one cyber communications network to be utilized to establish the identity of at least one individual's at least one point of cyber access computer upon the at least one individual's at least one point of cyber access computer's first interaction with the at least one cyber communications network device.

The universal interactive operating system may provide programming that provides, and/or enables, processes and procedures that may be utilized to require that the device within a cyber communications network that establishes the identity of one of an individual's at least one point of cyber access computers will, in turn, provide verification of the identity of the individual's one point of cyber access computer prior to one or more steps, and/or prior to each step, that the individual's cyber interactions take throughout the point-of-cyber-access cyber system.

The universal interactive operating system may provide programming that provides, and/or enables, processes and procedures that may be utilized to provide at least one input output device with the ability to observe identity information in regard to a person as an individual. This identity information may then be transferred, as at least one cyber interaction, to one of the individual's at least one point of cyber access computers, wherein the cyber interaction containing identity information about the individual may be used by the individual's point of cyber access computer to establish the individual's identity.

The universal interactive operating system may provide programming that provides, and/or enables, processes and procedures that may be utilized to provide at least one individual with the ability to use the point-of-cyber-access cyber system identity designation of at least one other, and/or the point-of-cyber-access cyber system identity designation of at least one device-based cyber asset of at least one other, to obtain additional information about the at least one other, and/or to obtain additional information about at least one other's at least one device-based cyber asset.

The universal interactive operating system may provide programming that provides, and/or enables, the processes and procedures that may be utilized to require, and/or assure, that each individual has one, and only one, unique, lifelong point-of-cyber-access cyber system identity designation.

The universal interactive operating system may provide programming that provides, and/or enables, processes and procedures that may be utilized to require, and/or assure, that each cyber device has one, and only one, unique, point-of-cyber-access cyber system identity designation.

The universal interactive operating system may provide programming that provides, and/or enables, processes and procedures that may be utilized to provide operating-system-based cyber security functions and services for use throughout the point-of-cyber-access cyber system.

The universal interactive operating system may provide programming that provides, and/or enables, processes and procedures that may be utilized to require, and/or provide, processes, and/or procedures, for providing security for all inbound cyber interactions, and/or for all inbound cyber activities, that have been sent to one of an individual's at least one point of cyber access computers.

The universal interactive operating system may provide programming that provides, and/or enables, processes and procedures that may be utilized to require and provide processes, and/or procedures, for providing security for all internal cyber interactions, and/or for all cyber activities within one of an individual's at least one point of cyber access computers.

The universal interactive operating system may provide programming that provides, and/or enables, processes and procedures that may be utilized to require, and/or provide, processes, and/or procedures, for providing security for all outbound cyber interactions, and/or all outbound cyber activities, from at least one individual's at least one point of cyber access computer.

The universal interactive operating system may provide programming that provides, and/or enables, processes and procedures that may be utilized to provide at least one individual with the ability to manage security at each of the at least one individual's device-based cyber assets including, but not limited to: (a) at least one of the individual's at least one point of cyber access computers, (b) at least one of the individual's at least one private computers, (c) at least one of the individual's at least one public computers, (d) at least one of the individual's at least one remote cyber devices, and (e) at least one of the individual's at least one cyber telephone systems.

The universal interactive operating system may provide programming that provides, and/or enables, processes and procedures that may be utilized to provide differences among cyber operations, processes, codes, transfer packets, and formats for cyber interactions for: (a) cyber telephone communications, (b) cyber mail, (c) cyber messages, (d) cyber television, (e) cyber video entertainment, (f) cyber music, (g) cyber file transfers, (h) computer programs, (i) computer applications, (j) operational controls, and (k) at least one other needed, and/or desired, component of the point-of-cyber-access cyber system. The differences among: (i) cyber operations, (ii) cyber processes, (iii) cyber codes, (iv) cyber transfer packets, and (v) cyber formats for cyber interactions may provide for security between different processes, may assure proper routing, and may assure that a cyber interaction for one specific purpose may not be used for a different purpose.

The universal interactive operating system may provide programming that provides, and/or enables, processes and procedures that may be utilized to inspect at least one inbound cyber interaction to determine if the at least one inbound cyber interaction contains at least one type of content selected from the group consisting of: (a) dangerous content, (b) malicious content, (c) inappropriate content, and (d) unwanted content.

The universal interactive operating system may provide programming that provides, and/or enables, processes and procedures that may be utilized to deny further access to at least one inbound cyber interaction that contain at least one content type selected from the group consisting of: (a) dangerous content, (b) malicious content, (c) inappropriate content, and (d) unwanted content.

The universal interactive operating system may provide programming that provides, and/or enables, the processes and procedures that may be utilized to provide at least one cyber interaction selected from the group consisting of:
  (a) safe and secure cyber interactions between the individual's at least one private computer and the individual's at least one point of cyber access computer;
  (b) safe and secure cyber interactions between the individual's at least one private computer and the individual's at least one public computer;
  (c) safe and secure cyber interactions between the individual's at least one private computer and the individual's at least one device-based cyber asset; and,
  (d) safe and secure cyber interactions between the individual's at least one private computer and the individual's at least one cyber telephone system.

The universal interactive operating system may provide programming that provides, and/or enables, processes and procedures that may be utilized to require, and/or provide, processes, and/or procedures, for providing security for:
  (a) cyber interactions between an individual and at least one of the individual's at least one device-based cyber assets;
  (b) cyber interactions between an individual and at least one of the individual's at least one file-based cyber assets; and,
  (c) cyber interactions between an individual and at least one of the individual's at least one cyber resources.

The universal interactive operating system may provide programming that provides, and/or enables, processes and procedures that may be utilized to provide for security-based cyber interactions to occur between point-of-cyber-access cyber system devices as an integral part of a simultaneous corresponding cyber interaction that is being transferred between the same two point-of-cyber-access cyber system devices.

The universal interactive operating system may provide programming that provides, and/or enables, processes and procedures that may be utilized to provide a system-wide protocol. The system-wide protocol may be utilized to require at least one other to have the ability to only request that an individual provide the at least one other with at least one requested cyber interaction. The system-wide protocol may be utilized to further require that the individual either directly, or through automated interaction from the individual's at least one cyber device, have the exclusive ability to send cyber interactions to at least one other from at least one device selected from the group consisting of: (a) the individual's at least one point of cyber access computer, (b) the individual's at least one private computer, (c) the individual's at least one public computer, and (d) the individual's at least one cyber telephone system. Preferably no others have the ability to send cyber interactions from at least one device selected from the group consisting of: (i) the individual's at least one point of cyber access computer, (ii) the individual's at least one private computer, (iii) the individual's at least one public computer, and (iv) the individual's at least one cyber telephone system.

The universal interactive operating system may provide programming that provides, and/or enables, processes and procedures that may be utilized to provide for the deletion of at least one cyber interaction that was selected from the group consisting of: (a) from at least one individual that cannot be properly identified, (b) from at least one other that cannot be properly identified, and (c) from at least one cyber device that cannot be properly identified.

The universal interactive operating system may provide programming that provides, and/or enables, processes and procedures that may be utilized to provide for the identification of, and/or the deletion of, at least one cyber interaction that contains at least one content type selected form the group consisting of: (a) dangerous content, (b) malicious content, (c) inappropriate content, (d) unwanted content, (e) improperly labeled content, and (f) improperly identified content.

The universal interactive operating system may provide programming that provides, and/or enables, processes and procedures that may be utilized to use (see FIG. 17) the combination of any of: (a) at least one virtual projector 803, (b) at least one virtual projection display screen 805, and (c) at least one virtual recorder or capture device 807 to provide cyber security by converting cyber content from at least one cyber interaction that is not in universal interactive operating system standard format to safe and secure cyber interactions that are in universal interactive operating system standard format.

The universal interactive operating system may provide programming that provides, and/or enables, processes and procedures that may be utilized to provide encryption, and/or at least one other cyber security process, and/or cyber security procedure, for use with at least one desired cyber interaction, and/or cyber activity.

The universal interactive operating system may provide programming that provides, and/or enables, processes and procedures that may be utilized to require that encryption, and/or at least one other cyber security process, and/or cyber security procedure, be used for at least one cyber interaction that use radio frequency signals for cyber communication.

The universal interactive operating system may provide programming that provides, and/or enables, processes and procedures that may be utilized for backing up stored information from, and/or restoring backed up information to:
  (a) an individual's at least one point of cyber access computer;
  (b) an individual's at least one private computer;
  (c) an individual's at least one public computer;
  (d) an individual's at least one cyber telephone system; and,
  (e) an individual's at least one device-based cyber asset.

The universal interactive operating system may provide programming that provides, and/or enables, processes and procedures that may be utilized to provide for safety, security, and privacy for at least one transaction or operation selected from the group consisting of: (a) cyber financial interactions, (b) cyber financial transactions, and (c) the operation of at least one cyber-based financial record keeping system.

The universal interactive operating system may provide programming that provides, and/or enables, processes and procedures that may be utilized to provide safe, secure, and private cyber interactions between an individual, through the individual's use of an input output device and their own at least one point of cyber access computer, and at least one member selected from the group of: (a) at least one health care related cyber device that is being relied upon by the individual, and (b) at least one health care related resource that is being relied upon by the individual.

The universal interactive operating system may provide programming that provides, and/or enables, processes and procedures that may be utilized to provide at least one individual with the ability to use varying levels of security for access to, and/or the operations of, at least one component of the point-of-cyber-access cyber system.

The universal interactive operating system may provide programming that provides, and/or enables, processes and procedures that may be utilized to provide at least one individual with the ability to selectively grant, and/or to selectively deny, cyber interactions from at least one specified other, and/or cyber interactions from at least one specified cyber device of at least one other, access to: (a) the individual's at least one point of cyber access computer, (b) the individual's at least one cyber telephone system, or (c) the individual's at least one public computer.

The universal interactive operating system may provide programming that provides, and/or enables processes and procedures that may be utilized to provide at least one individual with the ability to make at least one copy of at least one of the individual's at least one file-based cyber assets available for use by at least one specified other as at least one cyber resources. The at least one cyber resource may be made available to the at least one specified other through the interactions of at least one specified other with the individual's at least one public computer.

The universal interactive operating system may provide programming that provides, and/or enables processes and procedures that may be utilized to provide an individual with the ability to selectively grant, and/or to selectively deny, cyber interactions from at least one specified other, and/or cyber interactions from at least one cyber device of at least one other, access to at least one part of the cyber resources that have been made available for the at least one specified other through the interactions of the at least one specified other with the individual's at least one public computer.

The universal interactive operating system may provide programming that provides, and/or enables, processes and procedures that may be utilized to provide an individual with the ability to safely and securely provide at least one specified other with: (a) at least one specified level of administrative control, (b) at least one specified level of access control, and (c) at least one specified level of operational access to at least one part of: (i) the individual's at least one point of cyber access computer, (ii) the individual's at least one private computer, (iii) the individual's at least one public computer, (iv) the individual's at least one device-based cyber asset, (v) the individual's at least one file-based cyber asset, (v) the individual's at least one cyber vault, and (vii) the individual's at least one cyber telephone system.

The universal interactive operating system may provide programming that provides, and/or enables, processes and procedures that may be utilized to provide at least one individual with the ability to provide at least one specified other with at least one item selected from the group consisting of: (a) at least one specified cyber resource, (b) any specified cyber content, and (c) at least one specified cyber service.

The universal interactive operating system may provide programming that provides, and/or enables processes and procedures that may be utilized to convert at least one cyber interaction output from at least one cyber device that does not use the universal interactive operating system into at least one cyber interaction output that interacts seamlessly with at least one cyber device that uses the universal interactive operating system component of the disclosed point-of-cyber-access cyber system.

The universal interactive operating system may provide programming that provides, and/or enables, processes and procedures that may be utilized to convert at least one cyber interaction output from at least one cyber device that use the universal interactive operating system into at least one cyber interaction output that interact seamlessly with at least one cyber device that uses at least one operating systems other than the universal interactive operating system component of the disclosed point-of-cyber-access cyber system.

The universal interactive operating system may provide programming that provides, and/or enables, processes and procedures that may be utilized to provide at least one interoperability processes to convert cyber content that is not in a format that may directly be used by the universal interactive operating system, into cyber content that is in the standard universal interactive operating system format.

The universal interactive operating system may provide programming that provides, and/or enables, processes and procedures that may be utilized to provide at least one interoperability process that converts cyber content that is in a standard universal interactive operating system format into cyber content that is in at least one format that may be used by at least one cyber device that is using at least one operating systems other than the universal interactive operating system portion of the disclosed embodiment. The combination of this and the previous three processes and procedures immediately above is a reason why the interactive operating system may be described as being universal.

The universal interactive operating system may provide programming that provides, and/or enables, processes and procedures that may be utilized to provide an environment of cyber interoperability. The environment of cyber interoperability provides an individual with the ability to utilize the point-of-cyber-access cyber system to access and interact with at least one available cyber devices, and/or any available cyber content.

The universal interactive operating system may provide programming that provides, and/or enables, processes and procedures that may be utilized to use (see FIG. 17): (a) at least one virtual projector 803 (*b*) at least one virtual projection display screen 805, and (c) at least one virtual recorder or capture device 807 to convert inbound image-based cyber content that may not be used by the universal interactive operating system into image-based cyber content that may be used as universal interactive operating system standard content.

The universal interactive operating system may provide programming that provides, and/or enables, processes and procedures that may be utilized to provide for at least one safe and secure cyber interaction with at least one content, and/or device, interoperability conversion process.

The universal interactive operating system may provide programming that provides, and/or enables, processes and procedures that may be utilized to provide for at least one safe and secure cyber interaction with at least one output from at least one content, and/or device, interoperability conversion process.

The universal interactive operating system may provide programming that provides, and/or enables, processes and procedures that may be utilized to convert at least one of: (a)

at least one administrative cyber interaction, and (b) at least one systems configuration cyber interaction between cyber devices, to, and/or from, a system-standard universal interactive operating system format.

The universal interactive operating system may provide programming that provides, and/or enables, processes and procedures that may be utilized to identify inbound, and/or outbound, cyber interactions that require at least one content, and/or device, interoperability conversion.

The universal interactive operating system may provide programming that provides, and/or enables, processes and procedures that may be utilized to provide at least one individual with the ability to use at least one operating system other than the universal interactive operating system that may be a part of the point-of-cyber-access cyber system of the disclosed embodiment. The at least one individual may require the use of the at least one operating system other than the universal interactive operation system for the purpose of converting cyber content, and/or cyber interactions, that may be used by at least one operating system other than the universal interactive operating system, into cyber content, and/or cyber interactions, that may be seamlessly used by the universal interactive operating system. Further, the at least one individual may require the use of at least one operating system other than the universal interactive operating system for the purpose of using at least one computer program, and/or at least one computer application, that requires the use of at least one operating system other than the universal interactive operating system.

The universal interactive operating system may provide programming that provides, and/or enables, processes and procedures that may be utilized to exclude at least one other, and/or at least one cyber device of at least one other, from gaining at least one of: operational control, administrative control, and access control of: (a) at least one individual's at least one point of cyber access computer, (b) at least one individual's at least one private computer, (c) at least one individual's at least one public computer, and (d) at least one individual's at least one device-based cyber asset.

The universal interactive operating system may provide programming that provides, and/or enables, processes and procedures that may be utilized to exclude at least one other, and/or at least one cyber device of at least one other, from gaining administrative control, and/or access control, of at least one individual's at least one public computer, and/or of at least one individual's at least one cyber telephone system.

The universal interactive operating system may provide programming that provides, and/or enables, processes and procedures that may be utilized to provide for the use of at least one outbound cyber interaction that has been pre-processed by at least one sender. The at least one pre-processed cyber interaction of the at least one sender is ready to be used by at least one thin input output device with no further processing of content required.

The universal interactive operating system may provide programming that provides, and/or, enables processes and procedures that may be utilized to provide for at least one sender to pre-process at least one outbound cyber interaction, so that the at least one outbound cyber interaction is ready to be used by at least one thin input output device with no further processing of content required.

The universal interactive operating system may provide programming that provides, and/or enables, processes and procedures that may be utilized to provide for the pre-processing of cyber interactions that are sent from an individual's at least one point of cyber access computer to the thin input output device that is being used by the individual. In particular, these processes and procedures may require that such cyber interactions are pre-processed cyber interactions that require no further processing of content prior to use by the thin input output device that the individual is using.

The universal interactive operating system may provide programming that provides, and/or enables processes and procedures that may be used for utilizing at least one point-of-cyber-access cyber system address designation and/or at least one point-of-cyber-access cyber system identity designation for at least one step, and/or at each step, of each cyber interaction.

The universal interactive operating system may provide programming that provides, and/or enables, processes and procedures that may be utilized to provide an individual with the ability to request, and/or require, that at least one other only provide the individual with cyber interactions, and/or cyber content, that comply with the individual's preferences and/or requirements for cyber interactions, and/or for cyber content.

The universal interactive operating system may provide programming that provides, and/or enables, processes and procedures that may be utilized to provide an individual with the ability to request, or require that at least one other provide the individual with varying levels of privacy, as defined by the individual, for the individual's cyber interactions with the at least one other.

The universal interactive operating system may provide programming that provides, and/or enables, processes and procedures that may be utilized to provide at least one individual with the ability to perform at least one action selected from the group consisting of: (a) adding at least one cyber component, and/or at least one cyber device, to the point-of-cyber-access cyber system, (b) removing at least one cyber component, and/or at least one cyber device, from the point-of-cyber-access cyber system (c) altering at least one cyber component, and/or at least one cyber device, that is a part of the point-of-cyber-access cyber system, and (d) changing the configuration of at least one cyber component, and/or at least one cyber device, that is a part of the point-of-cyber-access cyber system.

The universal interactive operating system may provide programming that provides, and/or enables, the processes and procedures that may be utilized to provide at least one individual with ability to perform at least one action selected from the group consisting of:
   (a) adding at least one process, and/or at least one procedure, to the point-of-cyber-access cyber system;
   (b) removing at least one process, and/or at least one procedure, from the point-of-cyber-access cyber system;
   (c) altering at least one process, and/or at least one procedure, that is a part of the point-of-cyber-access cyber system; and,
   (d) changing the configuration of at least one process, and/or at least one procedure, that is a part of the point-of-cyber-access cyber system.

The universal interactive operating system may provide programming that provides, and/or enables, processes and procedures that may be utilized to provide an individual with the ability perform at least one action selected from the group consisting of:
   (a) adding to at least one cyber device, at least one item selected from the group consisting of: (i) at least one cyber process, (ii) at least one cyber procedure, and (iii) at least one cyber component;

(b) removing from one or more cyber devices, at least one at least one item selected from the group consisting of: (i) at least one cyber process, (ii) at least one cyber procedure, and (iii) at least one cyber component;
(c) altering at least one item selected from the group consisting of: (i) at least one cyber process (ii) at least one cyber procedure, and (iii) at least one cyber component that is a part of at least one cyber device; and,
(d) changing the configuration of at least one item selected from the group consisting of: (i) at least one cyber process, (ii) at least one cyber procedure, and (iii) at least one cyber component that is a part of at least one cyber device.

The universal interactive operating system may provide programming that provides, and/or enables, processes and procedures that may be utilized to allow an individual's point-of-cyber-access cyber system architecture, cyber devices, cyber components, cyber processes, and cyber procedures to be configured in at least one way. Providing an individual with the ability to configure, in at least one way, the individual's point-of-cyber-access cyber system architecture, cyber devices, cyber components, cyber processes, and cyber procedures provides for the varying needs and desires of different and unique individuals. Further, individuals that are entities such as businesses, or schools, or governments, or at least one other type of entity that uses a point-of-cyber-access cyber system identity designation, may have many different and specific needs for point-of-cyber-access cyber system cyber devices, cyber components, cyber processes, cyber procedures, and cyber system configurations.

The universal interactive operating system may provide programming that provides, and/or enables, processes and procedures that may be utilized to provide at least one cyber interoperability process, and/or cyber interoperability procedure, that provides at least one individual with the ability to seamlessly use at least one item selected from the group consisting of: (a) at least one non-system-standard cyber activity, (b) at least one non-system-standard cyber process, and (c) at least one non-system-standard cyber device.

The universal interactive operating system may provide programming that provides, and/or enables, processes and procedures that may be utilized to provide for the interrelationship between: (a) at least one cyber component, (b) at least one cyber device, (c) at least one cyber process, and (d) at least one cyber procedure of the point-of-cyber-access cyber system.

The universal interactive operating system may provide programming that provides, and/or enables, processes and procedures that may be utilized to provide for cyber interactions between at least two items selected from the group consisting of: (a) at least one cyber component, (b) at least one cyber device, (c) at least one cyber process, and (d) at least one cyber procedure, of the point-of-cyber-access cyber system.

The universal interactive operating system may provide programming that provides, and/or enables, processes and procedures that may be utilized to provide at least one individual, through the at least one individual's use of at least one input output device, with at least one user perceptible output.

The universal interactive operating system may provide programming that provides, and/or enables, processes and procedures that may be utilized to provide an individual with operational access to the individual's at least one point of cyber access computer. Such access may be from at least one remote input output device that may provide adequate information to the individual's at least one point of cyber access computer to allow the individual's at least one point of cyber access computer to establish the individual's identity.

The universal interactive operating system may provide programming that provides, and/or enables, processes and procedures that may be utilized to provide seamless cyber interactions when at least two input output devices are simultaneously used for at least one cyber activity.

The universal interactive operating system may provide programming that provides, and/or enables, processes and procedures that may be utilized to provide for cyber interactions utilizing at least one input device of at least one type, and/or at least one output device of at least one type.

The universal interactive operating system may provide programming that provides, and/or enables, processes and procedures that may be utilized to provide a graphic user interface (GUI). The GUI may be provided using frames and scrolls formatted image-based cyber content in conjunction with the processes that use: (a) at least one virtual projector, (b) at least one virtual projection display screen, and (c) at least one virtual recorder or capture device for: (i) conversion of, (ii) alteration of, and (iii) convergence of image-based cyber content.

The universal interactive operating system may provide programming that provides, and/or enables, processes and procedures that may be utilized to make up at least one device operating system for at least one point of cyber access computer.

The universal interactive operating system may provide programming that provides, and/or enables, processes and procedures that may be utilized to enable a point of cyber access computer to include at least one separate private computer, and to also include at least one separate public computer. The at least one separate private computer and the at least one separate public computer may both be an integral part of the at least one point of cyber access computer.

The universal interactive operating system may provide programming that provides, and/or enables, processes and procedures that may be utilized to provide a cyber system that routes and transfers cyber interactions and cyber activities within a point of cyber access computer.

The universal interactive operating system may provide programming that provides, and/or enables, processes and procedures that may be utilized to provide at least one individual with the ability to locally, and/or remotely, use at least one input output device for interacting with the individual's at least one point of cyber access computer.

The universal interactive operating system may provide programming that provides, and/or enables, processes and procedures that may be utilized to provide an individual's at least one point of cyber access computer with the ability to independently have cyber interactions with at least one other based upon predetermined operational settings, predetermined administrative settings, and predetermined access settings that were provided to the individual's at least one point of cyber access computer by the individual.

The universal interactive operating system may provide programming that provides, and/or enables, processes and procedures that may be utilized to make up at least one device operating system for at least one private computer.

The universal interactive operating system may provide programming that provides, and/or enables, processes and procedures that may be utilized to provide an individual with at least one private computer that may only be accessed by the individual, and/or by at least one individual's selected device-based cyber assets.

The universal interactive operating system may provide programming that provides, and/or enables, processes and procedures that may be utilized to exclude all others, as well as the cyber devices of all others, from having cyber interactions with an individual's at least one private computer. Because all others and the cyber devices of all others are excluded from having cyber interactions with the individual's at least one private computer, the individual's at least one private computer may provide the individual with a cyber environment that may be absolutely safe, secure, private, and free from intrusion by others as described above. The individual's at least one private computer may be configured to be at least one cyber vault.

The universal interactive operating system may provide programming that provides, and/or enables, processes and procedures that may be utilized to provide safe and secure cyber interactions between an individual's at least one private computer and all cyber activities, and/or all cyber interactions, from within the individual's at least one point of cyber access computer.

The universal interactive operating system may provide programming that provides, and/or enables, processes and procedures that may be utilized to provide an individual with the ability to use the individual's at least one private computer to run and use at least one computer program, and/or to run and use at least one computer application.

The universal interactive operating system may provide programming that provides, and/or enables, processes and procedures that may be utilized to provide an individual with the ability to store, access, use, share, and manage at least one part of the individual's lifelong collection of file-based cyber assets from within the individual's at least one private computer.

The universal interactive operating system may provide programming that provides, and/or enables, processes and procedures that may be utilized to make up at least one device operating system for at least one public computer.

The universal interactive operating system may provide programming that provides, and/or enables, the processes and procedures for an individual's at least one public computer to use so as to enable the individual's at least one public computer to participate in cyber interactions with at least one other, and/or with at least one cyber device of at least one other. Such participation may be based upon predetermined operational settings, predetermined administrative settings, and predetermined access settings that were provided to the individual's at least one public computer by the individual.

The universal interactive operating system may provide programming that provides, and/or enables, processes and procedures that may be utilized to enable an individual to: (a) use, (b) receive, and (c) store, cyber interactions, and/or cyber content, that was received from at least one other through use of the storage capabilities and/or other resources of the individual's at least one public computer.

The universal interactive operating system may provide programming that provides, and/or enables, processes and procedures that may be utilized to provide an individual with the ability to selectively grant, and/or to selectively deny, at least one other, and/or at least one cyber device of at least one other, with access to the individual's at least one public computer.

The universal interactive operating system may provide programming that provides, and/or enables, processes and procedures that may be utilized to provide an individual with the ability to selectively grant, and/or to selectively deny, at least one specified other, and/or the at least one specified cyber device of at least one specified other, access to at least one part of the individual's cyber resources that are available for use by the at least one specified other through cyber interactions with the individual's at least one public computer.

The universal interactive operating system may provide programming that provides, and/or enables, processes and procedures that may be utilized to provide for all aspects of operations of, and/or interaction with, at least one safe, secure, and full-featured cyber telephone system.

The universal interactive operating system may provide programming that provides, and/or enables, processes and procedures that may be utilized to provide an individual's at least one cyber telephone system with the ability to independently interact with at least one other, based upon predetermined operational settings, predetermined administrative settings, and predetermined access settings that were provided for the individual's at least one cyber telephone system by the individual.

The universal interactive operating system may provide programming that provides, and/or enables, processes and procedures that may be utilized for all aspects of operations of, and/or for cyber interactions with, at least one safe, secure, and full-featured cyber asset manager.

The universal interactive operating system may provide programming that provides, and/or enables, processes and procedures that may be utilized to exclude at least one of an individual's device-based cyber assets from having cyber interactions with at least one other.

The universal interactive operating system may provide programming that provides, and/or enables, processes and procedures that may be utilized to exclude at least one other from having cyber interactions with at least one individuals' at least one device-based cyber asset.

The universal interactive operating system may provide programming that provides, and/or enables, processes and procedures that may be utilized to provide an interoperable cyber environment wherein at least one interconnected cyber device of at least one type may be seamlessly used as at least one component of the point-of-cyber-access cyber system.

The universal interactive operating system may provide programming that provides, and/or enables, processes and procedures that may be utilized to provide at least one system-wide, standard, interconnected, interactive interface for use with at least one cyber device.

The universal interactive operating system may provide programming that provides, and/or enables, processes and procedures that may be utilized to provide for:
 (a) use of multiple lines of cyber communications;
 (b) use of multiple types of lines of cyber communications; and,
 (c) use of multiple providers of lines of cyber communications.

The universal interactive operating system may provide programming that provides, and/or enables, processes and procedures that may be utilized to require and provide for all devices within at least one cyber communications network to exclude all from interacting with at least one, and/or all, cyber interactions while the at least one, and/or all, cyber interactions are being transferred through the at least one cyber communications network.

The universal interactive operating system may provide programming that provides, and/or enables, processes and procedures that may be utilized to provide for each separate cyber interaction to use a separate line of cyber communications, whereby no two cyber interactions may use the same line of cyber communications at the same time.

The universal interactive operating system may provide programming that provides, and/or enables, processes and procedures that may be utilized to provide for a sender's cyber interactions to move one way only through a cyber communications line and for the recipient's cyber interactions to move one way only and to be sent through a separate cyber communications line.

The universal interactive operating system may provide programming that provides, and/or enables, processes and procedures that may be utilized to provide safe and secure cyber interactions from at least one cyber device that may be sent to, and through, an input output device that is being used by an individual and to one of the individual's at least one point of cyber access computers. Further, the universal interactive operating system may provide and enable programming that provides processes and procedures that may provide safe and secure cyber interactions from one of an individual's at least one point of cyber access computers, to and through, an input output device that is being used by the individual, to at least one cyber device.

The universal interactive operating system may provide programming that provides, and/or enables, the processes and procedures that may be utilized to route, and/or transfer, at least one cyber interaction through at least one cyber communications network.

The universal interactive operating system may provide programming that provides, and/or enables, processes and procedures that may be utilized to provide for at least one operation of the universal interactive operating system's safe, secure, and full-featured transfer packet system.

The universal interactive operating system may provide programming that provides, and/or enables, processes and procedures that may be utilized to require, and provide for the use of, at least one transfer packet label. The at least one transfer packet label may be used to provide for at least one item selected from the group consisting of: (a) security, (b) determining identity, (c) routing, (d) communicating a sender's requirements, and/or requests, and (e) at least one other required, and/or desired, utility that may be provided by information from the at least one transfer packet label.

The universal interactive operating system may provide programming that provides, and/or enables, processes and procedures that may be utilized to compare a transfer packet's label to the contents of the transfer packet.

The universal interactive operating system may provide programming that provide, and/or enable, processes and procedures that may be utilized to provide for safe and secure deletion of transfer packets that have packet contents that do not match the transfer packet's label.

The universal interactive operating system may provide programming that provides, and/or enables, processes and procedures that may be utilized to provide for safe and secure use of mobile or in-motion cyber devices such as, for example, a vehicle or a mobile cyber telephone device.

The universal interactive operating system may provide programming that provides, and/or enables, processes and procedures that may be utilized to provide and make use of at least one point-of-cyber-access cyber system address designation for at least one mobile, and/or in-motion, cyber device.

The universal interactive operating system may provide programming that provides, and/or enables, processes and procedures that may be utilized to provide for use of at least one cyber communications network by at least one mobile, and/or in-motion, cyber device.

The universal interactive operating system may provide programming that provides, and/or enables, processes and procedures that may be utilized to provide for the use of at least one global position locating device either independently or in conjunction with at least one other cyber device.

The universal interactive operating system may provide programming that provides, and/or enables, processes and procedures that may be utilized to provide at least one menu, and/or at least one other user-perceptible output, that provides at least one individual with knowledge of, and access to, at least one choice of at least one cyber interaction with at least one of: (a) at least one cyber asset, and (b) at least one cyber resource.

The universal interactive operating system may provide programming that provides, and/or enables, processes and procedures that may be utilized to provide for at least one voice recognition-driven user interface.

The universal interactive operating system may provide programming that provides, and/or enables, processes and procedures that may be utilized to provide at least one individual with the ability to perform at least one operations on at least one file-based cyber asset, and/or at least one file-based cyber resource. Such operations may be selected from the group consisting of: (a) storing, (b) accessing, (c) modifying, (d) using, (e) sharing, and (f) managing such assets and resources.

The universal interactive operating system may provide programming that provides, and/or enables, processes and procedures that may be utilized to provide at least one individual with the ability to perform at least one operation on all or any part of a lifelong collection of at least one individual's file-based cyber assets. Such operations may be selected from the group consisting of: (a) storing, (b) accessing, (c) modifying, (d) sharing, (e) using, and (f) managing such file-based cyber assets.

The universal interactive operating system may provide programming that provides, and/or enables, processes and procedures that may be utilized to provide at least one individual with at least one absolutely safe and secure location for performing at least operation on at least one part of at least one lifelong collection of at least one individual's file-based cyber assets. Such assets may be selected from the group consisting of: (a) storing, (b) accessing, (c) modifying, (d) sharing, (e) using, and (f) managing, such file-based cyber assets.

The universal interactive operating system may provide programming that provides, and/or enables, processes and procedures that may be utilized to provide at least one historical record of at least one individual's cyber activities, and/or at least one historical record of at least one of the at least one individual's device-based cyber assets' cyber activity.

The universal interactive operating system may provide programming that provides, and/or enables, processes and procedures that may be utilized to use a combination of: (a) at least one virtual projector, (b) at least one virtual projection display screen, and (c) at least one virtual recorder or capture device, to converge a plurality of sources of image-based cyber content into at least one converged source of image-based cyber content.

The universal interactive operating system may provide programming that provides, and/or enables, processes and procedures that may be utilized to use a combination of: (a) at least one virtual projector, (b) at least one virtual projection display screen, and (c) at least one virtual recorder or capture device, to alter at least one aspect of image-based cyber content in at least one way.

The universal interactive operating system may provide programming that provides, and/or enables, processes and procedures that may be utilized to provide the universal interactive operating system's set of standard cyber processes and standard cyber procedures for the use, management, and/or alteration of any image-based cyber content.

The universal interactive operating system may provide programming that provides, and/or enables, processes and procedures that may be utilized to provide for creation and use of frames-and-scrolls-formatted, image-based cyber content.

The universal interactive operating system may provide programming that provides, and/or enables, processes and procedures that may be utilized to provide for frames-and-scrolls-formatted, image-based cyber content. Such content may use the total pixel width by total pixel height size of the target image display output device to determine the total pixel width by total pixel height size of at least one image that is to be transferred to at least one image display output device.

The universal interactive operating system may provide programming that provides, and/or enables, processes and procedures that may be utilized to provide for and enable the use of image-based cyber content that has both a total pixel width and a total pixel height that are smaller than or equal to the pixel width, and/or the pixel height, of the target image display device. Such content is considered to be a cyber image in frame format as shown in FIGS. 18B and 18C.

The universal interactive operating system may provide programming that provides, and/or enables, processes and procedures that may be utilized to provide for and enable the use of image-based cyber content that has a total pixel width that is greater than the pixel width of the target image display device, and/or a total pixel height, that is greater than that of the pixel height of the target image display device. Such content is considered to be a scroll formatted cyber image as shown in FIGS. 18E and 18G.

The frames-and-scrolls-format for image-based cyber content provides an individual with ability to scroll through a scroll-formatted cyber image so that an entire scroll-formatted cyber image may be displayed, although not simultaneously.

Further, the frames-and-scrolls-format for image-based cyber content uses a pixel width by pixel height grid to identify the point on at least one frame-formatted, and/or at least one scroll-formatted cyber image, where at least one input interaction was made by at least one individual as shown in FIGS. 16C and 16F.

The universal interactive operating system may provide programming that provides, and/or enables, processes and procedures that may be utilized to provide for all aspects of operations and use of at least one safe, secure, and full-featured cyber license system.

In the at least one point-of-cyber-access cyber system license system that is enabled by universal interactive operating system, at least one licensee may be required to provide at least one licensor with:
  (a) the at least one licensee's point-of-cyber-access cyber system identity designation;
  (b) the at least one licensee's point-of-cyber-access cyber system address designation;
  (c) the identity designation of the at least one licensed cyber resource that the at least one licensee is requesting; and,
  (d) the rights the at least one licensee has to the at least one requested cyber resource.

The universal interactive operating system may provide programming that provides, and/or enables, processes and procedures that may be utilized to provide for all aspects of operations and use of at least one safe, secure, and full-featured cyber mail system.

The universal interactive operating system may provide programming that provides, and/or enables, processes and procedures that may be utilized to provide for all aspects of operations and use of at least one safe, secure, and full-featured cyber message, and/or cyber alert, system.

The universal interactive operating system may provide programming that provides, and/or enables, processes and procedures that may be utilized to provide for all aspects of operations and use of at least one safe, secure, and full-featured cyber site system.

The universal interactive operating system may provide programming that provides, and/or enables, processes and procedures that may be utilized to provide at least one sender with the option to receive at least one cyber acknowledgement of the at least one recipient's receipt of at least one cyber interaction.

The universal interactive operating system may provide programming that provides, and/or enables, processes and procedures that may be utilized to provide at least one system generated cyber message when at least one cyber activity does not execute properly.

The universal interactive operating system may provide programming that provides, and/or enables, processes and procedures that may be utilized to provide at least one individual with the ability to send to themselves, or to send to at least one other, system-generated cyber messages, and/or system-generated cyber alerts, based upon at least one parameter that the at least one individual designates.

The universal interactive operating system may provide programming that provides, and/or enables, processes and procedures that may be utilized to provide safe, secure, and private interaction between at least one of: (a) at least one health care related cyber device, and (b) at least one health care related cyber resource, that is being used, and/or relied upon, and, at least one from the group consisting of: (i) at least one individual, (ii) at least one individual's at least one private computer, and (iii) at least one individual's at least one point of cyber access computer.

The universal interactive operating system may provide programming that provides, and/or enables, processes and procedures that may be utilized to provide job management for at least one of the operation of the universal interactive operating system, and/or task management for at least one operation of the universal interactive operating system.

The universal interactive operating system may provide programming that provides, and/or enables, processes and procedures that may be utilized to provide management for at least one cyber device.

The universal interactive operating system may provide programming that provides, and/or enables, processes and procedures that may be utilized to provide for the accurate and reliable determination of the identity designation of any one specific and unique individual through use of at least one combination of sensor observed changes to the specific individual that occur with movement, and/or over time.

(8) Cyber Communications Network

The purpose of the at least one cyber communications network 300 (see FIGS. 2-15) is to safely, securely, and efficiently transfer at least one properly formatted and properly identified transfer packet from a sender to a recipient.

Transfer packets may be the only point-of-cyber-access cyber system vehicles that are used to transfer at least one cyber interaction from a sender to a recipient.

The point-of-cyber-access cyber system may use many different, and unique, transfer packet formats. The different, and unique, transfer packet formats may be used for different types of cyber activities, and/or for cyber activities that are for different purposes.

A point of cyber access computer may use differences in transfer packet formats to aid in providing security for all inbound cyber activities. The point of cyber access computer may also use differences in transfer packet formats to aid in the proper routing of cyber activities and cyber interactions.

The packet portion of a transfer packet may contain all, or a part of, a sender's cyber interaction.

A sender's cyber interaction may require at least one transfer packet. A cyber interaction that requires more than one transfer packet uses transfer packets that are identified as being a specific sequential part of a group of transfer packets.

Each transfer packet, at a minimum, has a label that may provide at least one item selected from the group consisting of:

(a) the point-of-cyber-access cyber system address designation of the recipient's point of cyber access computer;
(b) the recipient's point-of-cyber-access cyber system identity designation;
(c) the sender's point-of-cyber-access cyber system identity designation;
(d) verification of the sender's identity;
(e) the point-of-cyber-access cyber system identity designation of the sender's point of cyber access computer;
(f) verification of the designated identity of the sender's point of cyber access computer;
(g) information about the contents of the transfer packet regarding if the transfer packet is one in a connected series of transfer packets, that together, in proper sequence, make up one single cyber interaction from a sender;
(h) information about the contents of a transfer packet that may aid the recipient in determining if the sender's cyber interaction conforms with the recipient's requirements, and/or preferences, for privacy, and/or the recipient's requirements, and/or preferences, for cyber interaction content; and,
(i) at least one historical record of at least one cyber interaction that the transfer packet has with at least one point-of-cyber-access cyber system cyber device.

A transfer packet label may include any information about the sender, and/or any information about the contents of the transfer packet, that were required, and/or desired, by the sender, and/or the recipient, of the cyber transfer packet.

Recipients of transfer packets may require that transfer packets include additional label information that may include any information about the sender, and/or about the contents of the transfer packet, that may aid the recipient in determining if the sender's cyber interaction will be allowed to gain access to the recipient's point of cyber access computer.

An example of a recipient's requirements for additional transfer packet label information about the sender, and/or about the contents of a transfer packet, would occur if a recipient required all business senders to identify the sender as being a business. The recipient may further require cyber interactions from a business to identify if the business was making an unsolicited marketing cyber interaction. In such a case the recipient may have the ability to exclude all unsolicited business marketing cyber interactions from gaining further access to the recipient's point of cyber access computer.

The at least one cyber communications network (see FIG. 15), may require that at least one individual be properly identified prior to at least one step, and/or prior to each step that an individual's cyber interaction takes throughout the at least one cyber communications network. Further, the cyber communications network may require that at least one, and/or that each, cyber device be properly identified prior to at least one step, and/or prior to each step, that a cyber device's cyber interaction takes throughout the at least one cyber communications network. Cyber interactions from at least one improperly, and/or inadequately, identified individual, and/or at least one improperly and/or inadequately, identified cyber device, may not be able to be transferred through the at least one cyber communications network.

The cyber devices that make up the at least one cyber communications network may not have the ability to make changes to transfer packet labels, and/or transfer packet contents.

A recipient may have the ability to keep at least one part of a complete historical record of transfer packet label information from at least one inbound cyber interaction that is received by the recipient. The recipient may also have the ability to keep at least one historical record of transfer packet label information from at least one inbound cyber interaction that was denied access to the recipient's at least one point of cyber access computer.

Communications between the devices within the at least one cyber communications network may use wire, optical fiber, radio frequency, at least one other means, or at least one combination thereof that provides adequate utility. When radio frequency is used for cyber communications, the point-of-cyber-access cyber system may use encryption, and/or at least one other cyber security process, that may make the contents of at least one transfer packet useless to all but the sender and the recipient.

The at least one device in the at least one cyber communications network (see FIG. 15), the at least one input output device, the at least one point of cyber access computer, and the at least one remote device-based cyber asset may each provide separate security-based cyber interactions as an integral part of a corresponding cyber interaction that is being transferred between the same two point-of-cyber-access cyber system cyber devices. This process may be used to prevent intruders from interacting with transfer packets, and/or the operations of the cyber communications network.

At least one device that is a component of the at least one cyber communications network may keep at least one historical record of its own cyber activities, and/or cyber interactions.

The device within the at least one cyber communications network, that comes in first contact with cyber interactions from an individual's point of cyber access computer, may establish the identity of the individual's point of cyber access computer prior to the transfer of the individual's cyber interaction. The device within the at least one cyber communications network that come in first contact with the individual's point of cyber access computer may use at least one safe, secure, and accurate process, test, or method to establish the identity of the individual's point of cyber access computer.

After having properly established the identity of an individual's point of cyber access computer, the device within the cyber communications network that comes in first contact with cyber interactions from the individual may then provide verification of the identity of the individual's point of cyber access computer prior to at least one step, and/or prior to each step, that the individual's cyber interaction takes throughout the point-of-cyber-access cyber system.

(9) Input Output Device

The purpose of the at least one input output device 100 (referring again to FIG. 1) in the preferred embodiment of the disclosed point-of-cyber-access cyber system is to:
- (a) send input from an individual using the input output device, through the cyber communications network, to the individual's at least one point of cyber access computer;
- (b) receive output for the individual that was sent from the individual's point of cyber access computer, through the at least one cyber communications network, to the input output device that is being used by the individual;
- (c) provide output from the input output device that may enable the individual's point of cyber access computer to establish the identity of the individual that is using the input output device; and,
- (d) provide output from the input output device that provides the individual with the ability to: (i) perceive at least one cyber interactions, and/or (ii) interact with at least one cyber interaction that was sent to the input output device from the individual's at least one point of cyber access computer through the use of the at least one cyber communications network.

As shown in FIG. 1, the at least one input output device 100 uses the at least one cyber communications network 300 to transfer at least one transfer packet between the input output device that is being used by an individual and the individual's at least one point of cyber access computer.

The at least one input output device 100 uses at least one operating system that provides functional and operational programming for the functions of the at least one input output device.

One type of input output device is a thin input output device 100, A thin input output device has limited processing and functional capabilities. A thin input output device relies on at least one other device to have previously processed the content of the cyber interaction to be sent so that the cyber interaction may be used by the thin input output device with no further processing of content.

As a part of its operations, one type of input output device 100 has the ability to store its at least one operating system, and/or store at least one cyber interaction, that is desired, and/or required, to be stored.

An input output device 100 may also be a cyber telephone device. When an input output device is also a cyber telephone device, an individual's point of cyber access computer 200 may initiate cyber telephone communication interactions with the individual at the individual's input output/cyber telephone device. When an individual is using an input output device that is not a cyber telephone device, the individual would need to initiate the cyber telephone communication process.

Cyber interaction from an individual to the individual's point of cyber access computer may originate from an input output device 100. The input output device 100 may provide the individual's point of cyber access computer with information that allows the individual's point of cyber access computer to properly establish the individual's identity.

Sending a cyber interaction from an individual using an input output device to the individual's point of cyber access computer may require that the input output device use properly formatted transfer packets. The properly formatted transfer packets are preferably addressed to the individual as the recipient. The address may contain the individual's identity designation, as well as the address designation and the identity designation of the individual's point of cyber access computer that will receive the interaction.

Sending a cyber interaction from an individual's point of cyber access computer to an input output device that is being used by the individual may require that the individual's point of cyber access computer send properly formatted transfer packets to the input output device. The to-the-input-output-device formatted transfer packets may be addressed to the identity designation and address designation of the input output device that is being used by the individual.

Upon first contact with the individual's point of cyber access computer, the individual's cyber interaction's request for access may be routed to the processes and procedures for granting the individual's cyber interactions access to the individual's point of cyber access computer.

Following an individual's request for the individual's cyber interaction to gain access to the individual's own point of cyber access computer, process and procedures may be executed for establishing the identity of this specific individual. The cyber interactions from the individual that is using the input output device may only be granted access to the individual's own point of cyber access computer after the individual's own point of cyber access computer has accurately established the individual's identity.

An individual's point of cyber access computer, working in conjunction with the input output device that is being used by the individual, may use: (a) at least one combination of sensor observed changes to a person as an individual that occur with movement of the person, and/or occur over time (b) at least one other suitable method of identity confirmation known to those skilled in the art, and (c) at least one combination thereof, to remotely establish the individual's identity.

Once cyber interactions from the individual gain access to the individual's properly configured point of cyber access computer, the cyber interactions from the individual may be routed to the individual's private computer. It is at the individual's private computer where the individual, through the individual's interactions with the input output device, may have safe and secure operational and administrative access to at least one item selected from the group consisting of: (a) the individual's at least one private computer, (b) the individual's at least one point of cyber access computer, (c) the individual's at least one public computer, (d) the individual's at least one cyber asset, (e) the individual's at least one cyber resource, and (f) the individual's at least one cyber telephone system.

An individual's at least one private computer may be configured to where only cyber interactions from the individual may gain access to the individual's at least one private computer 230 (see FIGS. 2-12). An individual's at least one private computer may also be configured to where all cyber interactions from all others may be excluded from gaining access of any kind to the individual's at least one private computer.

Once the individual has gained access to the individual's private computer 230, through the individual's interactions with the input output device, the individual may be provided with options for further cyber interactions.

Referring again to FIG. 3, an individual using at least one input output device 100 sends at least one cyber interaction through the cyber communications network to the individual's private computer 230. In turn, the individual's private computer 230 processes the individual's at least one cyber interaction. The cyber interaction to be processed by the individual's private computer 230 may include at least one cyber activity that is available for use by the individual through at least one item selected from the group consisting of: (a) the individual's at least one point of cyber access computer 200, (b) the individual's at least one public computer 260, (c) the individual's at least one cyber asset, (d) the individual's at least one cyber resource, and (e) the individual's at least one cyber telephone system.

Cyber interactions with cyber activities, cyber interactions with cyber devices, and cyber interactions with cyber content that are available for use by the individual through the individual's private computer 230 may include at least one item selected from the group consisting of: (a) the individual's at least one computer program, and/or application, (b) the individual's at least one cyber telephone system, (c) the individual's at least one cyber asset manager, (d) the individual's at least one home automation system and its at least one resource, (e) the individual's at least one vehicle, (f) the individual's at least one owned copy of cyber television content, (g) the individual's cyber video entertainment and cyber music (h) the individual's at least one cyber asset which may include cyber activity history, personal financial information, personal health information, photographs, or at least one other cyber activity, cyber device, or cyber content, and (i) access to at least one cyber resource of at least one other that is available for the individual's use including books, magazines, newspapers, libraries, the cyber educational system, cyber services, the cyber health system, or at least one other cyber resource.

As a result of an individual's cyber interactions, at least one computer selected from the group consisting of: (a) the individual's at least one private computer 230, (b) the individual's at least one point of cyber access computer 200, and (c) the individual's at least one public computer 260, may respond to the individual by sending cyber interactions through the at least one cyber communications network to the input output device 100 that is being used by the individual.

An example would be that the individual at the input output device 100 interacts with an image on the display screen of the input output device 100. Several images appearing on the display screen provide the individual with choices for cyber interactions that are labeled for identification purposes. The individual interacts with one of the images appearing on the display screen of the input output device 100, thereby communicating the interaction to the individual's remote point of cyber access computer. The individual's point of cyber access computer, in turn, processes the individual's cyber interaction, and responds by providing the input output device 100 that the individual is using with a new image and associated links. The new image and associated links are the result of processing the individual's immediately prior cyber interaction by the individual's point of cyber access computer.

Another example would be that instead of a physical interaction with the display screen on the input output device, the individual speaks certain words, such as the instruction to open the garage door, into the input output device 100. The input output device 100 communicates the individual's spoken cyber interaction to the individual's point of cyber access computer. In turn, the individual's point of cyber access computer operates the individual's garage door opener. The individual's point of cyber access computer may or may not notify the individual at the input output device of the status of the opening of the garage door, depending on the previously established preferences of the individual.

An individual's point of cyber access computer may have the ability to remotely alter the functional, and/or operational, settings of the input output device 100 that is being used by the individual.

One possible result of an individual's cyber interactions with the individual's point of cyber access computer may be that the individual's point of cyber access computer responds in part, or in whole, to the individual's cyber interactions by providing cyber interactions that alter the functional, and/or operational, settings of the input output device 100 that is being used by the individual.

Alterations to the functional, and/or operational, settings of the input output device 100 may be requested by at least one requester selected from the group consisting of: (a) the input output device 100, (b) the individual (through the individual's interactions with the input output device 100) (c) the individual's point of cyber access computer (d) at least one cyber device, and (e) at least one executed cyber file.

The input output device 100 may have the ability to return to predetermined functional, and/or operational, settings upon request, or upon completion of a cyber interaction that requested or required the altered functional and operational settings for the input output device.

An individual's point of cyber access computer and an input output device 100 may each establish an interconnection with the cyber communications network. This cyber communications network interconnection may be an interconnection ranging from a momentary single line cyber communications network interconnection, to continuous multiple line cyber communications network interconnections.

Cyber interaction between an input output device 100 and the individual's point of cyber access computer 200 that are transferred using at least one cyber communications network may simultaneously include at least one instance of cyber interactions between:

(a) the individual's at least one cyber asset and the individual's at least one cyber asset manager;
(b) the individual using an input output device 100 and the individual's at least one point of cyber access computer 200;
(c) at least one cyber resource and the individual's at least one public computer 260
(d) the individual's at least one private computer 230 and the individual at an input output device 100;
(e) the individual's at least one point of cyber access computer 200 and at least one cyber device;
(f) the individual's at least one private computer 230 and at least one cyber asset;
and,
(g) the individual's at least one public computer 260 and at least one cyber resource.

The input output device 100 may be used as a cyber communications network link between at least one device-based cyber assets or device-based cyber resources and an individual's point of cyber access computer.

The input output device 100 may use at least one line of cyber communication. The at least one line of cyber communication may be between an input output device 100 and an individual's point of cyber access computer, or between an input output device 100 and at least one device-based cyber assets or cyber resource.

The operations of a thin input output device 100 are limited to processing only functional and operational programming. Therefore, the thin input output device 100 may only run the programming that is required for the operations of the thin input output device itself. When working in conjunction with a thin input output device, an individual's point of cyber access computer must provide all required processing, management, and support for every interaction that is sent to the thin input output device 100.

Cyber interactions from an individual's point of cyber access computer to a thin input output device 100 that the individual is using should be pre-processed and made ready for use by the input output device prior to being sent through the cyber communications network.

The input output device 100 may, upon first cyber interaction with an individual's point of cyber access computer, provide the individual's point of cyber access computer with information about the display screen size, the type of display screen the input output device is equipped with, as well as information about the operational capabilities and the operational settings of the input output device 100.

An input output device's components may include at least one component selected from the group consisting of:
 (a) one point-of-cyber-access cyber system identity designation;
 (b) one point-of-cyber-access cyber system address designation;
 (c) at least one device that provide operations for transferring cyber transfer packets over a cyber communications network;
 (d) at least one interconnecting circuit;
 (e) at least one sources of power;
 (f) at least one protective housing;
 (g) at least one image display;
 (h) at least one audio output device 909;
 (i) at least one camera 911;
 (j) at least one microphone 913;
 (k) at least one manual input device;
 (l) at least one cyber storage device;
 (m) at least one auxiliary input means for interaction with at least one other cyber device; and,
 (n) at least one auxiliary output means for interaction with at least one other cyber device.

The universal interactive operating system may provide at least one operating system that provides an input output device 100 with the ability to be used as a point-of-cyber-access cyber system input output device.

The universal interactive operating system may provide at least one program that may be utilized to provide for the interoperable use of the input output device 100 as an input output device 100 that may engage in cyber interactions with cyber devices that do not use the universal interactive operating system.

The universal interactive operating system may provide at least one program that provides an individual with the ability to alter the operational configuration of the input output device 100 on a temporary or permanent basis.

The universal interactive operating system may provide the at least one program that provides the identity designation of an input output device to the first device in the cyber communications network that the input output device 100 has cyber interactions with.

The universal interactive operating system may provide the at least one program that provides the input output device with the ability to provide all necessary cyber communications functions, including use of properly formatted transfer packets for interactions with at least one type of cyber device.

The input output device 100 may have at least one connection from the group consisting of: (a) being an integral part of a point of cyber access computer, (b) being directly connected to a point of cyber access computer, and (c) operating as a separate remote cyber device that communicates with a remote point of cyber access computer through use of at least one cyber communications network 300.

Communications between the input output device 100 and the individual's point of cyber access computer may use at least one communications means selected from the group consisting of: (a) radio frequency, (b) fiber optics, (c) wire, (d) at least one other suitable method for communications known to those skilled in the art, and (e) at least one combination thereof.

A remote, thin input output device 100 may provide an individual with the highest attainable level of functional utility and computing and communications mobility.

The input output device 100 may have the ability to interact with at least one cyber device that is capable of interacting with an input output device.

The input output device 100 may include at least one of the following sources for receiving input: (a) at least one camera, (b) at least one microphone, (c) at least one keyboard, (d) at least one pointing device, (e) at least one touch or multi-touch display screen, (f) at least one digital tablet, (g) at least one sensor of at least one type, (h) at least one input device of at least one type, (i) at least one media reader, (j) at least one stored information link, (k) at least one global position locating device, (l) at least one interconnection for other input devices, and (m) at least one other sources of input known to those skilled in the art.

The input output device 100 may include at least one of the following ways of providing output: (a) at least one image display device, (b) at least one audio output device, (c) at least one tactile output device, (d) at least one interconnection for other output devices, and (e) at least one other useful output known to those skilled in the art.

The size of the image display screen on the input output device may range from the smallest usable image display size to the largest image display size available.

The input output device 100 may include at least one remote, and/or local, connection for cyber interaction with an individual's point of cyber access computer.

Each input output device that is not an integral part of a point of cyber access computer has a unique point-of-cyber-access cyber system identity designation and a mobile or stationary point-of-cyber-access cyber system address designation.

At least one individual may use at least one properly configured input output device for at least one cyber interaction with the individual's at least one remote point of cyber access computer. Input output devices need not be user-specific. Properly configured input output devices may also be utilized as cyber telephone devices.

Computers such as those incorporated into cell phones, laptop computers, or desktop computers may also be used as single-point-of-access cyber system input output devices. These types of input output devices have the ability to provide the additional feature of local computing functions to the individual.

The individual may require the use of the input output device 100 for cyber interactions with the individual's remote point of cyber access computer. In some embodiments, the input output device 100 may be configured with two 8.5"×11" multi-touch, digital tablet-enabled image display screens that are hinged together like a book in portrait format as shown in FIG. 16B. The illustrated input output device 901 shown in the array of images appearing in FIGS. 16A-16F makes an excellent, lightweight, and manageable cyber book, or an input output device that may be used to review cyber-based content of at least one kind. The input output device shown in the array of images in FIGS. 16A-16F is typically not a computer. Rather, the input output device shown in the array of images in FIGS. 16A-16F is typically a remote thin input output device that is used for cyber interactions with an individual's at least one point of cyber access computer, and/or for cyber interactions with at least one other cyber device.

As shown in FIGS. 16A and 16B, if the individual takes the input output device 901 that the individual is holding in book configuration and the individual places the input output device on a table where it is oriented as, and may be used as, an open laptop computer, then, through use of at least one cyber communications network interconnection with the individual's at least one point of cyber access computer, this input output device may become a remote terminal for cyber interactions with the individual's at least one point of cyber access computer.

An individual may use the multi-touch or the tablet functions of the image display screens on the illustrated input output device as keyboards or as a tablet for drawing, or as a tablet for handwriting, or as a tablet for marking of content.

Both of the image display screens on the illustrated input output device may also be arranged side-by-side to form one single larger sized image display screen.

With a 180-degree flip and a fold over of one of the image display screens of the input output device as shown in FIGS. 16D and 16E, the input output device may be transformed into a single-screen digital pad, or a digital tablet, or an interactive single screen image display device as shown in FIG. 16F.

As shown in FIG. 16D, an input output device may include at least one camera, microphone, or speaker to provide for multimedia functions and to provide the individual's point of cyber access computer with information that may be used to establish the individual's identity.

The previously described remote input output device may well be a commonly used mid-sized portable input output device. An input output device such as an iPhone-sized thin input output device puts interpersonal cyber communications as well as all of the capabilities of an individual's remote point of cyber access computer in the palm of the mobile individual's hand.

Televisions, telephones, and other devices that provide audio/visual output may easily be adapted, by a person skilled in the art, for use as an input output device that may be used with the disclosed point-of-cyber-access cyber system.

The input output device 100 may be configured to provide additional functions beyond that of a basic input output device. These additional functions may be used to provide for the needs of at least one disabled individual, for integration of the input output device into at least one special or single-purpose cyber system, or for at least one other purpose.

(10) Cyber Communications Network Between an Input Output Device and a Point of Cyber Access Computer The purpose of the part of the cyber communications network 300 that is used between the input output device 100 and the individual's point of cyber access computer is to safely and securely transfer at least one properly formatted and properly identified transfer packet between the input output device 100 and the individual's point of cyber access computer.

There may be unique transfer packet formats for:
 (a) cyber interactions from an individual's point of cyber access computer, to and through the cyber communications network 300, and to the individual that is using the input output device 100;
 (b) cyber interactions from an individual using the input output device 100, to and through the cyber communications network 300, and to the individual's point of cyber access computer;
 (c) cyber interactions from at least one of an individual's cyber assets, to and through the input output device 100 that is being used by the individual, to and through the cyber communications network 300, and to the individual's point of cyber access computer;
 (d) cyber interactions from the cyber resources of others, to and through the input output device 100 that is being used by an individual, to and through, the cyber communications network 300, and to the individual's point of cyber access computer; and,
 (e) cyber interactions from an individual's point of cyber access computer, to and through the cyber communications network 300, to and through the input output device 100 that is being used by the individual, and to at least one cyber asset, and/or to at least one cyber resource.

Cyber interactions between the input output device 100 and the individual's at least one point of cyber access computer may use:
 (a) multiple lines of cyber communications;
 (b) multiple types of lines of cyber communications; and,
 (c) multiple sources of lines of cyber communications.

Cyber interactions that use the part of the cyber communications network 300 between the input output device 100 and the individual's point of cyber access computer may be protected from intrusion, and/or interference by others through the use of encryption, or by other cyber security measures known to those skilled in the art. Encryption may be used to render the contents of a transfer packet useless to all but the sender and the recipient.

The part of the cyber communications network 300 between an input output device 100 that is being used by the individual and the individual's at least one point of cyber access computer uses at least one of the following for the transfer of transfer packets: (a) radio frequency, (b) fiber optics, (c) wire, (d) at least one other suitable transfer method, and (e) at least one combination thereof.

The cyber devices, cyber processes, and cyber procedures that serve the part of the cyber communications network 300 between the input output device 100 and the individual's at least one point of cyber access computer may be configured to provide for transfers of at least one transfer packet that is free from intrusion and interference by others.

(11) Point of Cyber Access Computer

A point of cyber access computer 200 may be configured to provide one specific individual with a safe and secure remotely accessible point of cyber access computer that provides this one individual with a point to gain access to at least one asset selected from the group consisting of: (a)

computing capabilities, (b) the individual's cyber assets, (c) the individual's cyber telephone system, and (d) cyber resources.

The individual's portal for cyber access may be the individual's point of cyber access computer 200. The point-of-cyber-access cyber system 10 provides a system architecture in which each individual that uses the point-of-cyber-access cyber system 10 has at least one point where the individual may gain access to cyber activities, to cyber telephone communications, to cyber assets, and to available cyber resources. Further, at least one other may have at least one point of cyber access where the at least one other may interact with this specific individual for cyber telephone communications and for cyber interactions.

The foundation for configuring the point-of-cyber-access cyber system 10 in such a way as to have it provide highest levels of cyber security, privacy, and safety is to require that:
 (a) each individual should be properly identified prior each step the individual's cyber interactions take throughout the point-of-cyber-access cyber system 10; and,
 (b) each cyber device should be properly identified prior each step the cyber device's cyber interactions take throughout the point-of-cyber-access cyber system 10.

An individual that desires to use the disclosed point-of-cyber-access cyber system 10 may use the input output device 100 for remote, and/or local, cyber interactions with the individual's point of cyber access computer 200. The input output device 100 may be used to provide the individual's point of cyber access computer 200 with information that allows the individual's point of cyber access computer 200 to establish the individual's identity.

After an individual's identity has been established by the individual's point of cyber access computer 200, the individual may be granted access to the individual's point of cyber access computer 200. Further, after the individual's identity has been established by the individual's point of cyber access computer 200, the individual's point of cyber access computer 200 may provide verification of the individual's identity prior to at least one step, and/or prior to each step that the individual's cyber interaction takes throughout the point-of-cyber-access cyber system 10.

An individual's point of cyber access computer may be configured to have the ability to establish the individual's identity and to provide verification of the individual's identity.

The point of cyber access computer 200 may be configured to include at least one separate private computer 230, and/or at least one separate public computer 260. Therefore, the point of cyber access computer 200 may be configured to be a combination of these three separate types of computers.

Each individual that uses the point-of-cyber-access cyber system 10 may be required to be properly identified. An individual's point of cyber access computer 200 may establish an individual's identity. After the individual's identity has been established, the individual may then gain access to the individual's private computer 230. Once the individual has gained access to the individual's private computer 230, the individual may have full operational access and administrative access to not only the individual's private computer 230, but also to the individual's point of cyber access computer 200 and to the individual's public computer 260 as well.

At least one configuration of the device architecture of the point of cyber access computer may solve many of the significant problems with prior art cyber systems and computers. An individual's point of cyber access computer may be optimally configured to be comprised of at least one of three separate types of computers. These types of computers include:
 (a) the individual's point of cyber access computer;
 (b) the individual's private computer; and,
 (c) the individual's public computer.

The individual's point of cyber access computer 200 may be configured to provide security, access control, and internal routing for all of the individual's point of cyber access computer's cyber activities. The individual's point of cyber access computer 200 may also provide interoperability processing, and/or conversion, as needed for inbound cyber activities, for outbound cyber activities, and for internal cyber activities.

Figure 11:
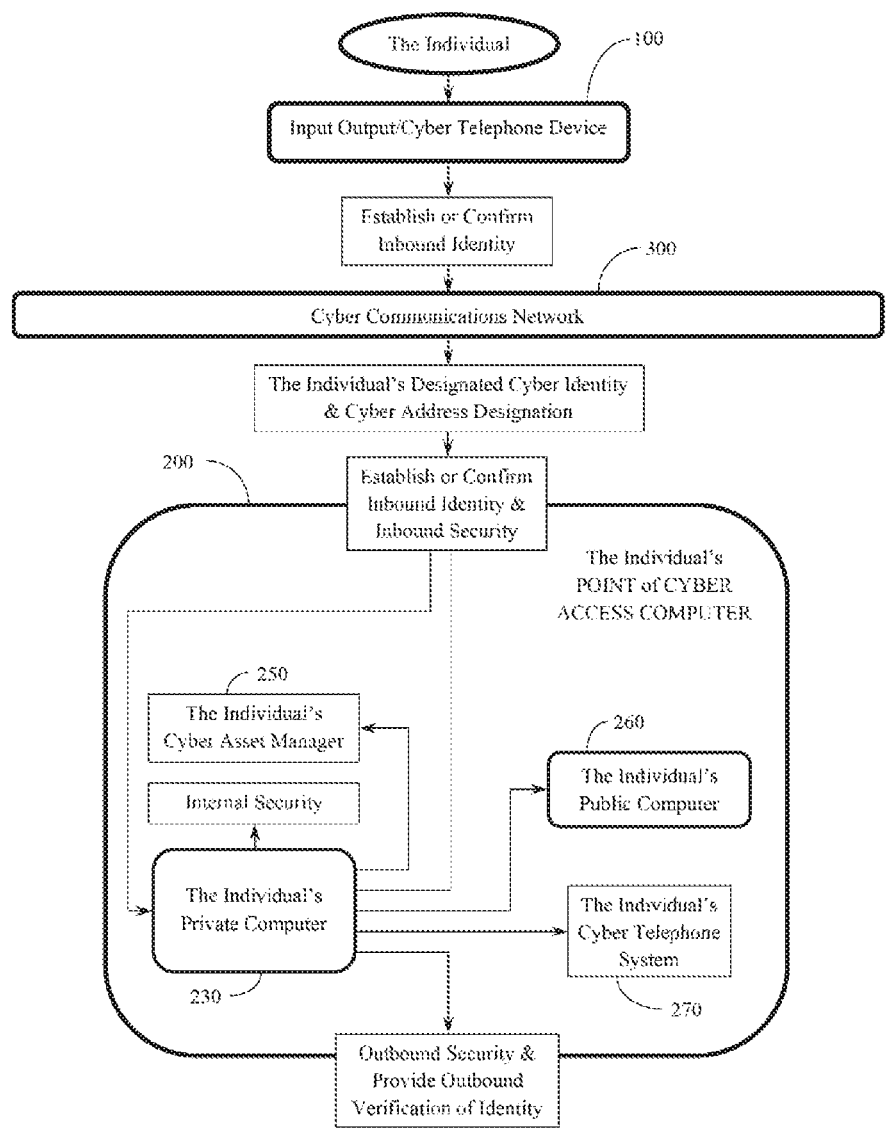
FIG. 11 is a schematic diagram that illustrates particular, non-limiting embodiments of an individual's administrative-based, management-based, and operational cyber activities which may be associated with the individual's cyber assets in the systems and methodologies disclosed herein.
Figure 12:
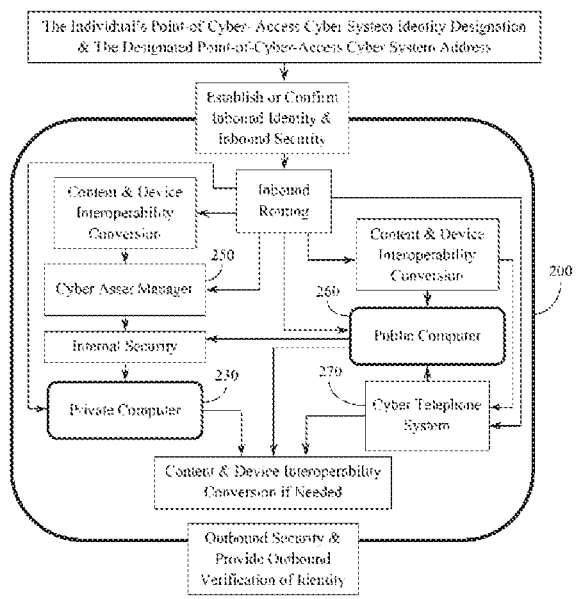
FIG. 12 is a schematic diagram that illustrates a particular, non-limiting embodiment of a point of cyber access computer in accordance with the teachings herein, as well as components, interconnections, and associated cyber activities that may occur within the point of cyber access computer.

As shown in FIG. 11 an individual may gain administrative control and operational control of the individual's point of cyber access computer 200 through the individual's private computer 230.

An individual may have cyber interactions with the individual's private computer through the individual's use of the input output device 100. The individual's private computer 230 may provide the individual with the ability to have cyber interactions with: (a) the individual's point of cyber access computer 200, (b) the individual's public computer 230, (c) the individual's cyber telephone system 270, (d) the individual's cyber assets, and (e) available cyber resources. The individual's private computer 230 may also provide the individual with the ability to have cyber interactions with at least one other.

An individual's point of cyber access computer 200 may be configured to establish the individual's identity prior to providing access (to the individual's point of cyber access computer 200) to the individual's cyber interactions. The individual's point of cyber access computer 200 may also be configured to establish the identity of at least one of the individual's device-based cyber assets prior to allowing the individual's device-based cyber asset's cyber interactions to gain access to the individual's point of cyber access computer 200.

The individual's private computer may be configured such that access to the individual's private computer 230 may only be granted to cyber interactions from the individual, and to cyber interactions from at least one specified cyber asset of the individual. The individual's private computer may also be configured such that cyber interactions from all others, and cyber interactions from the cyber devices of all others, may be excluded from gaining access to the individual's private computer.

The individual's public computer 260 may be configured to be the only component of the individual's point of cyber access computer 200 where others may participate in cyber interactions with the individual, and/or where others may gain access to the individual's selected cyber resources. The individual's public computer and point of cyber access computer may be configured such that cyber resources may only be made available to others through the individual's public computer 260, and only with the permission of the individual.

An individual may choose to share at least one part of the individual's file-based cyber assets with specified others. The individual may make at least one part of the individual's file-based cyber assets available to at least one specified other by providing the specified others with copies of the individual's file-based cyber assets. These copies may be placed in the individual's properly configured public computer where they may be made available to be accessed by specified others through the others' cyber interactions with the individual's public computer 260.

File-based cyber resources are an individual's file-based cyber assets that have been copied to the individual's public computer 260 and then used by at least one specified other.

Preferably, the point-of-cyber-access cyber system 10 is configured to require the use of different and unique processes, procedures, formats, transfer packets, and/or codes, for the operations of, and for cyber interactions with and between any of: (a) a point of cyber access computer 200, (b) a point of cyber access computer's private computer 230, and (c) a point of cyber access computer's public computer 260. This arrangement may impart important security features of the disclosed point-of-cyber-access cyber system.

The point of cyber access computer 200 may pre-process outbound cyber interactions to the input output device 100 so that the outbound cyber interactions may be transferred to, and used by, the input output device 100 with no further processing of content required.

The point of cyber access computer 200 may be configured to provide an individual with the ability to provide others with the individual's requests, and/or requirements for privacy, as well as the individual's preferences, and/or requirements, for inbound cyber activities and for inbound cyber content.

The individual's at least one point of cyber access computer 200 may be configured to provide:

(a) at least one point where the individual may gain identified access to the point-of-cyber-access cyber system 10;
(b) at least one point where others may access the individual for cyber interactions;
(c) cyber security;
(d) an individual with cyber interactions with at least one cyber communications network 300;
(e) cyber interactions with the input output device 100 that is being used by the individual;
(f) cyber interactions using a cyber telephone device;
(g) routing of cyber activities;
(h) with access to the individual's at least one private computer 230;
(i) verification of the individual's identity prior to at least one step, and/or prior to each step, that the individual's cyber interaction takes throughout the point-of-cyber-access cyber system 10;
(j) the ability to send outbound cyber interactions to an input output device or to remote cyber devices;
(k) the ability to deny access to the individual's private computer 260 by cyber interactions from all others and by cyber interactions from the cyber devices of all others;
(l) cyber interaction and security between the individual's at least one point of cyber access computer 200 and the individual's at least one private computer 230;
(m) cyber interaction and security between the individual's at least one point of cyber access computer 200 and the individual's at least one public computer 260;
(n) cyber interaction and security between the individual's at least one private computer 230 and the individual's at least one public computer 260;
(o) processes and procedures that may confirm the identity of each other prior to granting or denying the cyber interactions of each selected other access to the individual's at least one point of cyber access computer 200;
(p) an individual with the ability to provide at least one specified other access to the individual's at least one public computer 260 for at least one specified purpose;
(q) an individual with the ability to send at least one outbound cyber interaction from the individual's at least one public computer 260;
(r) verification of the individual's identity when the individual is sending at least one outbound cyber interaction;
(s) verification of the individual's identity for the individual's interactions with the individual's at least one device-based cyber asset;
(t) processes and procedures for establishing the identity of the individual's at least one device-based cyber asset prior to allowing cyber interactions from the individual's at least one device-based cyber asset to gain access to the individual's at least one point of cyber access computer 200;
(u) processes and procedures for providing at least one device, and/or at least one file interoperability conversion process, to and from the point-of-cyber-access cyber system standard format; and,
(v) at least one cyber telephone system that provide cyber telephone, and/or cyber video telephone services.

As shown in FIG. 13, the individual's private computer 230 may be configured to provide an individual with at least one of the following:

(a) at least one safe, secure, and private cyber environment where no others may gain access;
(b) at least one computing capability;
(c) at least one computer program;
(d) at least one computer application;
(e) at least one historical record of cyber activities;
(f) storage, access, alteration, use, sharing, and management of at least one of the individual's file-based cyber assets that includes, but is not limited to, the individual's personal information, the individual's health information, and the individual's financial information;
(g) at least one cyber asset manager;
(h) administrative control and operational control of the individual's at least one device-based cyber asset, this may include the individual's at least one point of cyber access computer, the individual's at least one private computer, the individual's at least one public computer, the individual's at least one cyber asset manager, and the individual's at least one cyber telephone system;
(i) at least one cyber interaction with at least one other;
(j) at least one cyber interaction with at least one cyber resource of at least one other;
(k) the ability to specify at least one other that may have access to the individual's at least one public computer;
(l) at least one process that may allow the individual to share the individual's at least one file-based cyber asset with at least one other by making at least one copy of the individual's at least one file-based cyber asset available for at least one specified other as at least one cyber resource;
(m) a system that may provide the individual with the ability to specifically designate which at least one cyber resource is available for each specific other to access through the individual's at least one public computer;
(n) a system that may allow the individual to grant, and/or to deny, at least one specified other, access to the individual's at least one public computer 260; and,
(o) at least one systems that may allow the individual to grant, and/or to deny, at least one specified other, access to at least one specific cyber resource of the individual.

As shown in FIG. 14 the individual's at least one public computer 360 may be configured to provide:
(a) at least one cyber portal where at least one other may interact with the individual;
(b) cyber security;
(c) at least one computing resource (this may be provided by at least one other);
(d) the use of at least one computer program (this may be provided by at least one other);
(e) the use of at least one computer application (this may be provided by at least one other);
(f) the ability to send at least one outbound cyber interaction in response to at least one request from at least one other (this ability is preferably provided only to the individual);
(g) access to at least one resource of the individual's at least one inbound cyber mail system (this may be provided to the individual, and/or, at least one other);
(h) access to at least one resource of the individual's at least one inbound cyber messaging system (this may be provided to the individual, and/or, at least one other);
(i) at least one specified other with access to the individual's at least one cyber resource that has been selected by the individual;
(j) storage, access, alteration, use, sharing, and management of the individual's at least one file-based cyber resource;
(k) the ability to grant, and/or to deny, specified others access to at least one part of the resources of the individual's public computer 260 (this ability is preferably provided only to the individual); and,
(l) the ability to grant, and/or deny, at least one specified other access to at least one selected part of the individual's at least one cyber resource (this ability is preferably provided only to the individual).

(12) Cyber Telephone System at least one cyber telephone system 270 (see FIG. 2) may be included as at least one component of at least one point of cyber access computer.

A cyber telephone system provides services for cyber telephone, and/or cyber video telephone communications. The cyber telephone system may also be configured to send at least one automated cyber telephone communication to at least one other.

An individual may initiate outbound cyber telephone communications through the individual's use of the individual's at least one point of cyber access computer, the individual's at least one private computer, the individual's at least one public computer, and/or the individual's at least one cyber telephone system.

An individual may have the ability to grant, and/or to deny, cyber telephone system access to the cyber telephone communication cyber interactions from at least one other, and/or from the cyber interactions of at least one cyber device of at least one other.

Transfer packet label information from an inbound cyber telephone communication interaction may be used to determine if an individual may grant, and/or deny, at least one inbound cyber telephone communication interaction access to the individual's at least one cyber telephone system.

An individual may further grant, and/or deny, cyber telephone communication interactions from at least one specified other access to at least one part of the at least one service of the individual's at least one cyber telephone system.

An individual's at least one cyber telephone system may be configured to provide:
(a) cyber security;
(b) the ability for the individual to grant, and/or deny, access to at least one part of at least one service of the individual's at least one cyber telephone system by at least one cyber telephone communication interaction from at least one other, and/or from at least one cyber interaction from at least one cyber device of at least one other;
(c) routing of at least one inbound cyber telephone communication interaction, and/or at least one cyber alert, to at least one cyber telephone device that is at or near the person of the at least one recipient;
(d) at least one message-taking system;
(e) routing of at least one cyber telephone communication interaction to the individual's at least one cyber telephone system's message taking system;
(f) at least one message for the at least one sender of at least one inbound cyber telephone communication interaction;
(g) the ability for the individual to re-direct at least one inbound cyber telephone communication interaction to at least one different recipient, and/or at least one different cyber device; and,
(h) at least one historical record of at least one cyber telephone system activity.

An individual, using an input output device, after gaining access to the individual's at least one private computer, may have complete operational control, administrative control, and access control of the individual's at least one cyber telephone system.

An individual may have the ability to simultaneously interact with at least one one member selected from the group consisting of: (a) the individual's at least one cyber telephone system, (b) the individual's at least one point of cyber access computer, (c) the individual's at least one private computer, (d) the individual's at least one personal computer, and (e) the individual's at least one device-based cyber asset.

The programming, processes, and procedures of the universal interactive operating system may be configured to provide for complete security for at least one cyber telephone communication interaction that is transferred from the individual's at least one cyber telephone system to the individual's at least one private computer, and/or to the individual's at least one public computer.

(13) Cyber Communications Network Between a Sender's Point of Cyber Access Computer and a Recipient's Point of Cyber Access Computer The purpose of the part of the cyber communications network 300 that is used between a sender's point of cyber access computer and a recipient's point of cyber access computer is to safely and securely transfer at least one properly formatted and properly identified transfer packet between a sender's point of cyber access computer and a recipient's point of cyber access computer.

A sender's cyber interaction that is to be directed to a recipient may originate with the sender's interactions with an input output device. The cyber interaction from the sender's interactions with the input output device goes to and through the cyber communications network, and may go to and through the sender's point of cyber access computer, to and through the cyber communications network 300, to and through the recipient's point of cyber access computer, and then to the public computer within the recipient's point of cyber access computer.

A sender's cyber interaction to a recipient may also come from the sender's public computer and go to and through the sender's point of cyber access computer, to and through the cyber communications network, to and through the recipient's point of cyber access computer, and then to the recipient's public computer.

A sender's cyber interaction to a recipient may also come from the sender's point of cyber access computer and go to and through the cyber communications network, to and through the recipient's point of cyber access computer, and then to the recipient's public computer.

There may be many unique types of transfer packets for cyber interactions from the sender's point of cyber access computer to the recipient's point of cyber access computer. The different and unique types of transfer packets are used to identify different types of cyber activities in order to provide a high level of security for both the sender and the recipient.

Cyber interactions between a sender's point of cyber access computer and a recipient's point of cyber access computer may use at least one:

(a) line of cyber communications
(b) type of line of cyber communications; and,
(c) source of lines of cyber communications.

A sender may be required to be properly identified prior to each step the sender's cyber interactions take throughout the at least one cyber communications network 300.

Cyber interactions that use the part of the cyber communications network 300 between a sender's point of cyber access computer 200 and a recipient's point of cyber access computer 200, and most especially cyber interactions that use radio frequency, may be protected from intrusion and interference by others through the use of encryption, or other suitable cyber security measures known to those skilled in the art. Currently, encryption may be used to render the content of at least one transfer packet useless to all but the sender and the recipient of the transfer packet.

The devices, processes, and procedures that serve the part of the cyber communications network that is used between a sender's point of cyber access computer and a recipient's point of cyber access computer may be configured to provide for the cyber communications network transfer of at least one transfer packet that is free from intrusion or interference by others.

(14) the Individual's Cyber Asset Manager and the Individual's Device-Based Cyber Assets An individual's device-based cyber assets may include, but are not limited to: (a) at least one video camera, (b) at least one television, (c) at least one television programming access and selection device, (d) at least one personal health monitor, (e) at least one personal health care device, (f) at least one devices for properly identifying at least one other, (g) at least one vehicle, (h) at least one cyber vault, (i) at least one cyber file back-up and restore device, (j) at least one global position locating device, (k) at least one home, and/or business, automation management device (this may monitor, record, and have cyber operational interactions with lights, heating and cooling systems, locks, garage door openers, lawn sprinkler systems, security systems, water meter readings, automated pet doors, personal weather stations, and more), and (l) at least one other device-based cyber assets or system.

An individual may have at least one device-based cyber asset that is not an integral part of the individual's at least one point of cyber access computer.

An individual's at least one device-based cyber asset may have at least one cyber interaction with the individual using at least one cyber asset manager.

An individual's cyber asset manager provides safe and secure cyber interactions between either the individual or the individual's at least one cyber asset manager and the individual's at least one device-based cyber asset. The individual's at least one cyber asset manager provides the individual with safe and secure access control, administrative control, and operational control of the individual's at least one device-based cyber asset.

An individual may gain access control, administrative control, and operational control of the individual's at least one cyber asset manager through the individual's at least one private computer 230. Utilizing this choice of configuration of the combination of at least one private computer, and at least one cyber asset manager, no others may have access control, administrative control, or operational control of the individual's at least one cyber asset manager.

There may be complete security for an individual's at least one cyber interaction that is transferred from the individual's at least one cyber asset manager to the individual's at least one private computer.

An individual's at least one point of cyber access computer may establish the identity of the individual's at least one device-based cyber asset prior to providing at least one cyber interaction from the individual's at least one device-based cyber asset with access to the individual's at least one cyber asset manager.

An individual's at least one device-based cyber asset may establish the identity of the individual's at least one point of cyber access computer prior to the individual's at least one device-based cyber asset's providing access to at least one cyber interaction from the individual's at least one point of cyber access computer.

An individual's at least one cyber asset manager may be located within the individual's at least one point of cyber access computer. This configuration of the location of the individual's cyber asset manager may be used for interaction with the individual's at least one device-based cyber asset that only requires low security cyber interaction.

An individual may have at least one cyber asset manager that is located within the individual's at least one point of cyber access computer, and/or at least one cyber asset manager, that may be located within the individual's at least one private computer. Locating a cyber asset manager within the individual's properly configured private computer may provide for the highest attainable level of security and privacy for cyber interactions with the individual's at least one device-based cyber asset.

For example, an individual's at least one cyber asset manager may have at least one cyber interaction with at least one cyber device on the person of the individual. One particular cyber device that may be located on the person of the individual may monitor and report on the individual's blood sugar level. The individual may also have a cyber insulin delivery system that is operated through cyber interactions with the individual's cyber asset manager. The individual's life may depend on the cyber interactions with both of these devices. Therefore, the individual may be best served by using the highest level of security and privacy available for cyber interactions between the cyber asset manager and these two cyber devices. This may be accomplished by having cyber interactions between these two device-based cyber assets provided by at least one private-computer-based cyber asset manager.

An individual's at least one cyber asset manager, and the same individual's at least one device-based cyber asset, may interconnect using the resources of at least one cyber communications network.

An individual's at least one cyber asset manager may use the universal interactive operating system for at least one cyber operation, and/or at least one cyber interaction.

An individual's at least one device-based cyber asset may be configured to only interact with the individual. Others that wish to have cyber interactions with the individual's at least one device-based cyber asset must request that the individual provide the requestor with the requested cyber resource. The requested cyber resource may be made available for the requestor through the requestor's cyber interaction with the individual's at least one public computer 260.

An individual's at least one cyber asset manager and the individual's at least one device-based cyber asset may provide at least one historical record of at least one cyber interaction, and/or at least one cyber activity.

(15) Cyber Communications Network Between an Individual's Cyber Asset Manager and the Individual's Remote Device-Based Cyber Assets The purpose of the part of the cyber communications network that is used between an individual's cyber asset manager and the individual's remote device-based cyber assets is to safely and securely transfer at least one properly formatted and properly identified transfer packet between the individual's at least one cyber asset manager and the individual's at least one remote device-based cyber asset.

An individual's cyber asset manager's interaction with at least one of the individual's device-based cyber assets may come from the individual's cyber asset manager, through the individual's private computer, to and through the individual's point of cyber access computer, to and through the cyber communications network, and to the individual's remote device-based cyber asset.

An individual's remote device-based cyber asset's interaction with the individual's cyber asset manager may come from the individual's remote device-based cyber asset, to and through the cyber communications network, to and through the individual's point of cyber access computer, to either: (a) the individual's cyber asset manager, or (b) the individual's private computer, and then on to the individual's cyber asset manager.

There may be many unique transfer packet formats for cyber interactions between an individual's cyber asset manager and the individual's device-based cyber assets. The different and unique transfer packet formats are used to identify cyber interactions between different types of cyber devices and to identify cyber interactions for different functions or purposes.

Cyber interactions between an individual's at least one cyber asset manager and the individual's at least one device-based cyber asset may use:

(a) at least one line of cyber communications;
(b) at least one type of line of cyber communications; and,
(c) at least one source of lines of cyber communications.

An individual's at least one device-based cyber asset may use a cyber telephone device that is being used by the individual, and/or an input output device that is being used by the individual as a cyber communications network link to, and/or from, the individual's at least one point of cyber access computer.

An individual's at least one cyber asset manager may be required to be properly identified prior to at least one step, and/or prior to each step, that the individual's cyber asset manager's cyber interaction takes through the at least one cyber communications network. Further, the individual's at least one device-based cyber asset may be required to be properly identified prior to at least one step, and/or prior to each step, that the individual's remote device-based cyber asset's cyber interaction takes throughout the cyber communications network.

Cyber interactions that use the part of the cyber communications network between an individual's cyber asset manager and the individual's remote device-based cyber assets, (and especially those cyber interactions that use radio frequency), may be protected from intrusion and interference by others by the use of encryption or other suitable cyber security measures.

The devices, processes, and procedures that control the operations of this part of the cyber communications network, through their use of the programming, processes, and procedures that may be a part of the universal interactive operating system, may provide for the safe and secure transfer of at least one transfer packet that is free from intrusion or interference by others.

(16) Examples of Use of the Point-of-Cyber-Access Cyber System

On election day in November every voter in the United States may, through use of an input output device, gain identified access to his or her point of cyber access computer. Through utilization of the proper-identity-based access control services of the point-of-cyber-access cyber system, every voter will have the ability to safely, securely, and privately cast his or her vote in at least one, or in all, of the elections where the individual is eligible to cast a vote.

In the context of education, in an elementary school classroom, a student may use an input output device such as shown in FIGS. 16A-16F. As shown in FIG. 16B, this device has two approximately 8" by 11" multi-touch image display screens that are hinged together on one side like a book in portrait format. The student may turn the same input output device 90 degrees where it then resembles and may provide the functions of a laptop computer.

The student may utilize the input output device and the resources of at least one cyber communications network to interact with the student's at least one remotely located point of cyber access computer.

As shown in FIGS. 16C and 16F, the student may use a stylus 907 in conjunction with the digital tablet feature of the input output device's display screens to write, to draw, or to interact with an image appearing on the display screens. The student may also use the multi-touch mode of the display screens for interaction with the student's point of cyber access computer. The display screens' multi-touch mode also provides the student with a touch screen keyboard. Furthermore, the student may use the input output device's microphone, and/or camera, for input for cyber interaction with the student's point of cyber access computer. Also, the student may use at least one type of cyber input device that may interact with the student's input output device.

The student's point of cyber access computer may provide the student with access to cyber educational materials from multiple sources such as, for example, a cyber library, a cyber compendium of information, or the local school district's cyber library.

The student's point of cyber access computer may use school district-supplied computer programs, school district-supplied computer applications, and school district-supplied cyber educational materials.

The student uses an input output device to remotely access the student's point of cyber access computer so that the student may use the school district-supplied cyber-based educational resources and materials during the class that the student is currently attending.

The input output device may provide the student with full interactive access to all available cyber-based educational resources and materials.

The student may use a stylus 907 to either write a report or to work on math problems.

The student stores the student's schoolwork using the student's point of cyber access computer.

The student submits finished school work to the student's teacher using the cyber mail functions of the point-of-cyber-access cyber system.

The student may also use the point-of-cyber-access cyber system for cyber telephone communication interactions with the student's teacher during class by simply using the point-of-cyber-access cyber system's cyber video telephone functions for remote interaction with the student's teacher from across the classroom.

The student's teacher, through use of school district-supplied computer programs and computer applications, may access, during class, a copy of the image that is displayed on the student's input output device. Using the same school district-supplied computer programs and computer applications, the student's teacher may interact with the student during class by providing graphic input that may be viewed by the student in real time on the image display screen of the student's input output device.

All of the previously addressed school-related cyber activities do not necessarily require that cyber interconnection and computing infrastructure be provided to the student by the school district. Every cyber-based educational activity is performed using the point-of-cyber-access cyber system's cyber mail functions, cyber interaction functions, and cyber video telephone functions.

The school district may provide the student with any cyber educational materials that the school district deems appropriate.

The school district may also provide the student with cyber educational materials that are appropriate for the student's abilities in any field of study. Furthermore, the school district may supply the student with cyber educational materials that are formatted to be of most interest to the student and most suitable to the learning style of the student. By using the educational resources of the point-of-cyber-access cyber system, a school district may have the ability to make "no child left behind" an educational concept and challenge of the past.

It should also be noted that the student may use, from anywhere the student is located, at least one input output device to remotely access the cyber-based educational resources made available to the student through the student's point of cyber access computer.

In the context of health care of a person as an individual, when an individual has a health-related examination by a health care provider, the health care provider may safely, securely, and privately:

(a) maintain a record of the interaction between the health care provider and the individual for at least one part of the lifetime of the individual;
(b) provide the point-of-cyber-access cyber system health care registry with the individual's point-of-cyber-access cyber system identity designation, along with the health care provider's point-of-cyber-access cyber system identity designation and the date of the health care-related service; and,
(c) provide the individual with a complete record of the individual's health care-related interaction with the health care provider by sending a copy of the health care provider's record to the individual through the individual's point of cyber access computer.

The individual may review the copy of the health care provider's record of the individual's health-related examination for accuracy and may then require the health care provider to correct inaccuracies (if necessary).

The individual may choose to save at least one part of, the health care provider's record of the individual's health-related examination by transferring the copy of the health care provider's record from the individual's public computer to the individual's private computer where the record or at least one part thereof, may be saved as a part of the individual's absolutely safe, secure, and private files that contain the individual's personal health records.

The individual may also choose to delete the copy of the health care provider's record of the individual's health-related examination.

If the individual happens to lose, or delete, the copy of the health care provider's record of the individual's health-related examination, the individual may contact the point-of-cyber-access cyber system health care registry and receive the needed information. The point-of-cyber-access cyber system health care registry provides information to the individual that only includes the health care provider's point-of-cyber-access cyber system identity designation and the date of the individual's health-related examination. Using information provided by the point-of-cyber-access cyber system health care registry, the individual may request that the health care provider send the individual a copy of the health care provider's record of the individual's prior health-related examination. The health care provider may then provide a copy of the record of the individual's health-related examination to the individual only, thereby providing the individual with complete privacy for, and control over, the individual's point-of-cyber-access cyber system-based health records.

The individual may, anonymously, or with others' knowledge of the individual's identity, choose to share at least one part of the individual's health-related information with specified others.

If a third party, such as a health care insurance company, was obligated to pay for at least one part of the individual's health-related services, the third party insurance company may require that the individual provide the third party insurance company with a cyber interaction that discloses or confirms at least one of the details about the health-related services the individual received from the health care provider. This simple process may be used to eliminate many types of health care fraud.

The individual may safely, securely, and privately share at least one part of the individual's health information with health care providers. The individual's shared health information may provide the health care provider with a tool to use to better provide appropriate health care services to the individual.

The individual may safely, securely, privately, and anonymously share at least one part of the individual's personal health information with scientists or researchers that are working to provide improved health care outcomes. Quantum leaps forward may be made by scientists and researchers when vast amounts of anonymously donated, reliable, health information from large numbers of individuals are made available for research.

The individual may also choose to provide the individual's health information to an agency such as the United States Center for Disease Control and Prevention (CDC) so that the CDC may use the individual as one of many that are used to monitor a geographic area or a specific part of the population for targeted health-related occurrences. The CDC may then monitor a sample of people to determine when and where there is an outbreak of flu or disease (which may be, for example, a food-borne or host-borne illness), and when and where there is an occurrence of at least one other targeted health-related issue.

The point-of-cyber-access cyber system's ability to allow an individual to safely, securely, privately, and anonymously share at least one part of the individual's health information with at least one selected other will provide public health entities with an informational tool that fills the public health entities' state-of-the-public's-health informational need.

The point-of-cyber access cyber system may provide an all-inclusive worldwide database of health care information, as well as area-appropriate definitions for the health care information that is contained within the database. This database may be an ultimate informational tool for scientists and medical researchers to use to improve health care outcomes worldwide.

The point-of-cyber-access cyber system may provide an individual with a safe, secure, and private process for cyber interactions with cyber health monitoring devices or cyber health care delivery devices that are on or near the person of the individual.

For example, an individual uses a cyber body function monitor on his or her person. The cyber body function monitor, using the resources of the point-of-cyber-access cyber system, interacts with the individual's point of cyber access computer. The individual's cyber body function monitor reports to the individual's point of cyber access computer that the individual has a blood sugar level that requires the individual's cyber insulin delivery system (that may be placed on the person of the individual) to deliver a specified amount of insulin to the individual's bloodstream. The individual may require that the individual's permission is given prior to the delivery of insulin, or the individual may allow an automated delivery of insulin if the automated delivery does not exceed a pre-determined amount of insulin. The individual requires a dose of insulin that exceeds this pre-determined maximum acceptable dose, so, the individual is required to approve the delivery of the indicated necessary dose of insulin before the indicated necessary dose of insulin is delivered.

The point-of-cyber-access cyber system's ability to safely, securely, and privately monitor and record information that is received from a cyber health monitoring device that is on or near the person of the individual provides an individual with intermittent or continuous reporting from cyber health-related monitors of at least one type. Information from cyber health-related monitors may be saved by the individual for use by the individual or for use by health care providers. Alternatively, information from the individual's cyber health-related monitors may be used by science and medicine to enable science and medicine to better understand the intricacies of the workings of a human body in order to be able to provide improved health care outcomes worldwide.

In another example, an individual is driving towards the individual's residence. The individual inputs the voice command, "open the garage door," to the individual's pocket-sized input output/cyber telephone device. The individual's point of cyber access computer receives the individual's voice-based cyber interaction and, in turn, monitors the global position locating device that is a part of the individual's input output/cyber telephone device. Such monitoring allows the individual's point of cyber access computer to determine the optimum point in time to interact with the individual's garage door opener. The individual's computer interacts with the individual's garage door opener to open the individual's garage door as the individual and the individual's vehicle approach.

The above description of the present invention is illustrative, and is not intended to be limiting. It will thus be appreciated that various additions, substitutions and modifications may be made to the above described embodiments without departing from the scope of the present disclosure. Accordingly, the scope of the present disclosure should be construed in reference to the appended claims. The elements of these claims may be combined in different combinations and sub-combinations without departing from the scope of the disclosure. For example, the subject matter of two or more dependent claims may be combined without departing from the scope of the disclosure, even if the claims do not share a dependency.

What is claimed is:

1. A point-of-cyber-access cyber system, comprising:
   devices and programming for processing cyber activities;
   devices and programming structured to provide at least one point of cyber access to at least one individual;
   at least one input output device for providing said at least one individual with at least one type of interaction selected from the group consisting of local and remote cyber interactions, wherein said cyber interactions are between said at least one individual and said devices and programming structured to provide at least one point of cyber access to at least one individual;
   devices and programming for providing proper identification of at least one individual and at least one cyber device, wherein each of said at least one individual and said at least one cyber device may have at least one status selected from the group consisting of (a) established identity, (b) verified identity, and (c) confirmed identity;
   devices and programming providing at least one cyber communications network; and
   devices and programming providing for carrying out cyber activities among properly identified members selected from the group consisting of (a) individuals, (b) others, (c) device-based cyber assets, and (d) device-based cyber resources;
   wherein said point-of-cyber-access cyber system has an architecture that defines the components of said system and at least one interrelationship between said components, said architecture comprising (a) architectural rules and requirements, (b) devices and programming for establishing and maintaining a cyber environment that provides for complying with and enforcing said architectural rules and requirements, (c) at least one operating system providing operational programming for system devices and components, (d) system devices, and (e) system components;

wherein said system architecture includes (a) said at least one point of cyber access computer, (b) said at least one cyber communications network, and (c) said at least one input output device;

wherein said at least one individual may utilize said at least one point of cyber access computer, said devices and programming for providing proper identification, said at least one input output device, and at least one cyber device, all of which may be interconnected using said at least one cyber communications network, all using said at least one operating system.

2. The point-of-cyber-access cyber system of claim 1, wherein said at least one point of cyber access computer includes said individual's point of cyber access computer, wherein said individual's point of cyber access computer provides said individual with a point of cyber access which performs at least one action selected from the group consisting of establishing and confirming the identity of the sender of at least one cyber interaction prior to providing the sender's at least one cyber interaction with further access to said individual's point of cyber access computer;

wherein said individual's point of cyber access computer performs at least one step selected from the group consisting of
(a) providing said at least one individual with privacy and security for at least one selected from the group consisting of (i) said individual's private cyber activities, (ii) said individual's private cyber assets, and (iii) said individual's private cyber resources,
wherein said at least one individual's point of cyber access computer is configurable to provide exclusive access, through said individual's point of cyber access computer, to said at least one individual's private cyber activities, private cyber assets, and private cyber resources, and wherein said at least one individual's private cyber activities, private cyber assets and private cyber resources are configurable to be exclusively accessed by cyber interactions from said at least one individual and said at least one individual's selected, device-based cyber assets and device-based cyber resources, and
(b) providing said at least one individual with the ability to share at least one of (i) said individual's selected cyber assets, and (ii) said individual's selected cyber resources, said selected cyber assets and cyber resources providing at least one selected other, and at least one selected cyber device of said at least one selected other, with at least one of said at least one individual's selected cyber assets and selected cyber resources;
wherein said at least one individual's selected cyber assets and cyber resources for sharing with said selected others and said selected cyber devices of said selected others are accessible by cyber interactions from said selected others and said selected cyber devices of said selected others;
wherein said at least one individual's point of cyber access computer is configured such that said at least one individual's publicly available cyber assets and said at least one individual's publicly available cyber resources may be exclusively accessed through said at least one individual's at least one point of cyber access computer; and
wherein said at least one individual's publicly available cyber assets and cyber resources may be exclusively accessed by cyber interactions from at least one selected from the group consisting of (a) at least one properly identified selected other and (b) at least one properly identified selected cyber device of at least one selected other.

3. The point-of-cyber-access cyber system of claim 1, wherein said at least one individual's point of cyber access computer provides said at least one individual with a point of properly identified cyber access for at least one member selected from the group consisting of (a) cyber communications, (b) cyber activities, (c) cyber assets, and (d) cyber resources.

4. The point-of-cyber-access cyber system of claim 1, wherein said system has at least one property selected from the group consisting of (a) each individual using said point-of-cyber-access cyber system has one and only one unique permanent point-of-cyber-access cyber system identity designation, and (b) each said cyber device that is a component of said point-of-cyber-access cyber system has one and only one unique permanent point-of-cyber-access cyber system identity designation.

5. The point-of-cyber-access cyber system of claim 1, wherein said system has at least one property selected from the group consisting of
(a) said each individual is properly identified prior to at least one step taken by the cyber interactions of said each individual throughout the point-of-cyber-access cyber system, and
(b) said at least one cyber device is properly identified prior to at least one step taken by the cyber interactions of said at least one cyber device throughout the point-of-cyber-access cyber system.

6. The point-of-cyber-access cyber system of claim 1, wherein said individual's point of cyber access computer further comprising devices and programming providing said individual with the ability to perform at least one action selected from the group consisting of (a) storing, (b) accessing, (c) modifying, (d) using, (e) managing, and (f) sharing at least one-item selected from the group consisting of (i) said individual's file-based cyber assets, and (ii) said individual's file-based cyber resources.

7. The point-of-cyber-access cyber system of claim 1, wherein said individual's point of cyber access computer provides at least one item selected from the group consisting of
(a) devices and programming that establish the identity of said individual prior to allowing at least one cyber interaction from said individual to gain further access to said individual's point of cyber access computer,
(b) devices and programming that confirm the identity of at least one other prior to allowing at least one cyber interaction from said at least one other to gain further access to said individual's point of cyber access computer, and
(c) devices and programming that perform at least one action selected from the group consisting of establishing and confirming the identity of at least one selected cyber device prior to allowing cyber interactions from said at least one cyber device to gain further access to said individual's said at least one point of cyber access computer.

8. The point-of-cyber-access cyber system of claim 1, wherein said individual's point of cyber access computer further comprises devices and programming providing for at least one cyber interaction between said individual's point of cyber access computer and at least one selected from the group of (a) at least one selected properly identified other, and (b) at least one selected properly identified cyber device.

9. The point-of-cyber-access cyber system of claim 1, wherein after having established the identity of said individual, said individual's point of cyber access computer may then provide verification of said individual's identity prior to at least one additional step that said cyber interactions of said individual take throughout the point-of-cyber-access cyber system.

10. The point-of-cyber-access cyber system of claim 1, wherein said at least one cyber communications network of said point-of-cyber-access cyber system includes (a) cyber communications network devices, (b) means for functionally interconnecting said cyber communications network devices, and (c) programming.

11. The point-of-cyber-access cyber system of claim 10, wherein prior to further cyber interaction between said cyber communications network and said at least one individual's at least one point of cyber access computer, the cyber communications network device that first engages in cyber interactions with said at least one individual's at least one point of cyber access computer performs at least one action selected from the group consisting of (a) confirming said individual's identity, and (b) establishing the identity of said individual's point of cyber access computer, and wherein said at least one action may be performed as said network device first engages in cyber interactions with said at least one individual's at least one point of cyber access computer.

12. The point-of-cyber-access cyber system of claim 11, wherein after said cyber communications network device that first engages in cyber interactions with said individual's point of cyber access computer has established the identity of said individual's point of cyber access computer, said device that first engages in cyber interactions may then provide verification of the identity of said individual's point of cyber access computer, as required, or as needed, prior to at least one additional step that the cyber interactions of said individual's point of cyber access computer take throughout the point-of-cyber-access cyber system.

13. The point-of-cyber-access cyber system of claim 1, further comprising:
devices and programming which provide said individual with the ability to perform at least one action selected from the group consisting of (a) requesting that at least one selected other provide said individual with at least one selected level of privacy, and (b) requiring that at least one selected other provide said individual with at least one selected level of privacy;
wherein said at least one selected level of privacy is selected by said individual.

14. The point-of-cyber-access cyber system of claim 1, further comprising devices and programming for pre-processing of cyber content prior to said cyber content being sent to at least one device selected from the group of (a) at least one input output device, and (b) at least one point of cyber access computer, wherein said pre-processed cyber content is in a form requiring no further processing of said content for use by said at least one input output device and said at least one point of cyber access computer.

15. The point-of-cyber-access cyber system of claim 1, further comprising devices and programming providing system-standard interface and interaction processes and procedures, wherein said at least one cyber asset and said at least one cyber resource may be configured to be used as a part of the point-of-cyber-access cyber system by means of the use of system-standard interface and interaction processes and procedures by said at least one cyber asset and said at least one cyber resource.

16. The point-of-cyber-access cyber system of claim 1, further comprising system-standard processes and procedures that are utilized for minimizing the number of differing processes and procedures used by others by providing said system-standard processes and procedures for use by others.

17. The point-of-cyber-access cyber system of claim 1, wherein said point of cyber access computer comprises devices and programming providing separate and different processing and support for at least one item selected from the group consisting of (a) said individual's private cyber activities, (b) said individual's private cyber assets, and (c) said individual's private cyber resources, and separate and different processing and support for at least one item selected from the group consisting of (a) said individual's public cyber activities, (b) said individual's publicly available cyber assets, and (c) said individual's publicly available cyber resources.

18. The point-of-cyber-access cyber system of claim 1, wherein said individual's point of cyber access computer comprises devices and programming providing at least one source of processing and support that is utilized for the purpose of providing at least one service selected from the group consisting of (a) cybersecurity, (b) interoperability, (c) determinations regarding proper identity, (d) access control, for at least one part of (i) said individual's private cyber activities (ii) said individual's private cyber assets, and (iii) said individual's private cyber resources, and (e) access control for at least one part of (i) said individual's public cyber activities (ii) said individual's publicly available cyber assets, and (iii) said individual's publicly available cyber resources.

19. The point-of-cyber-access cyber system of claim 1, wherein said architectural rules impose at least one requirement selected from the group consisting of (a) each individual must be properly identified prior to at least one step of at least one cyber interaction said each individual takes throughout the point-of-cyber-access cyber system, and (b) each cyber device must be properly identified prior to at least one step of at least one cyber interaction of said each cyber device takes throughout the point-of-cyber-access cyber system.

20. The point-of-cyber-access cyber system of claim 1, wherein at least one of process and at least one procedure are subjected to at least one operation selected from the group consisting of (a) added to said point-of-cyber-access cyber system, (b) removed from said point-of-cyber-access cyber system, (c) arranged in at least one functional configuration as a part of said point-of-cyber-access cyber system, and (d) altered in at least one functional way.

21. The point-of-cyber-access cyber system of claim 1, wherein at least one cyber asset and at least one cyber resource are subjected to at least one operation selected from the group consisting of (a) added to said point-of-cyber-access cyber system, (b) removed from said point-of-cyber-access cyber system, (c) arranged in at least one functional configuration as a part of said point-of-cyber-access cyber system, and (d) altered in at least one functional way.

22. The point-of-cyber-access cyber system of claim 1, further comprising a point-of-cyber-access cyber system device architecture wherein at least one item selected from the group consisting of (a) at least one component, (b) at least one process, and (c) at least one procedure, is subjected to at least one operation selected from the group consisting of (i) added to at least one cyber device, (ii) removed from at least one cyber device, (iii) arranged in at least one functional configuration as part of at least one cyber device, and (iv) altered in at least one functional way.

23. The point-of-cyber-access cyber system of claim 1, further comprising devices and programming for performing at least one action selected from the group consisting of:
  (a) providing at least one secure interconnected cyber system for use by said at least one individual for at least one purpose selected from the group consisting of (i) said individual's cyber communications, (ii) said individual's cyber interactions, and (iii) said individual's cyber activities,
  (b) providing at least one process or procedure that will perform at least one service selected from the group consisting of (i) providing compliance with at least one point-of-cyber-access cyber system architectural rule or requirement, and (ii) enforcing compliance with at least one point-of-cyber-access cyber system architectural rule or requirement,
  (c) providing an architectural requirement selected from the group consisting of (i) each cyber device that is a component of said point-of-cyber-access cyber system must be properly identified, and (ii) each individual that is using said point-of-cyber-access cyber system must be properly identified,
  (d) providing at least one locally or remotely accessible point of cyber access computer for said at least one individual's use for at least one purpose selected from the group consisting of (i) cyber communications, (ii) cyber interactions, and (iii) cyber activities, and
  (e) providing said at least one individual with remote access to at least one of said individual's cyber assets and at least one of said individual's cyber resources.

24. The point-of-cyber-access cyber system of claim 1, wherein said architectural rules and requirements impose at least one restriction selected from the group consisting of (a) at least one step of a cyber interaction taken by an individual on the system includes (i) properly identifying the individual and then (ii) performing the step of the cyber interaction, and (b) at least one step of a cyber interaction taken by a cyber device on the system includes (i) properly identifying the cyber device and then (ii) performing the step of the cyber interaction.

25. The point-of-cyber-access cyber system of claim 1, further comprising at least one member selected from the group consisting of (a) at least one cyber asset manager, (b) at least one cyber telephone system, (c) at least one cyber vault, (d) at least one private computer, (e) at least one public computer, (f) at least one cyber license system, (g) at least one universal interactive operating system, and (h) at least one group of processes and virtual devices that may be used for at least one purpose selected from the group consisting of (i) security, (ii) interoperability conversion, and (iii) altering cyber images.

26. The point-of-cyber-access cyber system of claim 1, wherein said devices and programming that are structured to provide said at least one individual with at least one point of cyber access will provide said at least one individual with safe, secure access to at least one member selected from the group consisting of (a) cyber communications, (b) computing capabilities, (c) cyber activities, (d) cyber interactions, (e) cyber assets, and (f) cyber resources.

\* \* \* \* \*